US009582761B2

(12) United States Patent
Cox et al.

(10) Patent No.: US 9,582,761 B2
(45) Date of Patent: Feb. 28, 2017

(54) GENERATING AND DISPLAYING CANONICAL RULE SETS WITH DIMENSIONAL TARGETS

(71) Applicant: SAS Institute Inc., Cary, NC (US)

(72) Inventors: James Allen Cox, Cary, NC (US); Barry De Ville, Holly Springs, NC (US); Zheng Zhao, Cary, NC (US)

(73) Assignee: SAS Institute Inc., Cary, NC (US)

( * ) Notice: Subject to any disclaimer, the term of this patent is extended or adjusted under 35 U.S.C. 154(b) by 83 days.

(21) Appl. No.: 14/707,758

(22) Filed: May 8, 2015

(65) Prior Publication Data

US 2015/0242762 A1 Aug. 27, 2015

Related U.S. Application Data

(63) Continuation-in-part of application No. 14/337,203, filed on Jul. 21, 2014, now Pat. No. 9,092,734, which is a continuation-in-part of application No. 13/624,052, filed on Sep. 21, 2012, now Pat. No. 8,832,015, application No. 14/707,758, filed on May 8, 2015, which is a continuation-in-part of application No. 14/337,195, filed on Jul. 21, 2014, now Pat. No.

(Continued)

(51) Int. Cl.
*G06F 17/00* (2006.01)
*G06N 5/02* (2006.01)
*G06Q 30/06* (2012.01)

(52) U.S. Cl.
CPC ......... *G06N 5/025* (2013.01); *G06Q 30/0621* (2013.01)

(58) Field of Classification Search
None
See application file for complete search history.

(56) References Cited

U.S. PATENT DOCUMENTS 6,272,478 B1 8/2001 Obata et al.
6,311,173 B1 10/2001 Levin et al.

(Continued)

OTHER PUBLICATIONS

Cohen, William W. et al., "Context-Sensitive Learning Methods for Text Categorization" AT&T Labs, ACM Transactions on Information Systems vol. 17, No. 2 Apr. 1999, pp. 141-173.

(Continued)

*Primary Examiner* — Luis Sitiriche
(74) *Attorney, Agent, or Firm* — Kilpatrick Townsend & Stockton LLP

(57) ABSTRACT

Systems and methods for performing analyses on data sets to display canonical rules sets with dimensional targets are disclosed. A cross-corpus rule set for a given Topic can be generated based on the entire corpus of data. A first dimensional rule set can be generated based on a first context (e.g., based on the same Topic but using a first sub-domain of the corpus of data). A second dimensional rule set can be generated based on a second context (e.g., based on the same Topic but using a second sub-domain of the corpus of data). Key dimensional differentiators (e.g., for each dimension, or context, of the Topic) can be determined based on a comparison of the general rule set, the first dimensional rule set, and the second dimensional rule set. A canonical rule set visualization can be displayed. The visualization can highlight the dimensional selectors (e.g., those tokens, or nodes, that differ between the first dimensional rule set and the second dimensional rule set).

18 Claims, 33 Drawing Sheets

Related U.S. Application Data 9,117,174, which is a continuation-in-part of application No. 13/624,052.

(60) Provisional application No. 62/017,260, filed on Jun. 26, 2014, provisional application No. 61/856,199, filed on Jul. 19, 2013.

(56) References Cited

U.S. PATENT DOCUMENTS

| | | |
|---|---|---|
| 8,458,232 B1 | 6/2013 | Spertus et al. |
| 8,832,015 B2 | 9/2014 | Cox et al. |
| 2009/0055332 A1 | 2/2009 | Lee |
| 2011/0078650 A1 | 3/2011 | Weber et al. |
| 2011/0153622 A1 | 6/2011 | Bhattal et al. |
| 2014/0089247 A1 | 3/2014 | Cox et al. |
| 2014/0337271 A1 | 11/2014 | Cox et al. |
| 2014/0337272 A1 | 11/2014 | Cox et al. |

OTHER PUBLICATIONS

Clark, Peter et al., "The CN2 Induction Algorithm" Machine Learning 3: 1989 Kluwer Academic Publishers—Manufactured in the Netherlands, pp. 261-283.

Huysmans, Johan et al., "Using Rule Extraction to Improve the Comprehensibility of Predictive Models" Department of Decision Sciences and Information Management (KBI), 2006, 56 pages.

Martens, David et al., "Rule Extraction from Support Vector Machines: An Overview of Issues and Application in Credit Scoring" Studies in Computational Intelligence (SCI) Springer-Verlag Heidelberg 2008, 32 pages.

Magnum Opus: the leading data mining software tool for association discovery, retrieved from http://www.giwebb.com/ on Jun. 26, 2014, 1 page.

Fayyad et al., "From Data Mining to Knowledge Discovery in Databases" AI Magazine, vol. 17 No. 3 (1996) 18 pages.

Agrawal et al., Fast Algorithms for Mining Association Rules IBM Almaden Research Center Proc. 20th int. conf. very large data bases, VLDB, Santiago Chile (1994) 13 pages.

Notice of Allowance of Jul. 11, 2014 for U.S. Appl. No. 13/624,052, 16 pages.

Non-Final Office Action of Oct. 1, 2014 for U.S. Appl. No. 14/337,203, 11 pages.

Notice of Allowance of Apr. 10, 2015 for U.S. Appl. No. 14/337,203, 5 pages.

Non-Final Office Action of Oct. 1, 2014 for U.S. Appl. No. 14/337,195, 11 pages.

Notice of Allowance of Apr. 23, 2015 for U.S. Appl. No. 14/337,195, 5 pages.

| Rules | Precision | Recall | F1 |
|---|---|---|---|
| t_shr_446 & t_net_445 | 1.000 | 0.482 | 0.651 |
| t_record_345 & t_cts_447 | 0.995 | 0.681 | 0.809 |
| t_year_58 & t_profit_322 & ^t_government_1236 & ^t_country_1236 & ^t_offer_132 | 0.983 | 0.762 | 0.859 |
| t_cts_447 & ^t_price_201 & ^t_offer_132 | 0.978 | 0.818 | 0.891 |
| t_dividend_721 & ^t_price_201 | 0.971 | 0.851 | 0.907 |
| t_year_58 & t_earnings_554 & ^t_export_108 & ^t_investor_5414 | 0.955 | 0.882 | 0.917 |
| t_split_338 & ^t_market_400 | 0.950 | 0.902 | 0.925 |
| t_qtr_454 & ^t_official_1272 | 0.948 | 0.916 | 0.932 |
| t_profit_322 & ^t_economic_2950 & ^t_pct_390 & t_net_445 | 0.947 | 0.923 | 0.935 |
| t_loss_513 & ^t_government_1236 & t_quarter_473 | 0.944 | 0.931 | 0.937 |
| t_pretax_profit_5823 & ^t_pct_390 | 0.944 | 0.934 | 0.939 |
| t_profit_322 & t_pre_tax_6871 | 0.942 | 0.939 | 0.941 |
| t_net_445 & ^t_market_400 & t_min_69 & ^t_last_72 & t_income_619 | 0.940 | 0.945 | 0.943 |
| t_loss_513 & ^t_government_1236 & t_prior_526 | 0.941 | 0.947 | 0.944 |
| t_loss_513 & t_expense_10977 | 0.940 | 0.949 | 0.945 |
| t_div_753 | 0.940 | 0.951 | 0.946 |
| t_billion_note_1628 | 0.940 | 0.952 | 0.946 |
| t_loss_513 & t_net_loss_946 | 0.939 | 0.954 | 0.947 |
| t_payout_718 | 0.938 | 0.956 | 0.947 |
| t_min_note_441 | 0.938 | 0.956 | 0.947 |
| t_result_1440 & t_quarter_473 & ^t_government_1236 | 0.935 | 0.961 | 0.948 |
| t_net_profit_506 | 0.935 | 0.961 | 0.948 |
| t_stock_dividend_6984 | 0.934 | 0.962 | 0.948 |

FIG. 7

| Potential Rules | F1 |
|---|---|
| t_earnings_554 & ~t_rate_810 & ~t_export_108 (Precision 0.213) | 0.945 |
| t_loss_513 & ~t_foreign_1228 (Precision 0.110) | 0.930 |
| t_sale_375 & t_gain_457 (Precision 0.184) | 0.943 |
| t_result_1440 & ~t_week_32 (Precision 0.065) | 0.912 |
| t_gain_457 & t_sale_375 (Precision 0.184) | 0.943 |
| t_net_445 (Precision 0.056) | 0.919 |
| t_stock_dividend_6984 (Precision 0.194) | 0.948 |
| t_dividend_721 (Precision 0.133) | 0.945 |
| t_shr_446 (Precision 0.157) | 0.947 |
| t_profit_322 (Precision 0.066) | 0.932 |

Best Rule: t_stock_dividend_6984

| Precision | Recall | F1 |
|---|---|---|
| 0.934 | 0.962 | 0.948 |

FIG. 8

| KEY TERMS IN A RULE | Precision | Improvable |
|---|---|---|
| t_net_445 | 0.177 | TRUE |
| t_net_445 & ~t_market_400 | 0.228 | TRUE |
| t_net_445 & ~t_market_400 & t_min_69 | 0.298 | TRUE |
| t_net_445 & ~t_market_400 & t_min_69 & ~t_last_72 | 0.330 | TRUE |
| t_net_445 & ~t_market_400 & t_min_69 & ~t_last_72 & t_income_819 | 0.453 | FALSE |

FIG. 9

| Ref.ID | term/rule | in | out | tot | g | dir | prec | est_prec | p_err | _improve |
|---|---|---|---|---|---|---|---|---|---|---|
| A | par | 12 | 5 | 17 | 36.9570 | + | 0.70588 | 0.67222 | 0.03366 | 1 |
| B | putting | 8 | 7 | 15 | 18.0749 | + | 0.53333 | 0.50625 | 0.02708 | 1 |
| C | fairway | 7 | 7 | 14 | 14.6626 | + | 0.50000 | 0.47333 | 0.02667 | 1 |
| D | birdie | 14 | 35 | 49 | 14.2136 | + | 0.28571 | 0.28200 | 0.00371 | 1 |
| E | pga | 3 | 0 | 3 | 13.8974 | - | 1.00000 | 0.77500 | 0.22500 | 0 |
| F | !bat | 1 | 57 | 58 | 6.7805 | | .01724 | 0.01864 | -.00140 | 1 |

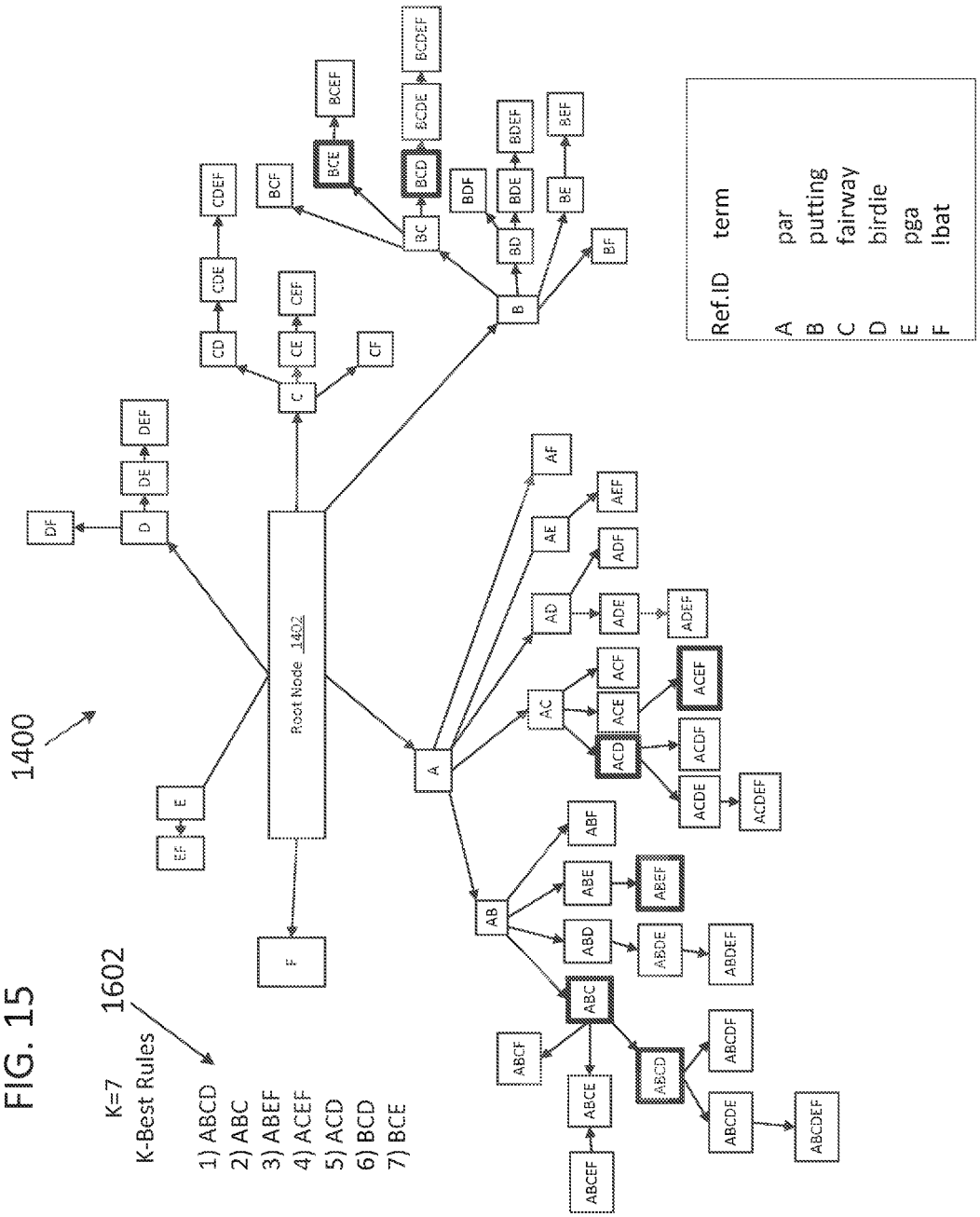

SELECT A CATEGORY:    1702    SELECT ONE OF THE AVAILABLE RULES FOR YOUR CATEGORY

Tennis
Cooking
Politics
golf
North Carolina State University
Pottery
Interstate 10
Broadway driver & iron & Tiger Woods fairway & green & bunker    1704

Jack Nicklaus & Tiger Woods & major championships

Jack Nicklaus & Tiger Woods & major championships ball & green & hole-in-one

1706

BASED ON THEIR TEXT AND THE RULE YOU SELECTED, THE FOLLOWING DOCUMENTS ARE CATEGORIZED AS GOLF DOCUMENTS

The placement of |greens| and |bunkers| is one of the biggest challenges in golf course architecture. When designing a golf course, it is important that the size of the |greens| reflects the desired character of the course. The same concern applies to selecting fairway width. |Fairways| should never be so wide that the course is not challenging, nor so narrow that the course The players complained that the 18$^{th}$ |fairway| and the 13$^{th}$ |green| were too wet for the tournament to continue. Despite the storm, groundscrew pumped water from |bunkers| all over the course. Nonetheless, the tournament continued to be postponed indefinitely. ESPN reported this morning that PGA officials considered cancelling the championship entirely......

Pebble Beach is a world-famous golf course that has some of the most scenic holes known in the game. Pebble Beach is an ocean course, with several |fairways| hugging the Pacific Coast. The 18$^{th}$ hole, with its oceanside fairway and numerous greenside bunkers, is one of the most famous finishing holes in golf. Several players have holed birdie putts at the 18$^{th}$ |green| to win PGA events at Pebble. One of the most famous moments was when Tom Watson chipped-in at the 17$^{th}$ |green|

GENERATING AND DISPLAYING CANONICAL RULE SETS WITH DIMENSIONAL TARGETS

CROSS REFERENCE TO RELATED APPLICATIONS

The present application is a Continuation-in-Part of and claims the benefit and priority of U.S. patent application Ser. No. 14/337,203, filed on Jul. 21, 2014, entitled "SYSTEMS AND METHODS FOR INTERACTIVE DISPLAYS BASED ON ASSOCIATIONS FOR MACHINE-GUIDED RULE CREATION," and U.S. patent application Ser. No. 14/337,195, filed on Jul. 21, 2014, entitled "SYSTEMS AND METHODS FOR INTERACTIVE DISPLAYS BASED ON ASSOCIATIONS FOR MACHINE-GUIDED RULE CREATION," each of which is a Continuation-in-Part of U.S. patent application Ser. No. 13/624,052, filed Sep. 21, 2012, entitled "Binary Rule Extraction," now patented as U.S. Pat. No. 8,832,015 as of Sep. 9, 2014, and each of which is a non-provisional of and claims the benefit and priority under 35 U.S.C. §119(e) of U.S. Provisional Application No. 61/856,119, filed on Jul. 19, 2013, entitled "Term Map: An Interactive Display Based On Associations for Machine-Guided Rule Creation." The present application further is a non-provisional of and claims the benefit and priority under 35 U.S.C. §119(e) of U.S. Provisional Application No. 62/017,260, filed on Jun. 26, 2014, entitled "AssoCat: An Algorithm for Efficiently Generating k-Maximally Predictive Association Rules With A Given Consequent." The contents of each of these aforementioned applications is hereby incorporated by reference in their entirety.

TECHNICAL FIELD

The present disclosure relates to computer-implemented machine-learning algorithms generally and more specifically to systems and methods for generating a rule set to identify data files that have a common characteristic.

BACKGROUND

The popularity of the Internet and the availability of nearly-unlimited data storage capacity have caused large amounts of data to be generated. Within the vast amounts of data, much valuable knowledge and information may be available, if it can be located, for example, by computer-implemented statistical and data mining techniques to locate and categorize unknown data files.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include computer-implemented methods, computer-program products, and systems for receiving a set of data files; determining a plurality of rule sets based on the set of data files, wherein determining a rule set includes applying a context to a rule set; comparing two rule sets of the plurality of rule sets, wherein comparing includes identifying a dimensional differentiator for the two rules sets and a common node for the two rule sets, wherein the dimensional differentiator is only associated with one context, and wherein the common node is associated with both contexts; generating a canonical rule set using the compared rule sets, the dimensional differentiator, and the common node; and presenting the canonical rule set, wherein presenting includes visually distinguishing the dimensional differentiator from the common node.

In some embodiments, the operations further include determining a cross-corpus rule set based on the set of data files, wherein generating the canonical rule set includes generating the canonical rule set additionally using the cross-corpus rule set. In some embodiments, the common node is additionally associated with the cross-corpus rule set. In some embodiments, presenting the canonical rule set includes visually presenting the canonical rule set, and wherein the dimensional differentiator is visually distinguishable from the common node. In some embodiments, presenting the canonical rule set includes distinguishing the dimensional differentiator by context. In some embodiments, presenting the canonical rule set includes presenting the common node as being associated with both contexts. In some embodiments, applying the context to the rule set includes generating the rule set based on a sub-domain of the set of data files associated with the context.

In some embodiments, the system includes one or more data processors and a non-transitory computer readable storage medium containing instructions which when executed on the one or more data processors, cause the one or more processors to perform the certain operations. In some embodiments, the computer-program product is tangibly embodied in a non-transitory computer-readable storage medium having instructions stored thereon, the instructions executable to cause a data processing apparatus to perform the certain operations.

BRIEF DESCRIPTION OF THE DRAWINGS

The specification makes reference to the following appended figures, in which use of like reference numerals in different figures is intended to illustrate like or analogous components

FIG. 7 is a table depicting a generation of a rule set by adding rules one-at-a-time to the rule set.

FIG. 8 is a table depicting a number of potential rules for a rule set and a selection of a particular potential rule for the rule set.

FIG. 9 is a table depicting an addition of terms to a rule and a satisfaction of a stopping criterion to discontinue the addition of terms.

FIG. 15 depicts an example search space with bold outlining used to represent seven evaluated rules found to be best during a search conducted within the search space.

FIG. 17 shows an example interface display presented to a user in order to visually represent seven association rules.

DETAILED DESCRIPTION

Figure 1A:
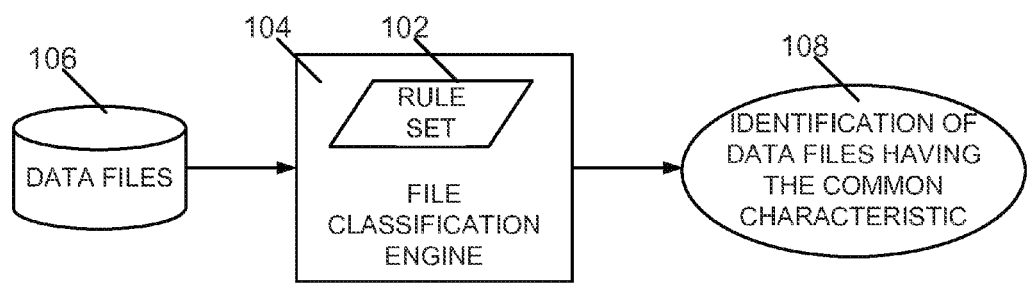
FIGS. 1A and 1B depict example applications of a rule set generated by a rule generation engine.

Certain aspects and features of the present disclosure relate to systems and methods for performing analyses on data sets to display canonical rules sets with dimensional targets. A cross-corpus rule set for a given Topic can be generated based on the entire corpus of data. A first dimensional rule set can be generated based on a first context (e.g., based on the same Topic but using a first sub-domain of the corpus of data). A second dimensional rule set can be generated based on a second context (e.g., based on the same Topic but using a second sub-domain of the corpus of data). Key dimensional differentiators for the Topic can be determined based on a comparison of the cross-corpus rule set, the first dimensional rule set, and the second dimensional rule set. A canonical rule set visualization can be displayed. The visualization can highlight the dimensional selectors (e.g., those tokens, or nodes, that differ between the first dimensional rule set and the second dimensional rule set).

Collections of data or documents can have an explicit or implicit network structure. There may be sub-domains or sub-nets with specialized features and/or contexts that typically require particular treatments, especially when linear-based models (e.g., the SAS Text Topic functionality) are used.

Any arbitrary token, such as "xyz", may have various meanings and may have multiple dictionary entries that denote various meanings in a variety of different contexts, sub-domains or sub-nets. Various functions (e.g., the SAS Text Topic functionality maps tokens, or terms, together based on their empirical co-relations in a given corpus or collection of documents. The co-relations can be calculated, in linear fashion, as applied to the entire set of tokens in the collection. The meaning that is likely to be assigned to a given token in this calculation is likely to be the meaning that is taken to apply across the entire collection—or corpus—that was used to derive the components of the Topic model. A "Topic" can be a particular category or certain criteria that can be fulfilled or not fulfilled by each token or term. The presence or absence of a Topic can thus be a common method to map a measurement to a Boolean or binary term (e.g., "yes" the criteria is fulfilled or "no" the criteria is not fulfilled). In an example, a Topic can be whether or not documents of a corpus are related to "Insurance" information. In another example, a Topic can be whether or not measurements of a set of length measurements are above a cutoff point (e.g., "tall" if the criteria is fulfilled or "short" if the criteria is not fulfilled).

Situations where a particular token has a specialized mapping or meaning by virtue of its position in a given context or sub-net will often present a different configuration of tokens for a given Topic. For example, in a given sub-domain or sub-net, the token "xyz" may not be present at all for a given Topic or, in the same sub-net, it may be signified by "abc." In another example, when generating a rule set for a particular given Topic related to "weather," a dimensional rule set generated given a first context of "hot climate" may include the term "warm" and a dimensional rule set generated given a second context of "cold climate" may include the term "chill," but when a cross-corpus rule set is generated without providing a context (e.g., the rule set is generated based on the entire corpus), neither the terms "warm" or "chill" might appear in the cross-corpus rule set.

The systems and methods of the present disclosure enable the discovery of variations in predictive token sets for a given Topic across various sub-nets. The systems and methods of the present disclosure enable the discovery of tokens which denote the same meaning but which have different surface forms, depending on sub-net.

An algorithm, such as those described in further detail herein, can provide a methodology for assigning discrete sets of token constructs to a given Topic. The use of such an algorithm provides a method for examining the sets of tokens that predict the occurrence of a given Topic across various sub-domains, or sub-nets. For example, the token "xyz" may appear in a collection of other tokens as predictors for a given Topic—when calculated across the entire collection—yet might appear as the token "abc" when rules are extracted for a given sub-domain, or sub-net, in the collection.

A network may be used to display the common and dissimilar tokens for separate rule sets. For example, when displaying the association between tokens and a given Topic, all predictive nodes for a first context may be colored in a first color (e.g., yellow) and the predictive token nodes for a second context may be colored in a second color (e.g., blue). In the resulting display (e.g., display of a canonical rule set) predictive token nodes that are a combination of the first and second color (e.g., green or part yellow and part blue) or an unrelated third color (e.g., red) can represent tokens that generally apply across the entire collection of documents whereas unique predictive token nodes of the first color (e.g., yellow) and the second color (e.g., blue) identify tokens that are uniquely predictive of their respective contexts or sub-domains.

As disclosed herein, one or more rule sets can be extracted from a binary target using Boolean rules (e.g., AND, OR, and NOT). The binary target can represent the presence or absence of a particular attribute in each member, or parts of each member, in a corpus. The corpus can be a collection of data sets, such as a collection of documents (e.g., containing unstructured text tokens) or structured data (e.g., containing data items with metric or non-metric measurement). The inputs, or predictor tokens, can be binary and can represent Boolean conditions, such as the presence or absence of terms in a textual corpus, or the presence or absence of a given attribute or characteristic as measured by a 0-1 binary constant.

The target attribute is a 0-1 binary indicator that may represent a semantic entity, such as the presence or absence of a given category or Topic or may more generally represent the presence or absence of any metric or non-metric characteristic that is associated with the corpus of data. The systems and methods disclosed herein can enable the analysis and display of differences in contextual effects, such as when a given target attribute appears in different contexts, including either within individual members of the collection or across multiple members of the collection. The systems and methods disclosed herein can enable the visual comparison and contrasting of unique and common rule terms (e.g., the presence or absence of terms in the data set) between multiple contexts of a target attribute.

The target attribute can be relaxed from being a 0-1 binary indicator. In an embodiment, effect coding, or dimensional target coding, can be used to capture different contexts or dimensions in the target or outcome of the analysis. For example, when a target can be analyzed in both a "hot" context and a "cold" context, dimensional target coding can be used to give the target a value indicative of whether the target context is both hot and cold (e.g., where associated rule sets specifically predict the joint occurrence of "hot" and "cold"), only hot (e.g., where associated rule sets specifically predict only "hot"), only cold (e.g., where associated rule sets specifically predict only "cold"), or neither hot nor cold (e.g., where associated rule sets specifically predict the dual absence of "hot" and "cold"). Using binary values for each dimensional context (e.g., 0-1 for "hot" and 0-1 for "cold"), the dimensional coding to capture these described contexts or dimensions can be shown as {11, 10, 01, 00}, where 11 represents "hot" and "cold," 10 represents "hot" only, 01 represents "cold" only, and 00 represents neither "hot" nor "cold." See Table I. Other contexts can be used. Any suitable number of contexts can be used, such as three, four, or more contexts. When additional contexts are used, the dimensional coding can be expanded as necessary (e.g., {111, 110, 101, 011, 100, 010, 001, 000} when three contexts are used).

TABLE I

Example of two-dimensional effect coding.

| Context 1 (e.g., "hot") | Context 2 (e.g., "cold") | Effect Code | Definition |
|---|---|---|---|
| 1 | 1 | 11 | Both contexts (e.g., both "hot" and "cold") |
| 1 | 0 | 10 | Only context 1 (e.g., only "hot") |
| 0 | 1 | 01 | Only context 2 (e.g., only "cold") |
| 0 | 0 | 00 | Neither context (e.g., neither "hot" nor "cold") |

Systems and methods disclosed herein enable the generation of a canonical rule set that includes unique and common predictive terms across multiple dimensional contexts. In order to generate the canonical rule set, a corpus of data files can be analyzed based on a first context and a second context (e.g., a first sub-domain of data files and a second sub-domain of data files). Additional contexts can be used and contexts need not be based solely on sub-domains, as described in further detail herein. Rule sets can be determined for each context according to certain aspects of the disclosure described below. A rule set that is determined using a context can be known as a dimensional rule set. A cross-corpus rule set can also be determined based on the entire corpus of data files and not associated with any one particular context. Common nodes can be identified based on the rule sets. Common nodes can be common across all three rule sets or common across only the dimensional rule sets. Dimensional differentiators can be identified for a given target attribute. Dimensional differentiators can include terms that are common to fewer than all dimensional rule sets (e.g., partial-dimensional differentiators) or common to only one dimensional rule set (e.g., full dimensional differentiators). Dimensional differentiators can act as selectors for the contexts, as the presence or lack of presence of a particular dimensional differentiator can be indicative of which context a member of a data set would fall within. Finally, the canonical rule set can be presented in a fashion that allows the dimensional differentiators to be distinguished from the common nodes. In some embodiments, each dimensional differentiator can be color-coded or visually distinct to show association with a particular context (e.g., red or vertically hatched nodes belong to a first context, while blue or horizontally hatched nodes belong to a second context). In further embodiments, common nodes can be presented with visual features that are a combination of the visually distinguishing marks of each context to which the common node is common (e.g., purple or cross hatched common nodes can be a combination of red and blue nodes or vertically and horizontally hatched nodes). In some embodiments, dimensional differentiators and common nodes can be visually distinguishable solely based on spacing or positioning (e.g., horizontal or vertical spacing) within a space (e.g., on a computer display or printed document).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

Figure 1B:
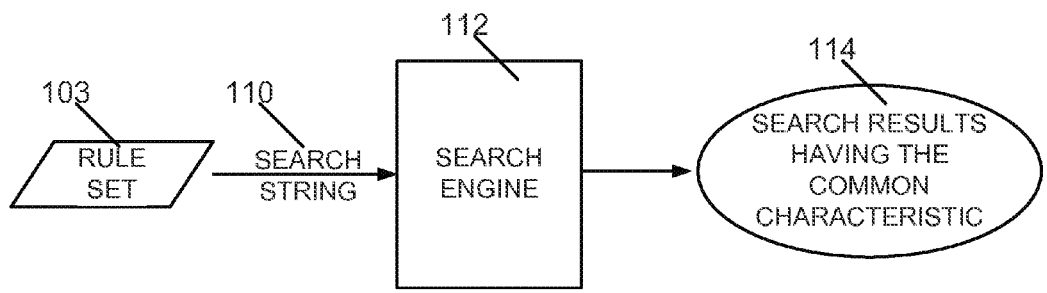

FIGS. 1A and 1B depict example applications of a rule set 102 generated by a rule generation engine. In FIG. 1A, the rule set 102 is used as a component of a computer-implemented file classification engine 104. The computer-implemented file classification engine 104 may be used to automatically classify data files 106 under one or more different categories. Multiple data files classified under a particular category may thus have a common characteristic (i.e., a common subject matter). The rule set 102 used as part of the file classification engine 104 includes one or more rules configured to identify features of the data files 106 that are relevant to or typical of data files having the common characteristic. The file classification engine 104 receives as inputs the unknown, unclassified data files 106 (e.g., articles, book chapters, webpages, reports containing financial data, medical histories, reports containing genetic data for an individual). As output, the classification engine 104 generates one or more binary classifications for the input data files. The binary classifications are used to produce an output identifying which data files of the unknown, unlabeled data files 106 have a common characteristic 108. For example, a file classification engine related to financial markets may receive as inputs random, unlabeled newspaper articles related to a variety of Topics, and for each article, the classification engine may produce an output indicating whether the article relates to financial markets or not. The file classification engine related to financial markets may also be capable of producing more specific binary classifications (i.e., whether a given article relates to a particular market, such as the New York Stock Exchange). Using such a computer-implemented file classification engine, relevant newspaper articles can be located automatically, without a need for human intervention or requiring only minimal human intervention.

FIG. 1B depicts use of a rule set 103 to generate search strings 110 to be input into a search engine 112. The rule set 103 may include multiple individual rules, and each of the individual rules may function as a separate search string for the search engine 112. Alternatively, the multiple individual rules of the rule set 103 may be collectively included in the search string 110, with the different rules linked by "OR" operators, for example. Using the search string 110, the search engine 112 returns search results that possess a common characteristic 114. Use of the rule set 103 in this manner may be an efficient method of locating relevant documents on the Internet because the search string 110 based on the rule set 103 identifies key features that have previously been shown to be relevant to the common characteristic.

Figure 2:
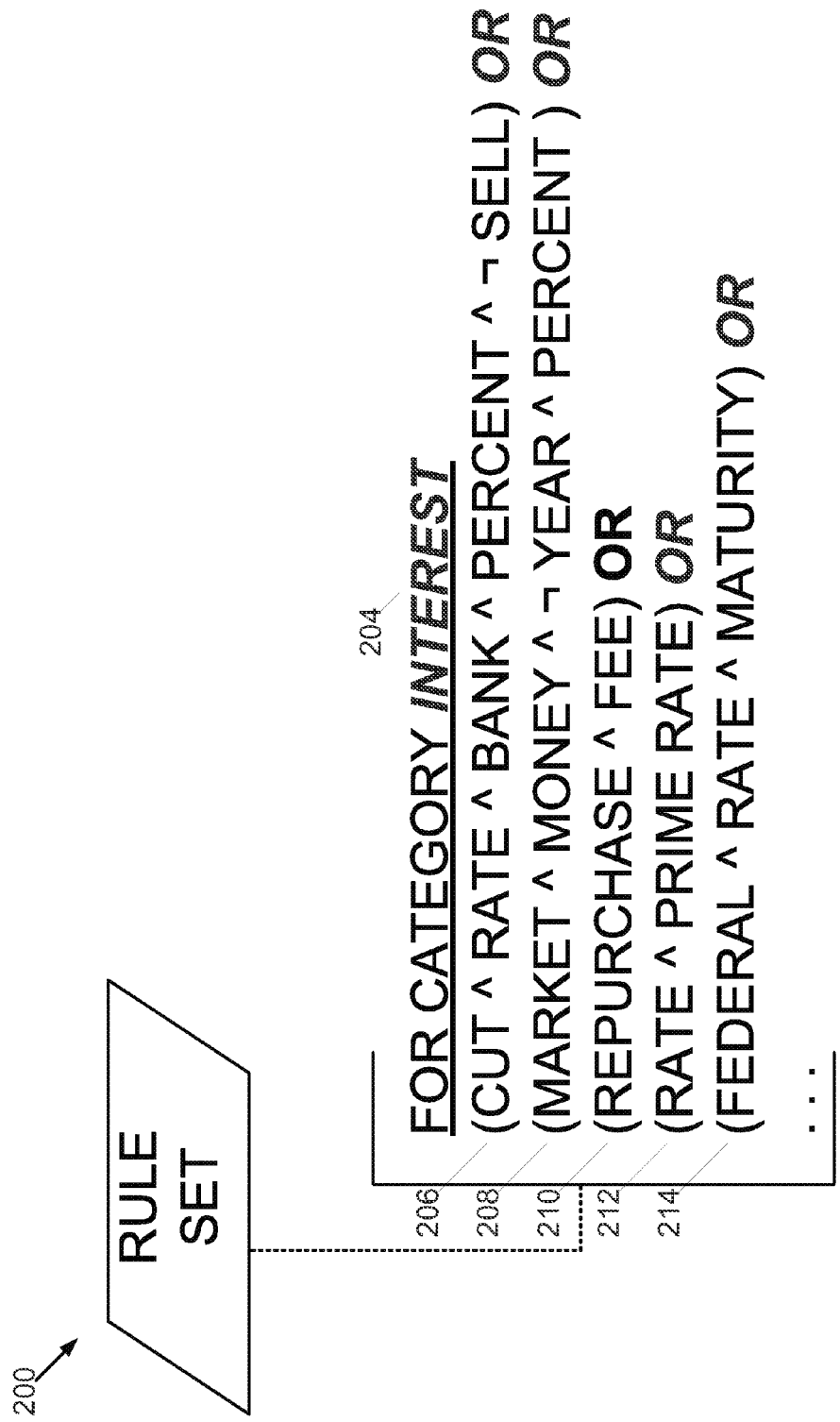
FIG. 2 depicts an example rule set used as part of a computer-implemented file classification engine.

FIG. 2 depicts an example rule set 200 used as part of a computer-implemented file classification engine. In FIG. 2, the rule set 200 is configured to make a binary determination as to whether an unknown, unlabeled file should be classified under a category "interest" 204. The rule set 200 of FIG. 2 includes multiple individual rules 206, 208, 210, 212, 214 conjoined by "OR" operators, such that an unlabeled file that satisfies at least one of the individual rules 206, 208, 210, 212, 214 is classified under the category "interest" 204. The individual rules 206, 208, 210, 212, 214 each include key terms linked by "AND" operators (denoted in FIG. 2 by the "^" symbol). Thus, a particular individual rule is satisfied only if each of its terms is satisfied in the unknown, unlabeled file. Further, particular rule terms are subject to the "NOT" operator (denoted by the "¬" symbol in FIG. 2), thus requiring that such particular terms not be found in the unlabeled file. Thus, for example, a particular file would be classified under the category "interest" 204 if it satisfies the rule 206 by including the words "cut," "rate," "bank," and "percent," and not including the word "sell." Further, if all terms of the rule 206 are not satisfied, the particular file may nevertheless still be classified under the category "interest," if one of the other rules 208, 210, 212, 214 are satisfied. In the example rule set 200, the terms included in the rules 206, 208, 210, 212, 214 may appear in any order and in any location in the unlabeled file.

To build a rule set similar to the example rule set 200 of FIG. 2, training data may be used to train a rule generation engine, which may be used to generate the rule set. The training data may include documents that have been manually reviewed by one or more humans or documents that have been reviewed using a computer algorithm. In one example, the one or more humans manually review training data documents and assign labels (i.e., categories, classifications) to the documents, indicating that documents labeled similarly have a common characteristic. With reference to the example of FIG. 2, the one or more humans may review a plurality of articles, and for each article, determine whether it relates to "interest" or not. By receiving and analyzing the human-labeled training documents, the rule generation engine may identify features of the training documents that are indicative of a document's relationship to a particular category. These identified features may be used to generate rule sets similar to that depicted in FIG. 2.

With reference again to FIG. 2, an example training of a rule generation engine may be performed as follows. The rule generation engine receives a set of labeled data files, where certain of the labeled data files are labeled as relating to the category "interest" 204 and certain of the labeled data files are labeled as not relating to the category. The data files may have been labeled as such by humans or by a computer algorithm. The rule generation engine analyzes the labeled files and may determine that when a document contains the terms "repurchase" and "fee" (as in rule 210 of FIG. 2), the document is always or nearly always labeled as being related to the "interest" category 204. Thus, the rule generation engine generates a rule 210: if an unknown, unlabeled document contains the terms "repurchase" and "fee," then categorize it as relating to the "interest" category 204. Other rules 206, 208, 212, 214 may be generated in this manner and conjoined to the rule set 200 using "OR" operators. The rule set 200 created by the rule generation engine may thereafter be used to determine whether future unknown, unlabeled files should be classified under the "interest" category 204 (e.g., as part of a file classification engine).

Figure 3:
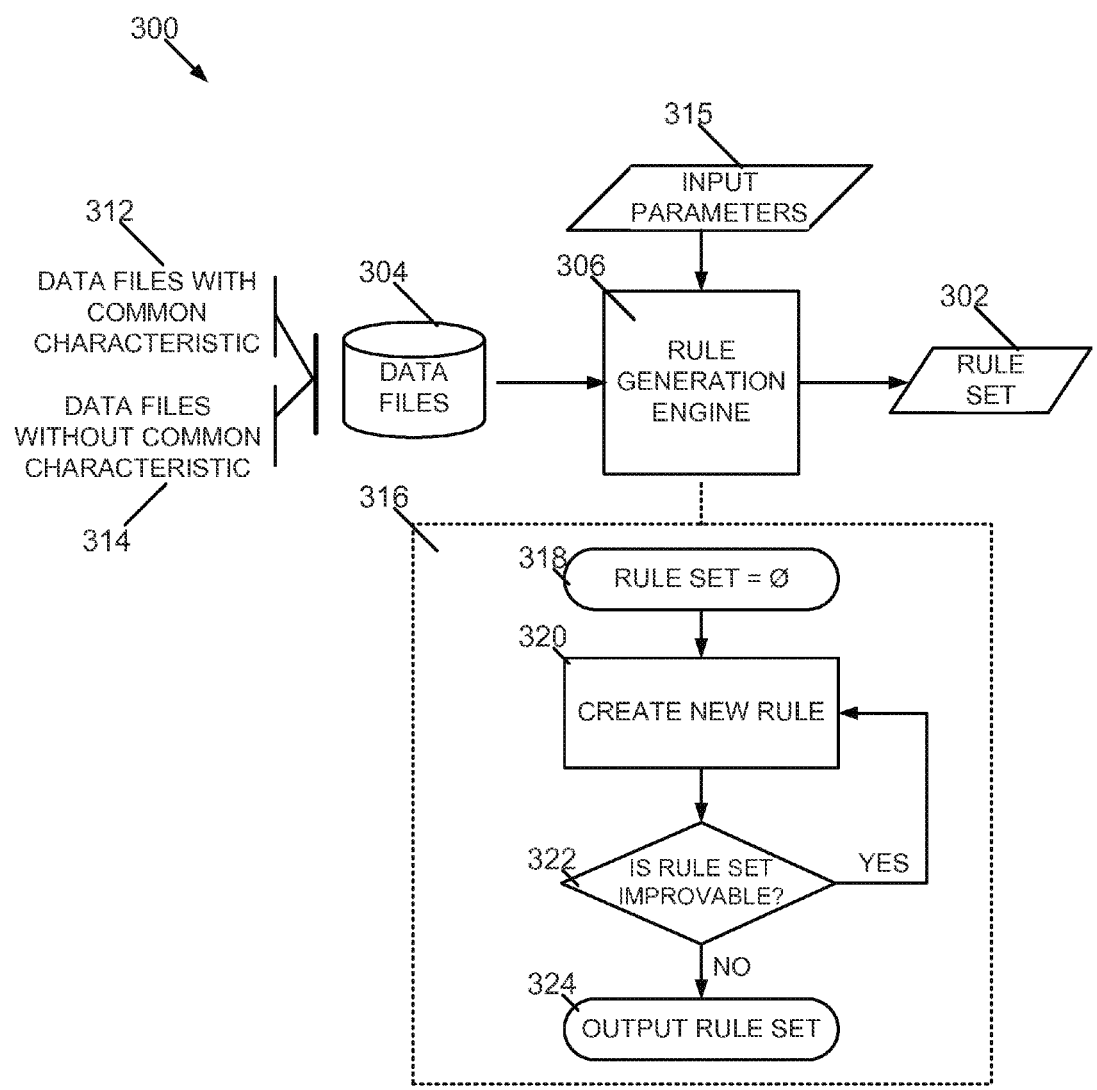
FIG. 3 is a block diagram of an example system for generating a rule set from a plurality of labeled data files.

FIG. 3 is a block diagram of an example system 300 for generating a rule set 302 from a plurality of labeled data files 304. In FIG. 3, the data files 304 may have been labeled by humans or a computer as relating to one or more categories and are used as training data for a rule generation engine 306. The data files 304 may include documents of various types (e.g., text documents, documents containing financial data, documents containing medical data). The labels applied to the data files 304 (e.g., by a human or a computer) identify certain data files as having a common characteristic 312 (i.e., they would be classified under a common category) and certain data files as not having the common characteristic 314. The common characteristic may vary across different document types. As illustrated in the example of FIG. 2, the common characteristic may be a particular subject matter for textual documents (i.e., all of the textual documents have a common theme or focus on a particular Topic). In another example where the data files 304 relate to financial information, the common characteristic may be an indication that a particular person is likely to default on a loan. Further, the common characteristic of the pre-labeled data files 304 may be defined broadly or narrowly. For example, the common characteristic can be that a document relates to sports, generally, or alternatively, the common characteristic can be that a document relates to a particular sporting event or to a particular athlete.

The labeled data files 304 and input parameters 315 may be received by the rule generation engine 306 and analyzed to generate the rule set 302. In particular, the rule generation engine 306 may perform steps 316 to generate the rule set 302. The steps 316 may include an iterative process whereby the rule set 302 is generated by adding rules one rule at a time until a stopping criterion is met. At 318, the steps 316 begin with a null rule set containing no rules. At 320, a new rule is created and added to the null rule set. As described in further detail below, the rules may be created based on the labeled data files 304 functioning as training data, such that the rule generation engine learns rules by analyzing features of the data files having the common characteristic 312 and not having the common characteristic 314. At 322, the stopping criterion is evaluated, where a determination is made as to whether the rule set is improvable. The evaluation of the stopping criterion 322 occurs after the addition of each and every rule in the iterative process 316. The stopping criterion determination 322 may be based, for example, on a precision and a recall of the rule set (e.g., an F1 score that is a harmonic mean of the precision and recall of the rule set) and whether adding an additional rule could improve the rule set when evaluating it under these measures.

If the rule set is improvable, another rule is created and added to the rule set at 320. As illustrated in the example of FIG. 2, the rule set 302 may be of a disjunctive normal form (DNF). The disjunctive normal form causes rules added to the rule set 302 to be linked by "OR" operators and the selected key terms of each rule to be linked by "AND" operators. The iterative process of adding rules to the rule set 320 one rule at a time and checking the stopping criterion 322 continues until the rule set is not improvable, such that at 324, the rule set 302 is output. As described in further detail below, the iterative process steps 318, 320, 322, 324 may utilize the input parameters 315 and data files 304 received by the rule generation engine 306 in creating and evaluating potential rules for the rule set 302. In particular, distinctions between the data files labeled as possessing the common characteristic 312 and those labeled as not possessing the common characteristic 314 are analyzed to determine if a potential rule satisfies a rule evaluation metric. The rule evaluation metric may determine a relevancy of the potential rule to the data files labeled as possessing the common characteristic 312. Input parameters 315 may be used, for example, to determine if the relevancy of the potential rule to the data files labeled as possessing the common characteristic 312 meets a baseline amount of relevancy required by the rule evaluation metric.

Figure 4:
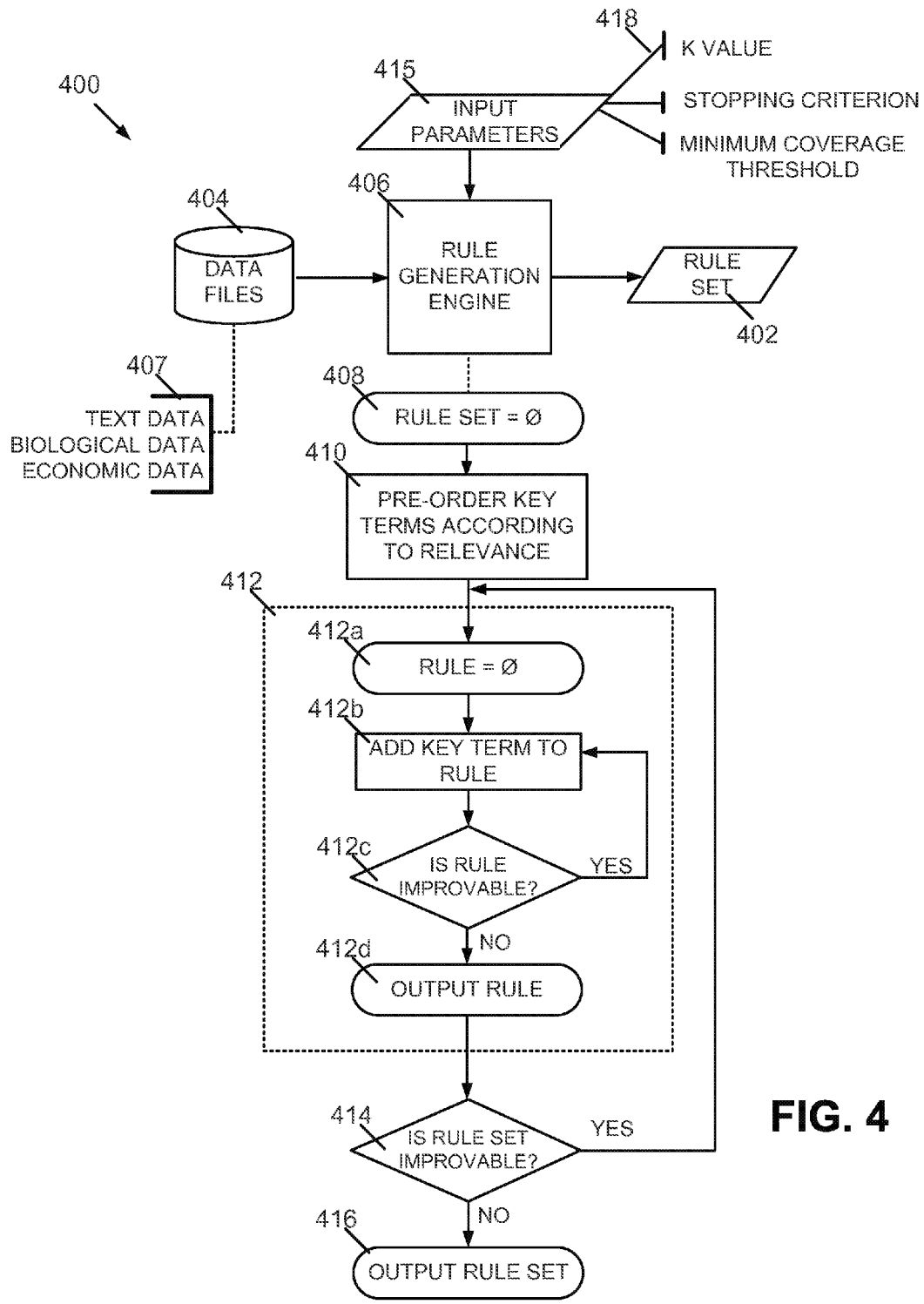
FIG. 4 is a block diagram of another example system for generating a rule set from a plurality of labeled data files.

FIG. 4 is a block diagram of another example system 400 for generating a rule set 402 from a plurality of labeled data files 404. Similar to FIG. 3, the labeled data files 404 are used as training data for a rule generation engine 406, with certain of the data files 404 being labeled as relating to a particular common characteristic (i.e., category) and certain of the data files being labeled as not relating to the particular common characteristic. As in the example system of FIG. 3, the rule generation engine 406 uses the labels to identify features (i.e., words, numbers, purchases, patterns, genes, medical data) indicating that a particular data file is related to the common characteristic.

The labeled data files 404 of FIG. 4 may be of different types and may include, for example, text data, biological data, and/or economic data 407. The particular type of data included in the data files 404 affects the function that the rule set 402 is configured to perform. For example, if the data files 404 include text documents (i.e., articles, webpages), the rule set may be configured to perform a text categorization function and/or to generate search strings for a search engine, as illustrated in FIGS. 1A and 1B. If the data files 404 include biological data, the rule set 402 may be configured to make a determination as to whether an individual is likely to develop a particular medical condition. When the data files 404 include such biological data, rules in the rule set 402 may include DNA data, RNA data, or genomic data. If the data files 404 include economic data, the rule set 402 may be configured to make a determination as to whether an individual is likely to purchase an item or default on a loan. When the data files 404 include such economic data, the rules included in the rule set 402 may include purchasing data, stock market data, financial data, loan data, or credit history data. The data files 404 may be data encoded in a sparse format. Thus, aside from the text data, biological data, and economic data 407 illustrated in FIG. 4, the data files 404 may include other types of sparse data.

Using the labeled data files 404 as input, the rule generation engine 406 may perform steps 408 through 416 to generate the rule set 402. The steps 408 through 416 include two main processes, one being a rule set generation process and the other being a rule generation process 412. Both of the main processes may be iterative processes, and the rule generation process 412 may be a nested, inner process that occurs within an iteration of the outer, rule set generation process. In the rule set generation process, rules are generated one rule at a time, and after a generated rule has been added to the rule set 402, a first stopping criterion is evaluated to determine if rule generation steps should be repeated to add another rule to the rule set 402. Similarly, the rule generation process is used to join terms together to generate a single rule, and this process may involve adding terms to the rule one term at a time and evaluating a second stopping criterion to determine if further terms should be added to the rule.

At 408, the rule set generation process begins with a null rule set containing no rules. At 410, prior to generating a rule, a set of key terms are ordered based on each key term's relevance to a particular common characteristic (i.e., category, classification). The key terms may be words, phrases, numbers, amounts of money, or genes, for example, and may have been extracted from the labeled data files 404 or generated from other, external sources. From the ordered list of key terms, key terms are selected and included as constituent parts of a rule. The ordering based on relevance performed in the step 410 is used such that when generating a rule, the most promising terms may be evaluated first.

At 412, steps of the rule generation process are used to generate a single rule. The rule generated as a result of the rule generation steps 412 may be added to the rule set 402 if it satisfies a particular rule evaluation metric. If the generated rule satisfies the rule evaluation metric and is added to the rule set 402, at 414, a determination is made as to whether the rule set 402 is improvable (i.e., whether adding another rule to the rule set 402 could potentially increase a performance of the rule set). If the rule set 402 is determined to be improvable, the steps 412 of the rule generation procedure are performed again to add another rule to the rule set 402. In this way, the rule generation process is an iterative process, where rules are added one at a time to the rule set 402, and the process is repeated only if a stopping condition is not met. If the rule set is determined to be not improvable (i.e., the stopping condition is met), at 416, the rule set 402 is output.

The steps 412 of the rule generation process, which are used to generate a single rule to be potentially added to the rule set 402, also include an iterative process. The iterative process of the rule generation steps 412 form a nested, iterative process within the outer steps of the iterative rule set generation process. At 412a, the rule generation process begins with a null rule containing no terms. At 412b, a key term from the ordered list of key terms is added to the null rule. As described in further detail below with respect to FIG. 6, the key term is added to the rule only if it satisfies a term evaluation metric. At 412c, after adding the key term to the rule, a determination is made as to whether the rule is improvable (i.e., whether adding additional key terms could potentially improve a performance of the rule). If the rule is improvable, another key term is added to the rule at 412b. If the rule is not improvable, at 412d, the rule is output. As noted above with respect to the rule set generation steps, the generated rule is added to the rule set 402 only if it satisfies the rule evaluation metric.

One or more input parameters 415 received by the rule generation engine 406 may affect the execution of the rule set generation steps and the rule generation steps. The input parameters 415 may include, for example, a "k" value, a stopping criterion, and/or a minimum coverage threshold 418. The k value may be used to implement a "k-best" search strategy for adding rules to a rule set and for adding terms to a rule. As described in greater detail below with respect to FIGS. 5 and 6, a rule or term may be included in a rule set only if it is better than a predetermined number of other rules or terms, respectively. Thus, the variable k included in the input parameters may be used to specify this predetermined number of other rules or terms. The stopping criterion value of the input parameters 415 may define under what conditions the iterative rule set and rule generation processes are to be exited. For example, for the rule set generation process, the stopping criterion may specify that if a performance of the rule set would not improve by at least a particular amount by adding another rule, then further rules should not be added to the rule set, and the iterative rule set generation process should be exited. The minimum coverage threshold variable of the input parameters 415 may be used to ensure that a rule to be added to the rule set 402 covers a predetermined number of data files. By requiring that the minimum coverage threshold is met, overfitting and overly-specific rules that do not generalize well to different data files may be avoided.

Other input parameters 415 that may be used in the system 400 include an m-estimate value and a maximum p-value parameter. The m-estimate value is used to estimate how much a distribution of a term changes between training and test data. This value is used to adjust for selection bias by punishing long rules (i.e., rules with many terms included) and rules that contain terms that occur rarely and that may not generalize well to data from different sources. The m-estimate value is thus used to handle noise in input data and to avoid overfitting of the input data by taking into account an applicability of a potential rule to data not included in the input data. The maximum p-value parameter is a maximum p-value for considering a term as a rule or for adding a term to an existing rule, where the p-value refers to a probability that a term is not relevant in determining whether a document should be identified as having a common characteristic. In some examples, the maximum p-value parameter has a value of between 0.01 to 0.000001.

Figure 5:
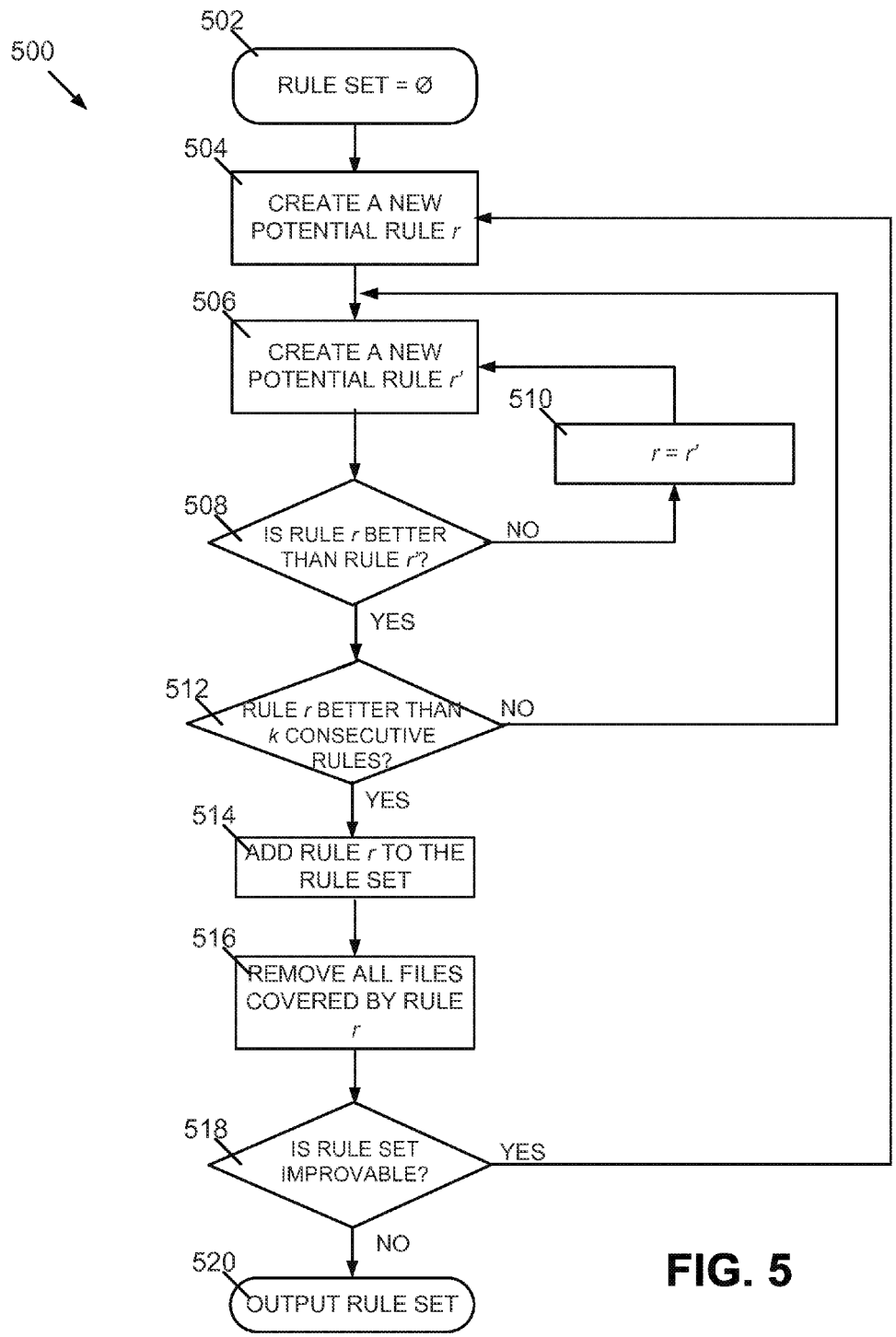
FIG. 5 is a flowchart depicting example steps of a rule set generation process used to generate a rule set.

FIG. 5 is a flowchart depicting example steps of a rule set generation process 500 used to generate a rule set. The rule set generation steps define an iterative process, where rules are generated and added to the rule set one at a time, and the rule generation steps are thereafter repeated only if a stopping criterion is not met. As described in further detail below, the rule set generation process is based on a k-best search scheme, where a particular rule is added to the rule set only if it is better than k consecutive rules generated after the generation of the particular rule.

The rule set generation process of FIG. 5 begins at 502 with a null rule set containing no rules. At 504, a potential rule r is generated, and at 506, a potential rule r' is generated. Potential rules r and r' may be generated, for example, using the rule generation process described below with respect to FIG. 6. Potential rules r and r' may each be added to the rule set if they each satisfy a rule evaluation metric. The rule evaluation metric may be used to evaluate a relevancy of the potential rules r and r' to a set of training data containing one or more data files having a common characteristic and one or more data files not having the common characteristic.

Steps of the rule evaluation metric begin at 508, where a determination is made as to whether rule r is better than rule r'. Rule r is better than rule r' if rule r has a higher rule relevancy to the one or more data files having the common characteristic. The rule relevancy of the potential rule may be based on a precision and a recall of a rule set including the potential rule. The precision of a rule set may be defined according to:

$$Precision = tp/(tp+fp),$$

where tp is a true positive and fp is a false positive produced by the rule when being evaluated using training data. Thus, generally, the precision refers to the fraction of training data documents classified by a rule that have been classified correctly. The recall of a rule set may be defined according to:

$$Recall = tp/(tp+fn),$$

where fn is a false negative produced by the rule when being evaluated using training data, and tp is defined as above. Recall thus refers to the fraction of relevant training data documents that were identified by the rule.

In one example, the rule relevancy of a potential rule is based on an F1 score, where the F1 score is a harmonic mean of the precision and the recall and may be defined according to:

$$F1=2\cdot(\text{precision}\cdot\text{recall})/(\text{precision}+\text{recall}).$$

In this example, rule r is better than rule r' only if rule r has a higher F1 score than rule r'.

If rule r is determined at 508 to not be better than rule r', at 510, variable r is set equal to variable r', and a new potential rule r' is generated at 506. In this manner, because rule r was determined to not be better than rule r', original rule r is effectively removed from further consideration for inclusion in the rule set. Original rule r' (now labeled as rule r after step 510) is then evaluated under the steps of the rule evaluation metric, beginning at 508 with its comparison to the new potential rule r'.

If potential rule r is determined to be better than potential rule r', at 512, a determination is made as to whether potential rule r is better than k consecutive potential rules that were generated subsequent to the generation of rule r. Step 512 thus implements a "k-best" search strategy, where the potential rule r will be added to the rule set only if it is better than k consecutive rules generated after the generation of the potential rule r. The k-best determination as to whether potential rule r is better than k consecutive rules may be based on the F1 score described above, where the F1 score is a harmonic mean of the precision and the recall of the rule set. If the potential rule r has not been compared to and determined to be better than k consecutive rules generated subsequent to its generation, the process returns to step 506, where a new potential rule r' is generated and subsequently compared to potential rule r at 508.

After potential rule r has been compared to and determined to be better than k consecutive rules at 512, potential rule r is added to the rule set at 514. At 516, after adding the rule r to the rule set, all of the files of the training data files that are covered by the potential rule r are removed from the set of training data files. Files covered by potential rule r may include those files that would be identified as possessing the common characteristic by the rule r, as well as those that would be affirmatively identified as not possessing the common characteristic by the rule r.

After adding the rule r to the rule set and removing data files covered by the rule r, at 518, a determination is made as to whether the rule set is improvable. This determination may function as a stopping criterion for the rule set generation process, such that subsequent rules are added to the rule set only if the stopping criterion is not met. The determination 518 as to whether the rule set is improvable may be based on the rule set's F1 score. In one example, the rule set may be determined to be not improvable when adding another rule cannot produce a statistically significant improvement in the rule set's F1 score. The stopping criterion may be adjusted based on a precision required by an application or based on other characteristics of the application. If the rule set is determined to be improvable, a new potential rule r is generated at 504, and the steps of the rule evaluation process are repeated. If the rule set is determined to not be improvable, the rule set is output at 520.

In some examples, the stopping criterion is based on an adjusted F1 score, where the adjusted F1 score is the harmonic mean of adjusted precision and adjusted recall. The adjusted precision value is defined according to the following equation:

$$\text{Adjusted\_precision}=(tp+m\_\text{estimate}*cat\_\text{frequency})/(tp+fp+m\_\text{estimate}),$$

where the m-estimate value estimates how much a distribution of a term changes between training and test data and cat_frequency is the sample occurrence of a category under consideration. The adjusted recall value is defined according to the following equation:

$$\text{Adjusted\_recall}=(tp+m\_\text{estimate}*cat\_\text{frequency})/(tp+fn+m\_\text{estimate}).$$

The adjusted F1 score is defined according to the following equation:

$$F1\_\text{adj}=2\cdot(\text{adjusted\_precision}\cdot\text{adjusted\_recall})/(\text{adjusted\_precision}+\text{adjusted\_recall}).$$

When the stopping criterion is based on the adjusted F1 score, the rule set is determined to be not improvable when adding another rule cannot produce an improvement in the rule set's F1_adj score.

Figure 6:
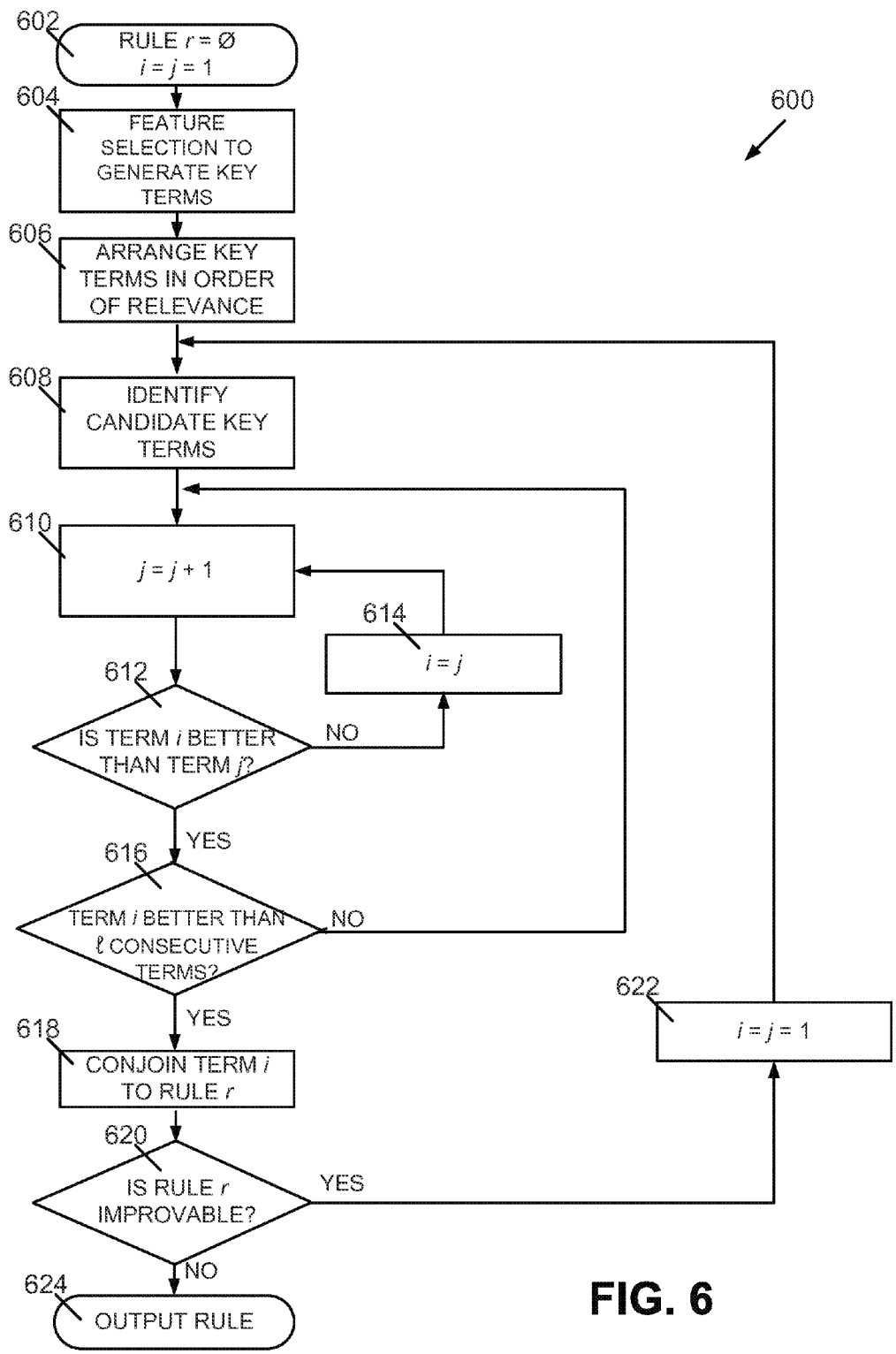
FIG. 6 is a flowchart depicting example steps of a rule generation process used to generate a potential rule for inclusion in a rule set.

FIG. 6 is a flowchart depicting example steps of a rule generation process 600 used to generate a potential rule for inclusion in a rule set. With reference to FIG. 5, steps 504 and 506 require the generation of potential rules r and r', respectively. These rule generation steps 504, 506 may each utilize steps 602 through 624 of FIG. 6, which together define an iterative rule generation process. Thus, the iterative rule generation steps 602 through 624 of FIG. 6 may function as a nested inner loop of the iterative rule set generation process illustrated in FIG. 5.

The rule generation process 600 of FIG. 6 begins at 602 with a null rule including no terms. At 602, variables i and j, used throughout the steps of FIG. 6, are both set equal to one. At 604, a feature selection step is performed in order to generate key terms to be included in rules. A rule includes one or more key terms, where each of the key terms of the rule is linked by "AND" operators. Thus, to generate rules, key terms that can potentially be included in the rules are first generated. In one example, the feature selection step 604 may be performed by extracting all words, numbers, symbols, and/or other data pieces from the training data files (e.g., data files 304 of FIG. 3, data files 404 of FIG. 4). For example, when the training data files used for generating the rule set consist of English-language text, the feature selection step 604 may simply extract and isolate all words from the training data files, such that each word may thereafter be a key term that could potentially be added to a rule.

At 606, the generated key terms are ordered based on each term's relevance to a particular common characteristic of the training data files (i.e., a category or classification). In one example, a key term's relevance to the common characteristic may be based on an information gain or g-score metric. Information gain may be defined according to:

$$\text{Gain}(r_{i+1}, r_i) = T_{i+1}^+ \cdot \left(-\log_2 \frac{T_i^+}{T_i^+ + T_i^-} + \log_2 \frac{T_{i+1}^+}{T_{i+1}^+ + T_{i+1}^-}\right),$$

where $T_i^+$ is the number of positive examples of the training data files covered by the list with the addition of a particular key term to the list, and $T_i^-$ is the number of negative examples of the training data files covered by the list with the addition of the particular key term to the list. The g-score is a likelihood ratio statistic that may be defined according to:

$$G = 2\sum_i O_i \log\left(\frac{O_i}{E_i}\right),$$

where Oi is a number of observed examples of the training data files covered by the list, and Ei is a number of expected examples of the training data files covered by the list. Terms that have a higher information gain or g-score with respect to the common characteristic may be determined as being of higher relevance to the common characteristic and may be ordered higher within the list. Pre-ordering key terms in this manner may ensure that the most promising terms are evaluated first and help to avoid missing suitable terms for a rule. At 608, candidate key terms are identified from the list. This step may be used to identify a starting place within the list. For example, upon an initial iteration of the steps of FIG. 6, the candidate terms will be those terms ordered highest within the list. However, upon subsequent iterations, with the terms ordered highest within the list previously evaluated, the candidate terms to be evaluated in a particular iteration may be found lower in the list.

To begin the rule generation process, at 610, variable j is incremented by 1. Variables i and j in FIG. 6 may be index numbers that refer to particular positions within the list of key terms. Thus, following step 610, with variable i equal to 1, and variable j equal to 2, term i may refer to a term at position 1 in the list (i.e., the term determined to be most relevant to the category or classification based on information gain or g-score), and term j may refer to a term at position 2 in the list. Terms i and j may each be part of a generated rule if they each satisfy a term evaluation metric. The term evaluation metric is used to evaluate a relevancy of the terms i and j to a set of training data containing one or more data files having a common characteristic and one or more data files not having the common characteristic.

At 612, a determination is made as to whether term i is better than term j. Term i is better than term j if term i has a higher term relevancy to the one or more data files having the common characteristic. Term relevancy may be based on one or more criteria. In one example, the term relevancy is based on a combined criteria, where a first term is better than a second term if (1) the addition of the first term to the rule results in a rule with a statistically significant higher g-score than a rule created by adding the second term, (2) the addition of the first term to the rule results in a rule that meets a minimal coverage requirement, and (3) the addition of the first term to the rule results in a rule with a higher precision than a rule created by adding the second term. In another example, the term relevancy of a particular term is based on a precision or purity of a rule including the potential term, where the purity of the rule is a measure derived from the precision of the rule that is based on a presumed error measure in the precision.

If term i is determined at 612 to not be better than term j, at 614, variable i is set equal to variable j, and j is again incremented by a value of 1 at 610. Thus, because term i was determined to not be better than term j, original term i is effectively removed from further consideration for inclusion in the rule. Original term j (now labeled as term i after step 614) is then evaluated under the steps of the term evaluation metric, beginning at 612 with its comparison to the new term j.

If term i is determined at 612 to be better than term j, at 616, a determination is made as to whether term i is better than l consecutive terms in the ordered list. Similar to the "k-best" search strategy used in the rule set generation process of FIG. 5, the rule generation process of FIG. 6 utilizes an "l-best" search strategy, where the term i will be conjoined to the rule r only if it is better than l consecutive terms following it in the ordered list. The l-best determination as to whether term i is better than l consecutive terms may be based on the same measures described above with respect to step 612. If the potential term i has not been compared to and determined to better than l consecutive terms following it in the list, the process returns to step 610, where variable j is incremented and the new term j is subsequently compared to term i at 612. The l-best search strategy may be used to reduce the size of the search space and to disallow term addition that does not provide a statistically significant improvement in the rule.

Aside from the l-best search strategy criterion for adding rules, further rule criteria may be applied. For example, an "m-estimate" criterion may be used to adjust for selection bias by punishing long rules (i.e., rules with many terms included) and rules that contain terms that occur rarely and that may not generalize well to data from different sources. The m-estimate criterion accomplishes this by estimating how much a distribution of a term changes between training and test data and by adjusting the calculated precision value based on this determination. The m-estimate value is thus used to handle noise in input data and to avoid overfitting of the input data by taking into account an applicability of a potential rule to data not included in the input data. An adjusted precision value, calculated using the m-estimate value, is defined according to the following equation:

$$\text{Adjusted\_precision} = (tp + m\_\text{estimate} * cat\_\text{frequency}) / (tp + fp + m\_\text{estimate}),$$

where tp is a number of items correctly categorized by a rule (i.e., true positive), fp is a number of items incorrectly categorized by the rule (i.e., false positive), and cat_frequency is a sample occurrence for a category under consideration. The m-estimate value is generally an integer of 1 or greater, and in some examples, an m-estimate value of between 2 and 32 is used.

Additionally, a minimal positive document coverage criterion may be applied to a rule before adding it to the rule set. This criterion may require a rule to cover at least a predefined number of positive documents, which may help to avoid generating over-specific rules. This criterion may also effectively shorten the search path and improve generalization of the created rules.

After term i has been compared to and determined to be better than l consecutive terms following it in the ordered list at 616, term i is conjoined to the rule r at 618. At 620, after adding the term i to the rule, a determination is made as to whether the rule r is improvable. The determination 620 of whether the rule r is improvable is a second stopping criterion that is met when selecting another potential term for inclusion in the rule r cannot improve a purity or precision of the potential rule. If the rule r is determined to be improvable, at 622, the variables i and j are set equal to one and the process returns to step 608, where a new set of candidate terms are identified, such that another term can be added to the rule r. If rule r is determined to not be improvable, at 624, rule r is output.

As noted above, the example rule generation steps of FIG. 6 may be used as a nested, inner loop within the example iterative rule set generation process of FIG. 5. Thus, after a rule has been generated pursuant to the steps of FIG. 6, it may thereafter be evaluated under the rule evaluation metric of FIG. 5 (i.e., determinations 508, 512) and added to the rule set if the rule evaluation metric is satisfied.

FIG. 7 is a table 700 depicting a generation of a rule set by adding rules one at a time to the rule set. In the table 700 of FIG. 7, each row includes a rule 702, a precision value 704 for the rule set, a recall value 706 for the rule set, and an F1 value 708 for the rule set. Each row of the table 700 represents an addition of the rule 702 to the rule set and the effect that the addition of the rule 702 has on the precision 704, recall 706, and F1 value 708 of the rule set. Pursuant to the example rule set generation steps of FIG. 5, rules 702 that satisfy a rule evaluation metric are added to the rule set one at a time, and a stopping criterion is evaluated after the addition of each rule 702 to determine if the rule set is improvable. In the example of FIG. 7, as each rule 702 is added to the rule set, the precision 704 of the rule set decreases, the recall 706 of the rule set increases, and the F1 score 708 of the rule set increases.

FIG. 8 is a table 800 depicting a number of potential rules 802 for a rule set and a selection 803 of a particular potential rule 804 for the rule set. As discussed above with respect to FIG. 5, a potential rule may be added to the rule set if it satisfies a "k-best" rule evaluation metric, which requires that the particular rule to be added to the rule set be better than k consecutive rules generated subsequent to the generation of the particular rule. The determination of whether the particular rule is better than the k consecutive rules may be based on an F1 score of the rule set including the particular rule, such that the addition of the particular rule cause the rule set to have a higher F1 score than the addition of any of the other k consecutive rules.

The selection 803 of the particular potential rule 804 in FIG. 8 illustrates these concepts. In FIG. 8, the particular potential rule 804 is added to the rule set because, as versus the other potential rules 802, the addition of the particular potential rule 804 improves the F1 score 806 of the rule set the most. Thus, the particular potential rule 804 of FIG. 8 may have satisfied the k-best search strategy, enabling it to be added to the rule set.

FIG. 9 is a table 900 depicting an addition of terms 901 to a rule and a satisfaction of a stopping criterion 902 to discontinue the addition of further terms. As illustrated above with respect to FIG. 6, terms may be conjoined to a rule if they satisfy an "l-best" search strategy, which may require a term to be better than l consecutive terms of an ordered list of key terms. A term may be better than another term if it has a higher term relevancy to one or more data files having a common characteristic, where the term relevancy may be based on a purity or precision of a potential rule including the term. Thus, under such a process, terms are conjoined to the rule one at a time, and after addition of each term, a stopping criterion is evaluated to determine whether the rule could be improved with the addition of another term.

FIG. 9 illustrates the above concepts. In FIG. 9, a first row 904 represents a rule including one term. Subsequent rows 906, 908, 910, 912 illustrate the conjoining of terms to the rule, one term at a time. With the addition of each term, the precision 912 of the rule may increase. After each term is added, the stopping criterion 902 is evaluated. As illustrated in FIG. 9, the stopping criterion may be based on whether the rule can be improved by adding another term. After the addition of the rule of the bottom row 912, the stopping criterion 902 is satisfied because the rule cannot be improved by adding further terms.

Figure 10:
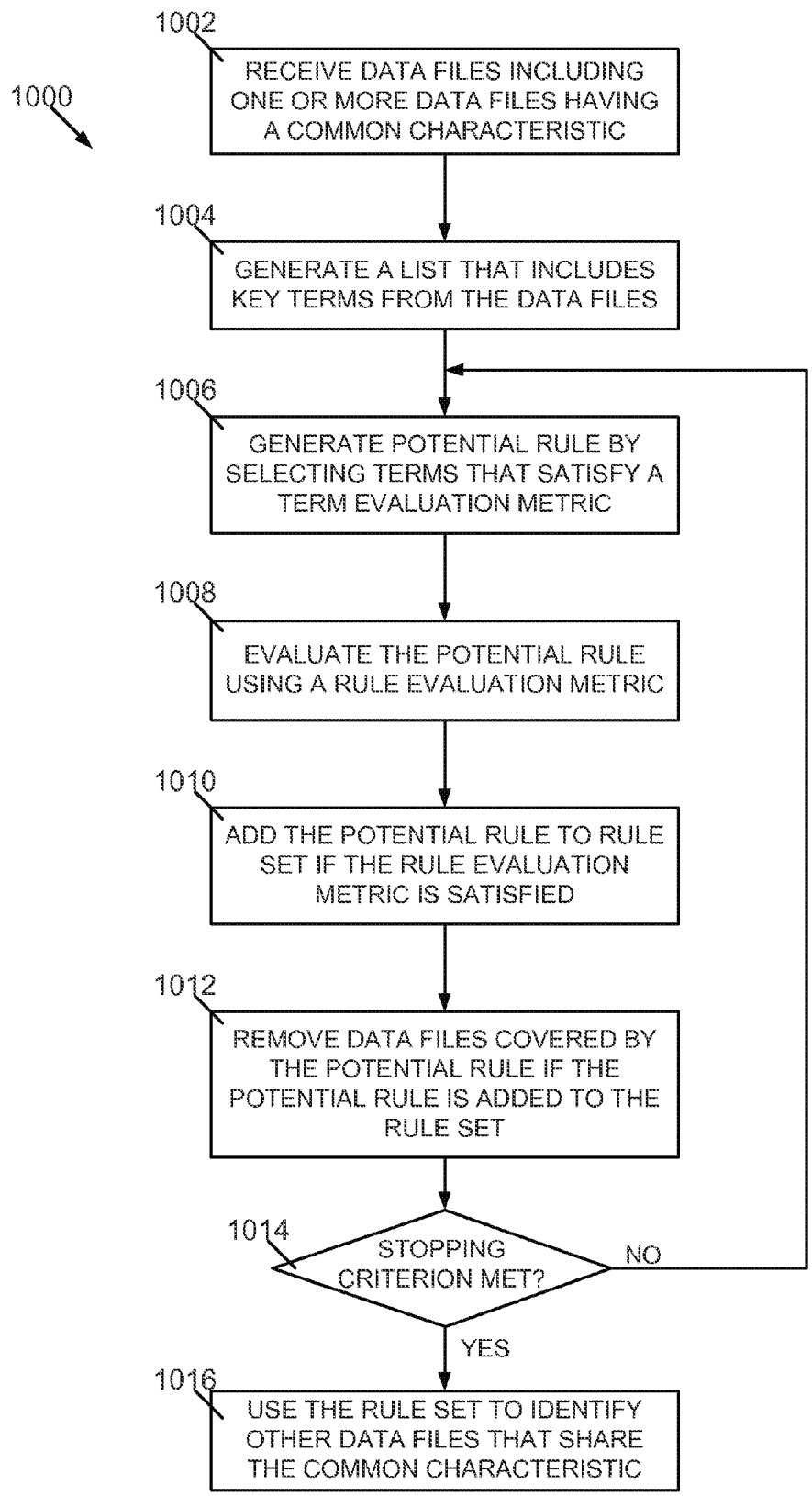
FIG. 10 is a flowchart illustrating an example method for identifying data files that have a common characteristic.

FIG. 10 is a flowchart illustrating an example method for identifying data files that have a common characteristic. At 1002, a plurality of data files are received, where the plurality of data files include one or more data files having a common characteristic. At 1004, a list including key terms from the plurality of data files is generated, and the list is used to generate the rule set. The rule set is generated according to steps 1006 through 1014. At 1006, a potential rule is generated by selecting one or more key terms from the list that satisfy a term evaluation metric. At 1008, the potential rule is evaluated using a rule evaluation metric that determines a relevancy of the potential rule to the one or more data files having the common characteristic. At 1010, the potential rule is added to the rule set if the rule evaluation metric is satisfied. At 1012, data files covered by the potential rule are removed from the plurality of data files if the potential rule is added to the rule set. At 1014, a stopping criterion is evaluated. If the stopping criterion is not met, steps 1006 through 1012 are repeated to add another rule to the rule set. If the stopping criterion is met, at 1016, the rule set is output and used to identify other data files that have the common characteristic.

Figure 11A:
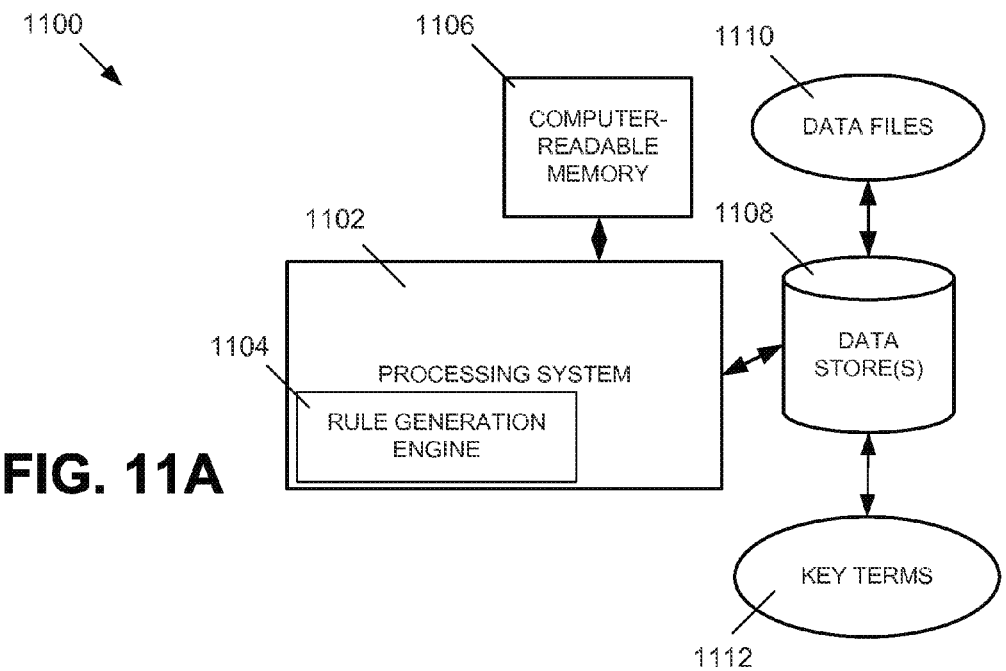
FIGS. 11A-D are block diagrams of example systems as described herein.
Figure 11B:
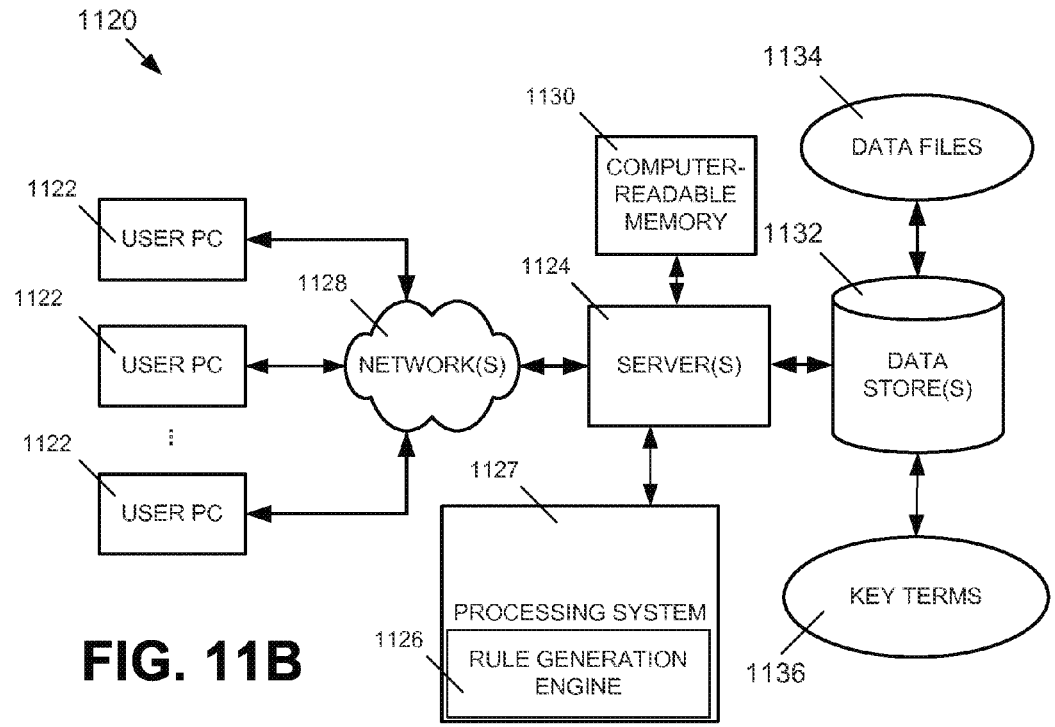
Figure 11C:
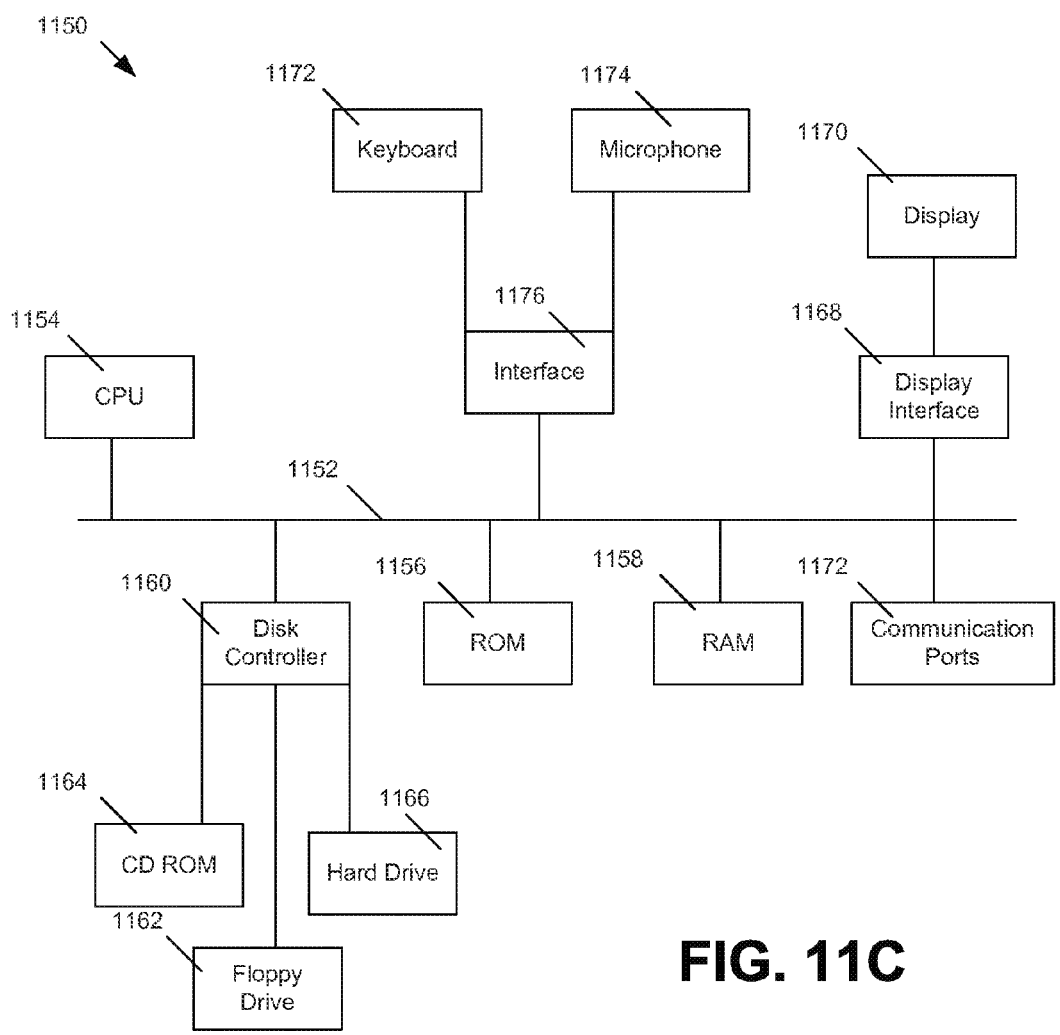

FIGS. 11A, 11B, and 11C depict example systems for use in implementing a rule generation system. For example, FIG. 11A depicts an exemplary system 1100 that includes a standalone computer architecture where a processing system 1102 (e.g., one or more computer processors located in a given computer or in multiple computers that may be separate and distinct from one another) includes a rule generation engine 1104 being executed on it. The processing system 1102 has access to a computer-readable memory 1106 in addition to one or more data stores 1158. The one or more data stores 1158 may include data files 1110 as well as key terms 1162. The processing system 1102 may be a distributed parallel computing environment, which may be used to handle very large-scale data sets.

FIG. 11B depicts a system 1120 that includes a client server architecture. One or more user PCs 1122 access one or more servers 1124 running a rule generation engine 1126 on a processing system 1127 via one or more networks 1128. The one or more servers 1124 may access a computer-readable memory 1130 as well as one or more data stores 1132. The one or more data stores 1132 may contain data files 1134 as well as key terms 1136.

FIG. 11C shows a block diagram of exemplary hardware for a standalone computer architecture 1150, such as the architecture depicted in FIG. 11A that may be used to contain and/or implement the program instructions of system embodiments of the present disclosure. A bus 1152 may serve as the information highway interconnecting the other illustrated components of the hardware. A processing system 1154 labeled CPU (central processing unit) (e.g., one or more computer processors at a given computer or at multiple computers), may perform calculations and logic operations required to execute a program. A non-transitory processor-readable storage medium, such as read only memory (ROM) 1156 and random access memory (RAM) 1158, may be in communication with the processing system 1154 and may contain one or more programming instructions for performing the method of generating a rule set. Optionally, program instructions may be stored on a non-transitory computer-readable storage medium such as a magnetic disk, optical disk, recordable memory device, flash memory, or other physical storage medium.

A disk controller 1160 interfaces one or more optional disk drives to the system bus 1152. These disk drives may be external or internal floppy disk drives, external or internal CD-ROM, CD-R, CD-RW or DVD drives such as 1164, or external or internal hard drives 1166. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1160, the ROM 1156 and/or the RAM 1158. Preferably, the processing system 1154 may access each component as required.

A display interface 1168 may permit information from the bus 1152 to be displayed on a display 1170 in audio, graphic, or alphanumeric format. Communication with external devices may optionally occur using various communication ports 1172.

In addition to these computer-type components, the hardware may also include data input devices, such as a keyboard 1173, or other input device 1174, such as a microphone, remote control, pointer, mouse and/or joystick.

Use of a Transaction Classification System to Identify k-Best Association Rules A transaction classification system may use additional approaches to identify categorization rules, as well. From this point forward, this disclosure will describe and discuss these approaches. It is important to note that definitions, terminology, procedures described prior to this point in the document should not necessarily be used in interpreting the meaning of terminology used in the following paragraphs. In some cases, the following paragraphs will provide new or slightly varied definitions of terms used earlier in this document, and any such new or varied definitions should be understood as relevant from this point forward.

Association analysis has been used in a marketing context to identify products that are commonly purchased together as part of a single transaction. The problem of association rule mining is generally defined as: Let $I=\{i_1, i_2, \ldots, i_n\}$ be a set of n apt binary attributes called items. Let $D=\{t_1, t_2, \ldots, t_m\}$ be a set of transactions called the database. Each transaction in D has a unique transaction ID and contains a subset of the items in I. A rule is defined as an implication of the form $X \Rightarrow Y$ where and X, $Y \subseteq I$ and $X \cap Y = \emptyset$. The sets of items (for short itemsets) X and Y are called antecedent (left-hand-side or LHS) and consequent (right-hand-side or RHS) of the rule respectively.

We will be extending this notion to include rules that contain absence of items as well as presence of items. Furthermore, we will deal with looking at situations where a single consequent has been identified, known as Classification Association Rules (or CAR), and where the consequent might be a category not represented by an item, but another way of classifying that transaction.

During a training phase, a transaction classification system (also referred to as a categorization system) can use a depth-first search guided by a best-first metaheuristic to efficiently identify a set of useful association rules that can be formed from amongst a large collection of word items. More specifically, the system can identify a set of association rules that are evaluated to be most useful for categorizing transactions based on words found in or omitted from those transactions. The system can perform a highly-effective suboptimal search for association rules within a large search space that encompasses any number of the various association rules that can be formed from the unique items found in a set of training transactions, without necessitating constraints on the number of rule terms. In such search situations, the search methodology and metaheuristics enable the system to quickly and efficiently identify rules that reveal a strong evaluation score when tested, and thus achieve significant computational savings over exhaustive search alternatives.

The system uses the search in a training phase to identify useful association rules with respect to a particular category. From this point forward, the term category shall be understood to refer to a group of transactions that are related in some identifiable way. The term transaction shall be understood to refer to any discrete unit of study or analysis. For example, in a text mining context, the term transaction may be used to refer to pages, documents, sentences, webpages, books, articles, or other such units. In the context of credit card fraud detection, the use of the word "transaction" may refer to events involving a credit card account such as card purchases, account inquiries, online account resets, account closures, account applications, or any other such event.

The term "item" will refer to a characteristic or feature that can be found amongst some, but not all, transactions. For example, when the term "transactions" refers to credit card purchases in the fraud detection context, a set of relevant items could be understood to include, amongst many other things, the various businesses at which the credit card purchases are made and/or each of the individuals in whose name a utilized account has been opened.

The techniques that will be disclosed in the following paragraphs may be applicable in many contexts. For example, they may be applied to detecting health risks based on associations between items that include genome sequences. They may also be applied to detect criminal activity or terrorist affiliations based on websites visited.

Prior to the search being conducted, the system identifies the most important discriminative items for category membership used in the training transactions. Generally, only items that show a statistically significant relationship with the category are retained for use in building rules, and they are ordered by descending strength of that relationship. The system then attempts to selectively and incrementally add additional items in a conjunctive relationship to the given rules. An item is added to a rule if the new potential rule satisfies two constraints: it satisfies an precision enhancement heuristic, the addition of the item provides a statistically significant improvement in information gain. Eventually, the only rules that are retained are those that have the highest estimated precision to categorize transactions.

Figure 11D:
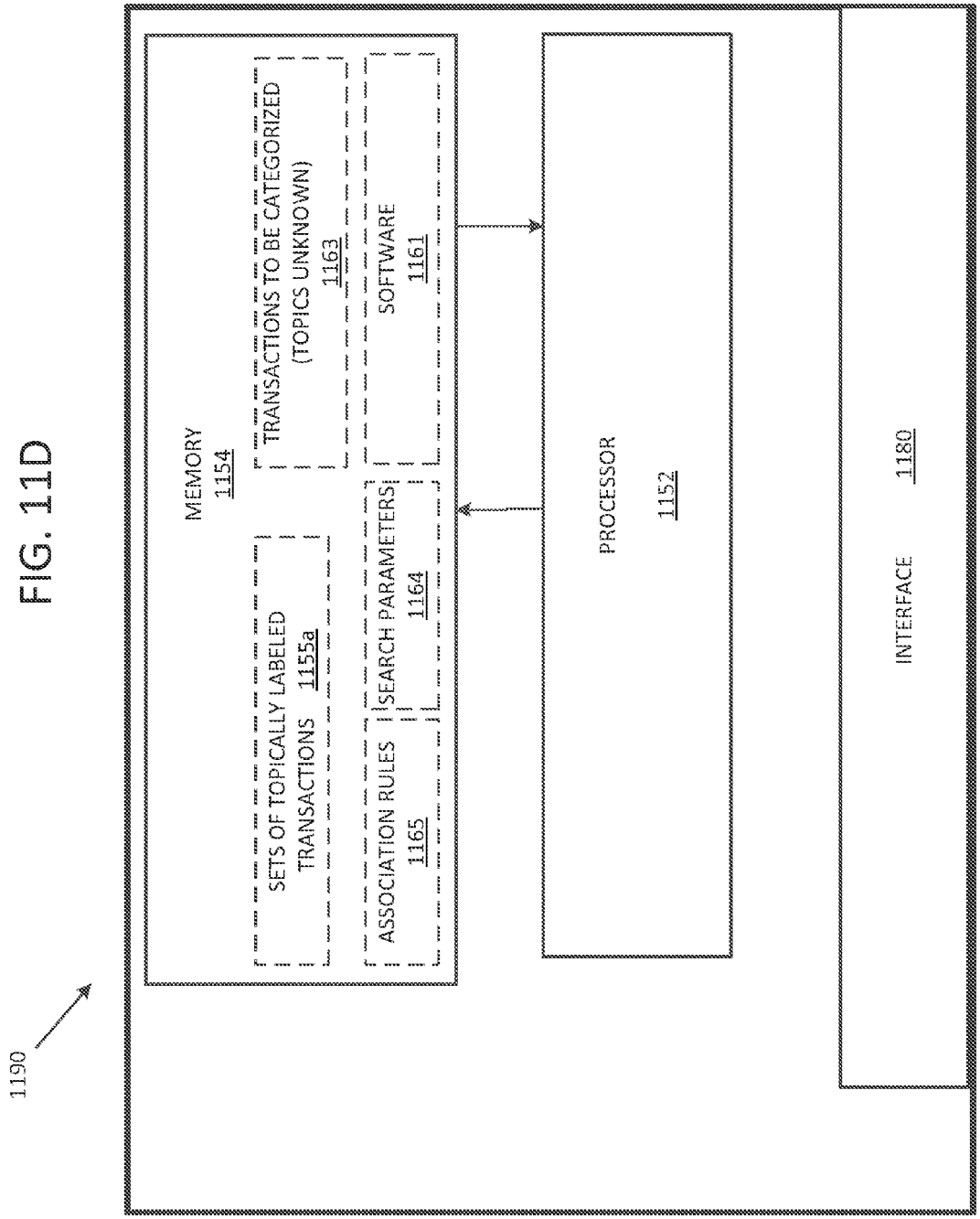

FIG. 11D is a block diagram of an example transaction classification system 1190. As depicted in FIG. 1, the transaction classification system 1190 includes a processor 1012 and a memory 1144. The memory 104 stores sets of training transactions 1155$a$ and software 1161 that can be executed by the processor.

The training documents 1155$a$ include categorization labels as will be described later. During training, the transaction classification system 1190 uses the training documents 1155$a$ to evaluate the usefulness of individual association rules in the detection of a specific category and to identify a group of the rules that are most useful in this regard. Any rules so identified can then be stored in memory 1144 so that they may later be used to detect the category when new or uncategorized transactions 1163 are analyzed.

The software 1161 includes instructions that are written to cause the processor to derive and evaluate association rules using the techniques and methods described in this disclosure. The software 1161 also includes instructions for graphically displaying the association rules that are determined to be most useful. The system 1190 can use the graphical display interface 1180 to recommend that the user select these association rules for later use in detecting the category when they system 1190 classifies transactions 1163 or other transactions yet to be received by the system 1190.

A user can control the selection inputs to eliminate association rules that the user does not consider useful. This situation may occur when two distinct issues are referred to by the same term. For example, in identifying association rules for detecting the category golf (the sport) in a set of documents, the transaction classification system 1190 may include rules representing Golf as a Volkswagen sedan. The user would then not want to include those rules.

The selection inputs can be provided by the user at an interface 1180. When a user selects recommended association rules by providing selection inputs, the transaction classification system 1190 stores the rules 1165 in memory 1144. The rules 1165 can then be retrieved from memory 1144 to classify transactions with respect to the category at any time.

Figure 12:
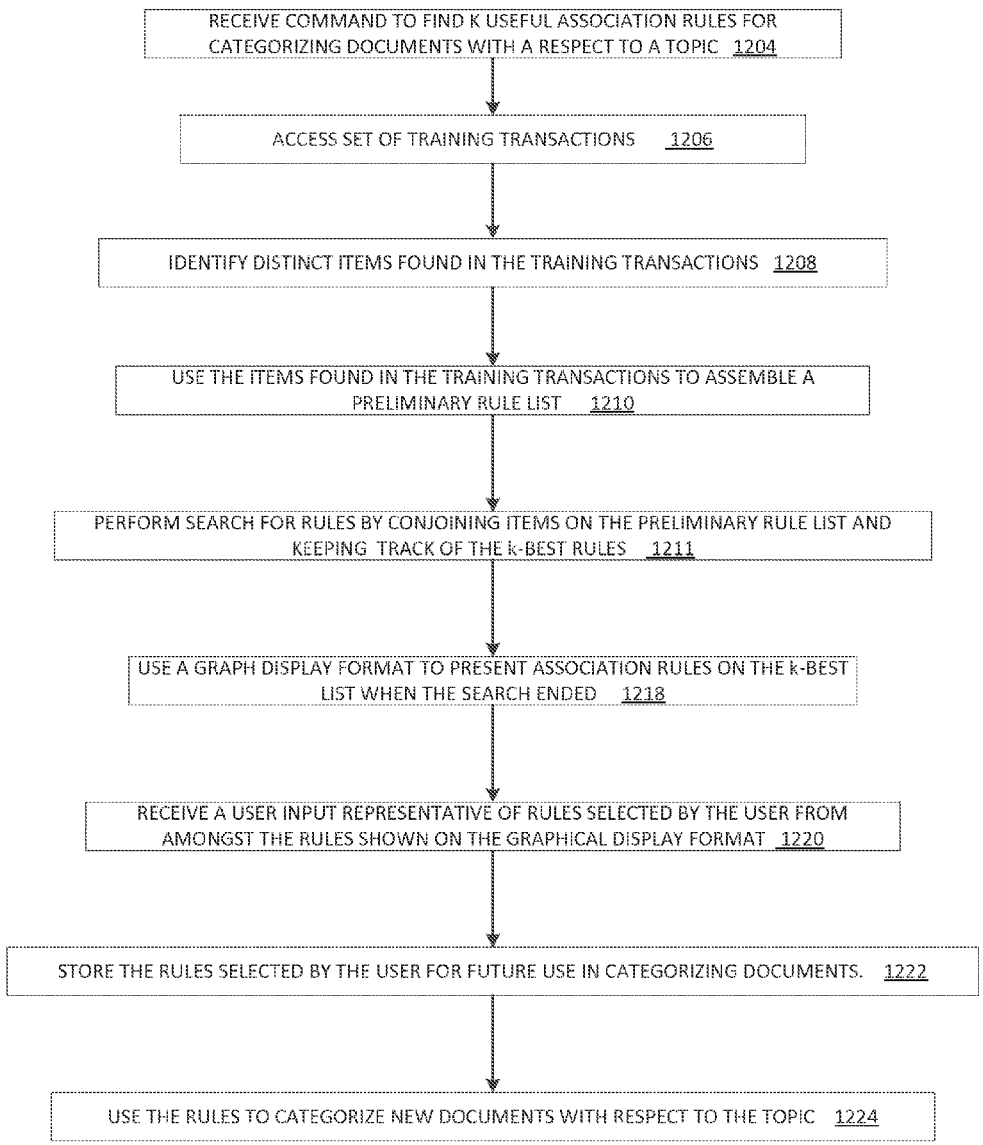
FIG. 12 is a flow diagram showing an example sequence of operations that may be executed by a transaction classification system as described herein.

FIG. 12 is flow diagram that presents a generalized overview of one possible mode of operation of the transaction classification system 1190. In paragraphs of this disclosure that follow the description of FIG. 12, the various processes and operations mentioned in the drawing will be described in greater detail.

As shown at 1204, the system 1190 can receive a command to find best k useful association rules for classifying transactions with respect to a category. At 1206, the system 1190 accesses a set of training transactions. At step 1208 it identifies all the distinct items used in the transactions, and evaluates their expected precision and information gain (evaluation not shown explicitly in FIG. 12). At 1210, the system 1190 uses those items to assemble a preliminary rule list.

At 1211, the system 1190 performs a search that involves conjoining terms on the preliminary rule list and keeping track of the k best rules found in the search.

After the search is completed, the system 1190 uses a graph display format to present the association rules and all the links leading to those rule that were on the k-best list when the search was finalized. This display operation is depicted at 1218. At 1220, the system 1190 receives an input representative of rules selected by the user from amongst the rule displayed at 1218. At 1222, the system 1190 stores these rules for feature use in classifying transactions with respect to the given category. At 1224, the system 1190 access the rules that were stored at 1222, and uses them to categorize new transactions.

Use of Training Documents and Evaluation of Association Rules

The system 1190 uses a large training set of transactions 1155a in which several categories are each addressed by at least a statistically significant number of transactions. Prior to being accessed, the categories of the transactions are obtained by one of the following means: 1) identification of an item that already occurs in the transactions, 2) a category based on some type of unstructured classification (for example, topic generation for documents), or 3) a category associated with the transaction itself which may be obtained based on information about the transaction, or perhaps by human reviewers. The transactions are labeled to indicate the resulting identifications.

When searching for useful rules for detecting a category, the system 100 compares classifications resulting from applying rules to the labeled categorizations. The system 1190 computes two different rule evaluation metrics that reflect these comparisons. The system 1190 uses the first one of the metrics heuristically in the process of making search decisions, and uses the second metric to compare the rule to all other association rules that are evaluated. In computing the second metric, the system 1190 adjusts the classification results to correct for likely differences between categories of the training transactions and those of transactions that are expected to be encountered out of sample.

In the training environment, instances in which an association rule matches, indicating that a transaction is a member of a specific category, are referred to as "positives", Instances in which the rule does not match indicates that a transaction is not a member of a specific category are referred to as "negatives".

During the training phase, the system 1190 attributes a true positive categorization to an evaluated association rule when a categorization label indicates a positive classification of a transaction and application of the evaluated rule also yields a positive classification of the transaction. The variable TP represents the overall number of such true positive events attributed to a given rule when the rule is applied to a set of training transactions during its evaluation. Similarly a false positive event is attributed to an evaluated association rule when a classification label indicates a negative classification of a transaction and application of the association rule yields a positive classification of a transaction. The variable FP represents a number of such false positive events attributed to a given rule when the rule is applied to a set of training transactions. A false negative event (FN) is when a rule does not match for a given transaction, but the transaction is a member of the category, while a true negative event (TN) is when a rule does not match for a given transaction and the transaction is not a member of the category.

A user can elect to train the system 1190 with respect to any number of categories. To that end, the system 1190 enables the user to provide inputs at the interface 1180 in order to indicate the categories to be detected during use of the system 1190. The system also enables a user to input a number of association rules (k) for each category that the user would like to review in the graph visualization. Then, in each search, the system 1190 identifies k of the association rules evaluated in the search that are estimated to be most useful for detecting the category. The system 1190 can then display the k rules to the user separately for each category, who in each such case is given the option to select any of the rules for use in detecting the given category. The system 1190 stores the selected rules in memory 1144 for future use in detecting the categories for which they were selected.

Association Rules

The system 1190 uses association rules that involve conjunctive logic and yield a categorization of a transaction based on either the presence or absence of specified items. For example, the following list provides examples of association rules that involve conjunctive logic. In the following paragraphs, this disclosure will explain an example system application that involves applying association rules to textual data represented in a bag of words (BOW) format. The concepts explained by way of the discussion of this example application are applicable in other contexts as well, and should be understood as being relevant to any situation in which association analysis may have value as an analytical tool.

In this particular example, however, the transactions are documents and the items are terms such as words, idiomatic expressions, names, hyphenated word clauses or other recognizable text structures. For instance, the system 1190 disclosed herein might hypothetically use any number of association rules structured along the lines of the following example rules in categorizing a document as belonging to a category of documents related to golf:

1) birdie AND eighteen AND driver AND ball=>golf
2) birdie AND par AND ! halftime=>golf
3) birdie AND par AND ! halftime AND !tackle=>golf
4) birdie AND eighteen AND driver=>golf The four example rules shown above will be discussed in order to explain how the system 1190 described herein forms, evaluates and applies association rules. The discussion will also serve to provide several definitions that will be used throughout the remainder this disclosure. The first example rule involves four terms that may or may not occur in a given document. Each of the terms in the first rule involves a "distinct word". The four distinct terms are golf, eighteen, driver and ball. Because it includes four terms, the first association rule will be referred to as a 4-part rule. Association rules having n items, as described in the remainder of this disclosure, should be understood to be "n-part" association rules.

As will be described in the following paragraphs, each association rule can be used to detect transactions that belong to a specific category (in this example, documents), and those that do not so belong. Thus, an association rule can also include a representation of the category that it is used to detect. Each of the four example association rules shown above is used to classify documents as being related or unrelated to the category of golf Thus, each of these rules includes the word golf, preceded by the "=>" symbol to indicate that the rule is for classifying documents as belonging or not belonging to the category of documents that are related to golf In contrast to the first example association rule, the second association rule involves three terms, and is therefore a three-part rule. Of these three terms, two of the terms include distinct words—birdie, par. The third term (represented as ! halftime) is what will be referred to as a "negation term". A negation term only matches when the term is not present in a document. In the following pages and the drawings of this disclosure, negation terms will be frequently referenced by the "!" symbol being placed in front of a word, name, hyphenated word, or other expression. To that extent, any word, name or other expression directly preceded by the "!" symbol should be understood to be a negated word.

This disclosure will describe association rules by using a referencing system that will now be explained. Given a list of available terms (distinct word terms and negation terms), individual terms on the list can be referenced by letters, such that the terms on the list are ordered alphabetically, based on their respective reference letters. For example, this reference system can be applied to the following list.

birdie
driver
ball
par
PGA
eighteen
!halftime
!tackle

The following list shows how reference letters would be applied to the terms of the list above:

A<=>birdie
B<=>driver
C<=>ball
D<=>par
E<=>PGA
F<=>eighteen
G<=>!halftime
H<=>!tackle The alphabetical representation explained above can easily be replicated where numbers or some other system of symbols is used in place of the alphabet.

When terms are referenced in this way, any rule that conjoins terms from the list can be referenced by the reference letters of the conjoined terms. For example, the following examples illustrates this manner of referencing a rule:

birdie AND eighteen AND driver AND ball=> golf⇔ ABCF=>golf birdie AND par AND ! halftime AND !tackle=> golf⇔ ADGH=>golf Moreover, when the category of an association rule (e.g., golf in each of the previous rule examples) is clearly understood, the rule may be referenced only by its terms. Thus, in such a case, the two rules in the example above may be invoked by the representations ABCF and ADGH.

Additionally, because association rules may have only one term, each individual term on a list such as the one discussed previously may be understood to be as a term that can be used to form a multi-part rule, while also representing a one-part rule existing on its own. When such lists are referred to later on in this document, all such terms should be understood to represent both such uses.

In applying a rule to a transaction, whether during a training phase or in production, the system 1190 categorizes the transaction as being either:

a member of the category that the rule is being used to detect; or not a member of the category that the rule is used to detect.

When an association rule that includes only distinct word terms is applied to a document, the system 1190 positively categorizes the document if the document includes each of the distinct words. Otherwise, the document is categorized as a negative. This means that the document is categorized as not belonging to the category.

When a rule includes both distinct word terms and negation terms, the system 100 positively categorizes the document if the document includes each of the distinct words and also omits each of the negated words. Otherwise, the system 1190 negatively categorizes the document.

Thus, in applying the first example rule to a document, whether during a training phase or in production, the system 1190 positively categorizes the document as being a member of the golf category if each of the words "birdie", "eighteen", "driver" and "ball" is found at least once in the document. If the document does not satisfy that condition, the document is negatively classified with respect to the golf category. Similarly, in applying the second example rule to a document, the system 1190 would positively categorize the document as a member of the golf category if and only if the word "halftime" (this treatment is indicated by the "!" in front of the word "halftime") was not found in the document and each of the words "birdie" and "par" appeared in the document at least once.

In training, the system 1190 uses two metrics to evaluate the categorization performance of association rules. These metrics can be applied to rules having any number of items, to include one-part rules. A first metric, referred to as "g-score", is a measure of information gain that can also be used to infer statistical significance. Information gain itself is not formulated for significance testing. However, a g-score is a useful proxy for information gain that also can be evaluated for statistical significance. This is because g-score follows a chi-square distribution, of which the significance values are well-known. The user can specify, via an inputted parameter, the level of statistical significance required (e.g. p<0.01, p<0.001, etc.). During search, the system will then consider for expansion only those rules that show a g-test above this specified cutoff. The g-score of an association rule is calculated as a sum over the 2×2 contingency table containing the numbers of TP, FP, FN, TN yielded by the rule. The g-score is calculated as $$G = 2\sum_i O_i \log\left(\frac{O_i}{E_i}\right),$$

where O(i) is the observed value of that cell, and E(i) is the expected value of that cell. So let e(TP), e(FP), e(FN), and e(TN) be the expected frequencies of each of those cells: then $$G=2*(TP*\ln(TP/e(TP))+FP*\ln(FP/e(FP))+TN*\ln(TN/e(TN))+FN*\ln(FN/e(FN)))$$

The g-score reflects both the information gain of a rule when applied to training documents, and the statistical significance of that performance, if, when we are considering adding an item to an existing rule, we use the TP of the existing rule as the FN of the new rule, and the FP of the existing rule as the TN of the new rule. Thus, during the search, the system 1190 is able to determine whether one rule represents a statistically significant improvement over another rule by computing the g-scores in this manner.

The second metric that the system 1190 uses to evaluate association rules is referred to as estimated precision. Estimated precision is a measure of the expected precision of the rule. If our data were unbiased, we could simply use TP/(TP+FP) for a measure of precision. In that case, if applying an evaluated rule yielded 5 true positive categorizations, and no false positive classifications, then we would say that the rule is accurate 100% of the time. However, the fact that the system 1190 evaluates so many rules renders this measure biased.

As an illustration of how this bias occurs—suppose you asked 30 people to pull out a penny and flip it ten times. Then ask them how many heads they got. You might find a few individuals who got 9 or 10 heads in their flips. That doesn't mean their coins really have a 90% or 100% chance of landing heads. Looking at only the individuals who landed the most heads would result in biased results.

In order to correct for bias effecting the calculated precision of a rule, the system uses a user-inputted parameter m, which is an integer >=1. The value of m indicates the degree of bias expected for the training data (a good value of m can potentially be determined using cross-validation) being used. For a classification rule having i items, the estimated precision is calculated using the following formula. In this case, for a 1-item rule, $err_{i-1}=0$.

$$\text{est\_precision}_i(i) = \frac{TP_{i,t} + \frac{P}{N+P} * m}{TP_{i,t} + FP_{i,t} + m} - err_{i-1}$$

$$err_i = \text{est\_precision}_i(i) - \text{precision}_i(i) + err_{i-1}$$

Figure 13:
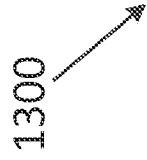
FIG. 13 is an example of a preliminary rule list containing six preliminary rules.

In the formula for estimated precision, m is a constant that the system 100 uses so that the estimated precision metric will be biased in favor of association rules that have small numbers of terms and rules that yield large numbers of positive classifications. For example, consider the golf example described earlier. When we consider the 1-term rule, par, as shown in FIG. 13, TP=12, FP=5, and assume that the user has set m=1. Also assume that there are 1000 total documents in the training set—100 of which are members of the golf category. In this case, precision would be 12/(12+5)=70.59%.

On the other hand, estimated precision would be (12+100/1000*1)/(12+5+1)=67.22%. So we are saying that in the training data, we got over 70% precision, but we think its biased and the expected precision in a different, larger sample would only be about 67%. The difference between those represents err, which is 3.37% (all these can be seen from that figure). Thus when we try to add additional terms onto the rule for par, their estimated precision as measured before will be reduced by an additional 3.37%, so that we favor shorter rules.

The search algorithm that the system 1190 uses to find useful association rules can be best understood by conceptualizing the search space as a tree in which individual candidate association rules are represented by a particular node. Under this framework, the root node represents an origin point at which multiple search path begins. Below the root node, at every $n^{th}$ level of depth, every node represents a unique n-item association rule. Each edge connects individual nodes at an $n^{th}$ level of depth to a node representative of an association rule having the same n items and one additional item.

The structure and nodes of the tree can be determined by the contents of a preliminary rule list that is made up of one-part rules ordered by rule type and descending g-score value. The system 1190 uses preliminary rule lists that are specific to individual categories. For that reason, each search entails generating a preliminary rule list with respect to the category that will be the subject of the search.

The system 1190 generates a preliminary rule list with regard to a given category by first identifying distinct items found in the set of training transactions. In the example case of text, the set of training transactions can be a set of documents, sentences, paragraphs, articles, or the like. The distinct items can include words, names, expressions, recognizable clauses, statements, or other meaningful arrangements of text. In this case, the system 1190 ignores insignificant or generally uninformative words such as pronouns and other heavily used words that are found in most documents. Similarly, when the system 1190 is being used to identify combinations of genes that predict Alzheimers, the system can establish preliminary rule list so that it will not include genes known to be irrelevant to the detection of Alzheimers disease.

Returning to the example case in which the system 1190 categorizes text documents, after significant distinct items are identified, the system 1190 then treats each remaining item as distinct in a one-part association rule and uses each such rule to categorize each of the training set transactions with respect to the category. The system 1190 counts the true-positive, false-positive, true-negative and false-negative categorizations yielded by each rule. Based on this information, the system 1190 calculates the g-score value and estimated precision of each such rule. The system 1190 then removes any items for which the g-test value is not in excess of a predetermined threshold. The system 1190 then checks to see which items are currently among the k-best as to estimated precision and puts those on the k-best rule list. It then removes from the list all items which cannot be improved. The remaining rules are then ordered based on their g-test values, from highest to lowest.

The system 1190 can provide the user with the ability to set the predetermined threshold used in the elimination of one-part association rules from the preliminary rule list. By setting the predetermined threshold, the user can affect the breadth of the search space in which the system 1190 evaluates candidate rules.

The system 1190 can extend the preliminary rule list to include single-word negation items from the items found in the transactions. The system 1190 treats each such negation item as a one-part rule and evaluates these rules in the same manner as described above. The system 1190 discards rules that do not exceed the g-score threshold and sorts rules that can be improved from highest g-score to lowest. The system 1190 then appends the sorted negation terms to the ordered list of distinct words, and the preliminary word list is complete.

FIG. 13 is an example of a preliminary rule list. The preliminary rule list 1300 shown in FIG. 13 includes six one-part rules. In actual practice a preliminary rule list may include as many as thousands of one-part rules. The preliminary rule list includes 2 segments. One segment includes rules A-E. These rules are formed by distinct word terms and are ordered by g-score, from highest score to lowest. The second segment is for rules having a negation term. However, in this particular case, rule F is the only such rule.

The preliminary rule list 1300 includes data with respect the each one-part rule (term). In the column labeled "in", the rule list 1300 provides the numbers of true-positive categorizations of training documents yielded by the six rules (A-F). Similarly, the column labeled "out" provides the numbers of false-positive categorizations. The column labeled "tot" is simply a summation of the "in" and "out" columns.

The preliminary rule list 1300 also includes the g-score computed for each rule. G-scores are shown in the column labeled "g". The +/− labels in the column labeled "dir" are used to label the various rules based on whether or not they include a negation term.

The column "prec" is used to show the precision computed with respect to each rule. A rule's precision is defined as TP/(TP+FP). The est_prec column includes each rule's estimated precision. The explanation of this metric was provided previously.

The p_err column includes the differences between the precision and estimated precision computed with respect to the various rules, and the "improve" column indicates which rules are improvable (+) or unimprovable (−).

Prior to attempting to expand the rule list, the system 1190 creates a k-best list for storing k association rules and the estimated precision computed for these rules. Later, the k-best list is updated throughout the search to indicate the k association rules that have been evaluated to have the highest estimated precision.

Figure 14A:
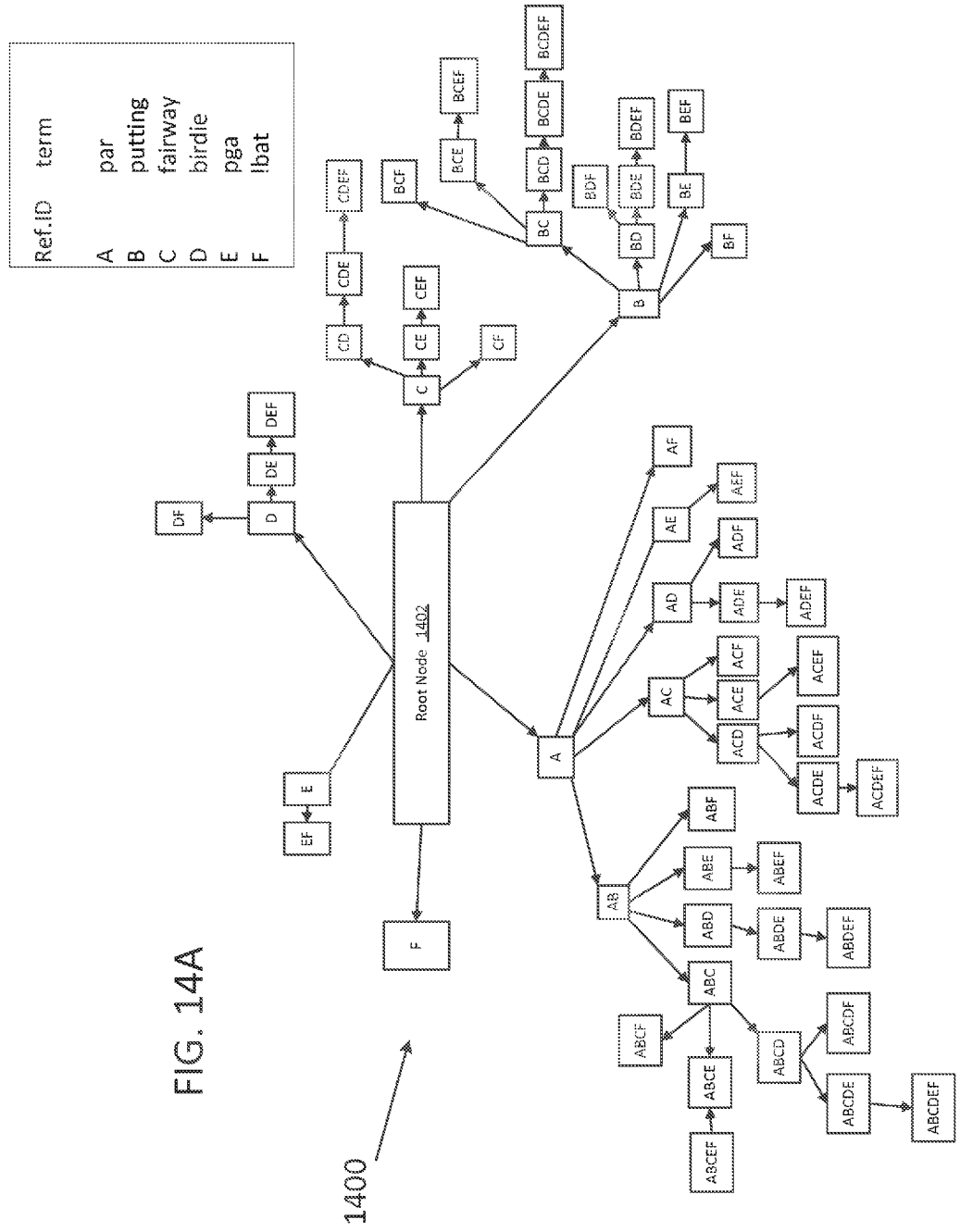
FIG. 14A is an example of a tree that represents a search space within which the transaction classification system is configured to efficiently search for association rules.

FIG. 14 is an example of a tree 1400 used to represent a search space that corresponds to the preliminary rule list 1300 of FIG. 13. The tree represents each of the conjunctive association rules that can be formed from six terms on preliminary rule list 1300. Although the system 1190 need not actually construct a representation of any tree when performing a search, reference to trees structured such as the one shown at 1400 enable the search algorithm that the system 1190 employs to be easily represented, studied and understood.

A tree structured in accordance with certain rules and based on a preliminary rule list referenced by the system 1190 can depict the potential search paths that can be explored when the system 1190 executes the search algorithm. Moreover, such a tree provides that illustration without depicting any search paths that would violate the search constraints. For this reason, just such a tree will be used to explain how the system 1190 executes the modified depth-first search. However, note that in accordance with the best-first metaheuristic used by the system 1190, search paths are expanded in the depthwise direction only so far as the paths incrementally lead to rules with new terms that result in a statistically significant improvement. For this reason, on certain occasions, there might be precise rules that are not evaluated because they are represented by nodes on potential search path that the system does not fully explore in the depthwise direction. This is a tradeoff in which some limited approximations are accepted in order to greatly reduce the processing requirements of the search. Moreover, in many real-world problems, only minute fractions of a percent of possible rules represented by the tree are ultimately examined.

One example set of procedures for assembling a tree such as the one shown in FIG. 14 is as follows:

1) On the preliminary rule list, label the first rule (or term) as A, the second as B, the third as C, and so on. This labeling scheme was described earlier in this disclosure.

2) Taking the preliminary rule list to include exactly n rules, record all permutations of the letters used to represent terms (one-part rules) on the preliminary list. These permutations should include all permutations of between 1 and n letters in which no letter is repeated. Take each of these permutations to represent an association rule in the search space that is a logical conjunction of the terms represented by the permutation letters.

3) In each permutation, order the letters by alphabetical order.

4) Create a node with respect to each such ordered permutation.

5) Create a root node that will represent a starting point of each search path.

6) Label each of the nodes by its respective permutations.

7) At each node:
a) determine the number of letters (x) in the label.
b) use a directional edge to connect the node to every other node that is labeled by a permutation having the same x letters and exactly one other letter.
c) if x=1, use an edge to connect the node to the root node.

By using these procedures to assemble a tree 1400, the nodes of the tree can be used to represent the various candidate association rules in the search space, and the edges can represent possible search paths.

The local search involves "expanding" along multiple search paths originating at the root node 402. Because divergent search paths are explored, the best-first metaheuristic is used to determine the order of branching from the root node 1402, as well as the order of branching from nodes evaluated during the search. That is, the system 1190 can use the best-first metaheuristic to order the exploration of diverging search paths at every operation of search path expansion. The use of the best-first metaheuristic causes the system to detect most of the best rules in the search space early on during the search. For this reason, it is possible for a user to terminate the search prior to completion, and early on in its execution, without causing significantly degraded search results.

Starting from the root node 1402, the term expansion progresses among all encountered search paths that are not subject to an expansion constraint (f) or a path termination constraint. On each search path, the term expansion continues depthwise in this manner until the path leads to a node that is not superior to its parent. A test for superiority of one node over its parent will be explained in subsequent paragraphs. The expansion constraint is an upper limit on the number of search paths that can be explored from any single node beyond the root node 1402. The path termination constraint is invoked when an ideal evaluation condition is found at a node. Moreover, a metaheuristic based on ordered g score is used to select search paths most likely to lead to a useful association rule and constrain growth of the search space.

The system 1190 determines any child node to be an improvement of its parent node when, both of the following conditions are met:

the association rule represented by the child node yields a g-score that reflects a statistically significant improvement in information gain, as compared to the parent node; and the association rule represented by the child node is evaluated to have an estimated precision that is higher than the association rule represented by the parent node.

In this regard, the statistically significant/insignificant threshold is based on a cutoff given by the user.

When more than f child nodes of any one parent node satisfy both of these conditions and the rule represented by the parent node is improvable, the system 1190 identifies f of the child nodes at which the g-score improvement is best, expands the search to those nodes, and closes off all search paths that involve any of the remaining child nodes.

The search can be implemented recursively, and involves evaluating the association rule represented by each node that the search visits. The evaluation involves multiple steps. In a first operation, the system 1190 calculates the estimated precision of the association rule and reviews the estimated precision of the lowest scoring association rule on the k-best list.

If the estimated precision computed for the rule under evaluation is one of the k-best, is higher than the parent node, and the g-score for rule improvement is statistically significant, the rule replaces that rule that had previously been $k^{th}$ best. The k-best list is represented by a priority queue that is sorted so that the association rules on the list are ordered by their respective estimated precision. Conversely, if the rule under evaluation is not one of the k-best, the k-best list is left unchanged. In either case, the system 1190 considers further depthwise search expansion to child nodes, provided that the child node is improvable.

The test for whether an evaluated node is improvable is as follows:

Set the FP to 0, FN to 0 and TN to current FP.

Compute the g-score and estimated precision of this theoretical "best possible" node to follow the current one using the previously given g-score formula. If and only if that "best possible" node has a statistically significant g score, and its estimated precision is better than current node, the current node is improvable.

In view of these heuristics and constraints, the system 1190 performs the modified depth-first search in accordance with a series of procedures that will be explained through reference to a tree constructed as previously described. The procedures involve the following operations:

1) Start at the root node.
2) Advance the search to all open nodes, as defined below. Advance the search one edge at a time, but subject to and in accordance with the following constraints, metaheuristics, and search ordering guidelines:

a) Parent/Child—When any two nodes are connected by an edge, one is to be considered a parent node and one is to be considered the child node. In such a case, the child node is the node furthest from the root node. All nodes connected directly to the root node (1-hop) are child nodes of the root node.

b) Uphill Node—A child node is superior to the parent if the g-score of the new association rule represented by the child (as described earlier) is a statistically significant improvement over the parent. Otherwise the child node is ignored by the search. All nodes connected directly to the root node (1-hop) are superior to the root node.

c) Open Nodes—Child nodes that are superior to parent nodes and are improvable become open nodes upon the search visiting the parent node, subject to constraint (d) and (e). The search continues until there no open nodes remaining.

d) Branching/Expansion Constraint (f)—No more than f child nodes of any parent become open nodes. If more than f child nodes are superior to a parent, only the improvable child nodes associated with the highest g scores are considered for expansion.

e) Expansion From the Root Node—Any nodes that represent a one-part association rule formed from a negation term are constrained from being open nodes. The search does not visit these nodes.

f) Prioritization of Open Nodes/Search Order—Incrementally extend the search to open nodes in accordance with the alphabetic ordering of the association rules that the nodes represent. For example, if one open node represents association rule AF and another represents association rule AG, extend the search to AF prior to extending the search to AG. When the search is extended to a node, the node is no longer an open node.

g) Evaluating Association Rule Represented By a Visited Node—When extending the search to a node, calculate the estimated precision of the association rule that the node represents. Update and sort the k-best list if the estimated precision is higher than the estimated precision calculated with respect to any other association rule on the k-best list.

h) Termination Condition—Continue the search until there are no open nodes.

i) k-Best Evaluated Rules—At the end of the search, the association rules on the k-best list are estimated to be the most useful for detecting membership in the category.

Figure 14B:
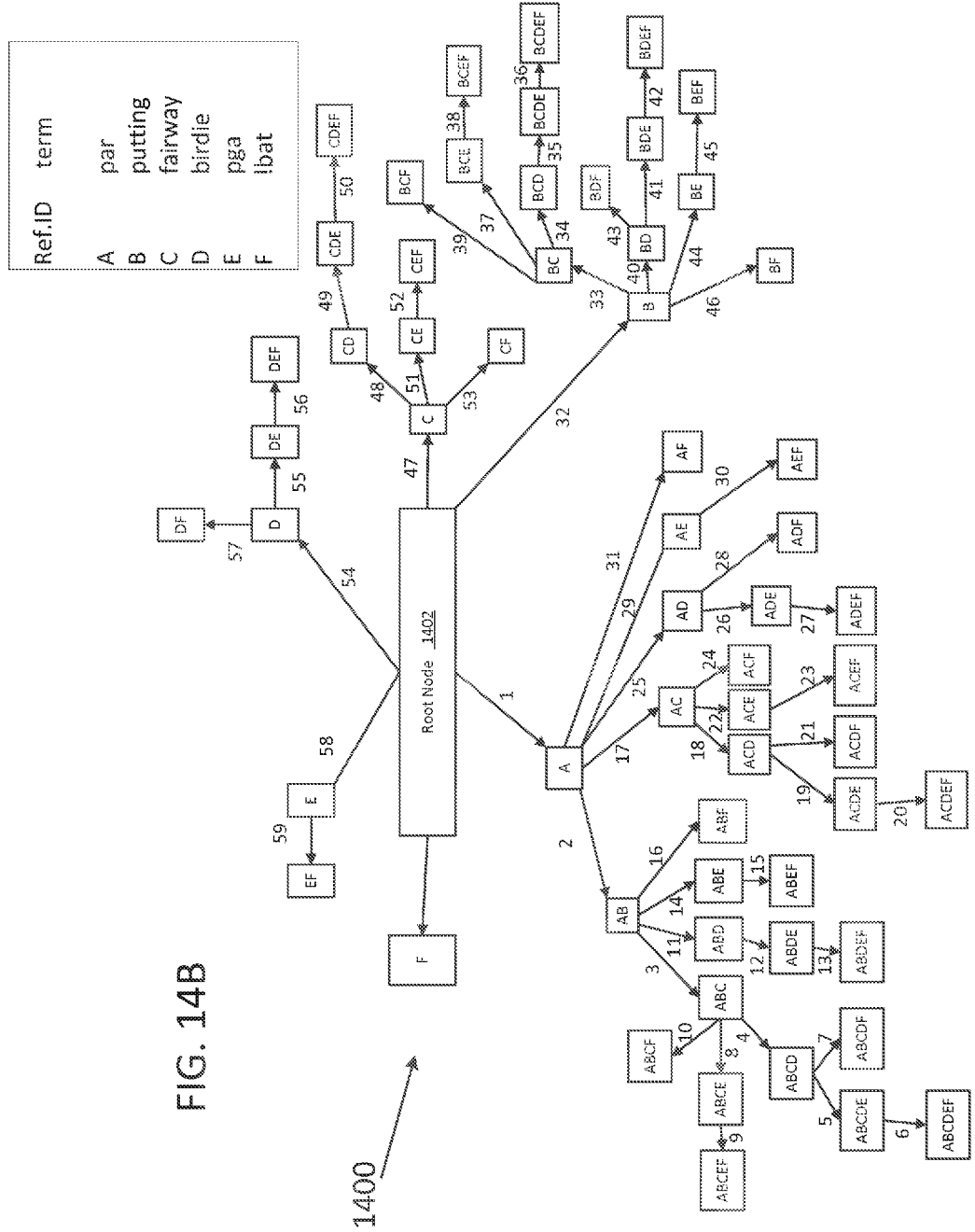
FIG. 14B is an illustration of an example search conducted in the search space represented by the tree of FIG. 14A.

FIG. 14B is intended to show the search order that the system would apply, in an idealized case, to the search space represented by tree 1400. The idealized case assumed in FIG. 14B involves the assumption that the system is operated with unlimited processing resources and the parameter f has therefore been set to infinite. Additionally, a search would progress only as shown in FIG. 14B if the search never encountered an unimprovable rule above the leaf level of the tree, and if all nodes were found to be superior to their parents.

In such a case, FIG. 14B shows that every node (other than nodes representing one-part negation rules) will be visited. Additionally, the numbers attached to the edges of the tree 1400 indicate the order of search. In this idealized situation, the system follows every search path to a leaf of the tree, and the search visits nodes exactly in accordance with the alphabetical ordering of the nodes.

FIG. 15 displays examples of search results that could hypothetically be obtained by using the transaction classification system 1190 to search for 7 best association rules within the search space represented by tree 1400. The k-best rule list yielded by the search is shown at 1602. Moreover, the nodes that represent the association rules on the list are highlighted within the tree 1400. These 7-best rules are ABCD, ABC, ABEF, ACEF, ACD, BCD, BCE.

Figure 16:
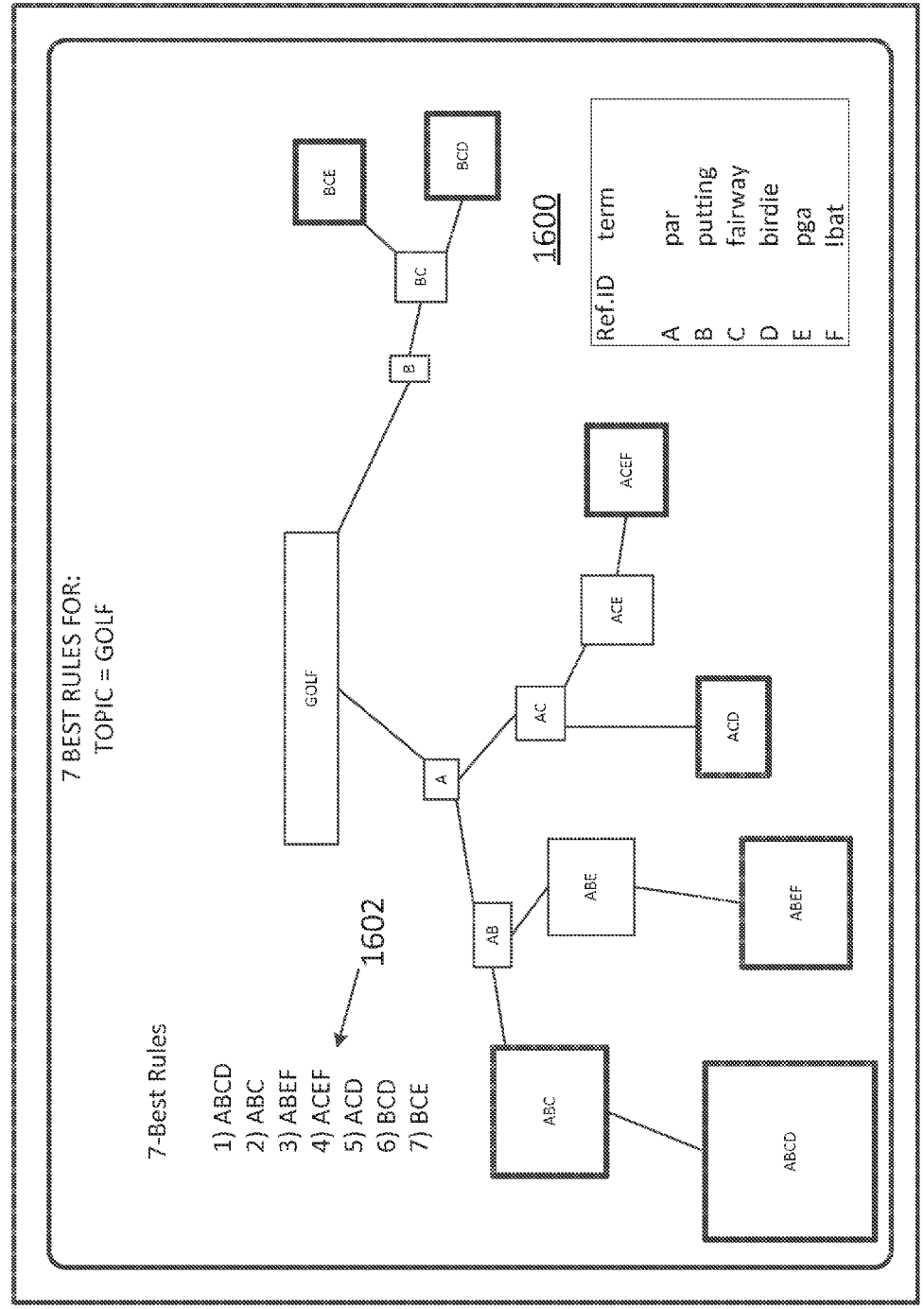
FIG. 16 shows an example interface display presented to a user in order to visually represent seven association rules.

FIG. 16 is an example of a rule search depiction 1600 that the system 1190 can provide for the purpose of enabling a user to see results of a search for association rules conducted with respect to a given Topic (or category). The rule search depiction 1600 can be provide in a graphical format that shows the association rules on a k-best list 1502 following a search performed by the system 1190.

The rule search depiction 1600 may use edges to reflect the search paths that lead to the k-best association rules. The depiction 1600 may also use shapes of different size to represent the k-best rules. In this case, the shapes may be sized in proportion to the estimated precision of their respective rules. For example, a large highlighted box is shown around the node that represents rule ABCD. The highlighting of this box indicates that rule ABCD was one of the 7-best rules. Moreover, the fact that the size of the box is larger than all other boxes shown on the display indicates that rule ABCD was found to have a higher estimated precision than all other rules.

The depiction 1600 may also provide the user with features for investigating performance metrics computed for specific rules. These metrics may include metrics such as g-score and estimated precision, statistical significance of the g-score, and the distribution of positive and negative categorizations of training set 1155a transactions. The depiction may further include a feature that the user can activate in order to see training set documents that were categorized correctly or incorrectly when a rule was applied. Additionally, the edges used to connect two association rules may be scaled in thickness so as to represent the information gain of the child rule compared to the parent rule.

FIG. 17 depicts additional features of a rule search depiction 1600. A user operating system 1190 during display of the rule search depiction may toggle from the view shown in FIG. 16 to the view shown in FIG. 17, and vice versa. As shown in FIG. 17, the rule search depiction 1600 may include a menu 1702 at which a user can select a document category of interest. When the user selects a category, the transaction classification system 1190 displays the k-best association rules found for that category in window 1704. The user can select any subset of the rules in window 1704. For all such rules the user selects, the transaction classification system 1190 displays excerpts 1706 from documents that have been categorized as being related to the selected category. The user can click on any of the excerpts 1706 on the window 1704 to more closely analyze the document from which the excerpt was taken. Additionally, the rule search depiction 1600 displays the excerpts such that words that match a term found in the selected rule are highlighted.

Figure 18:
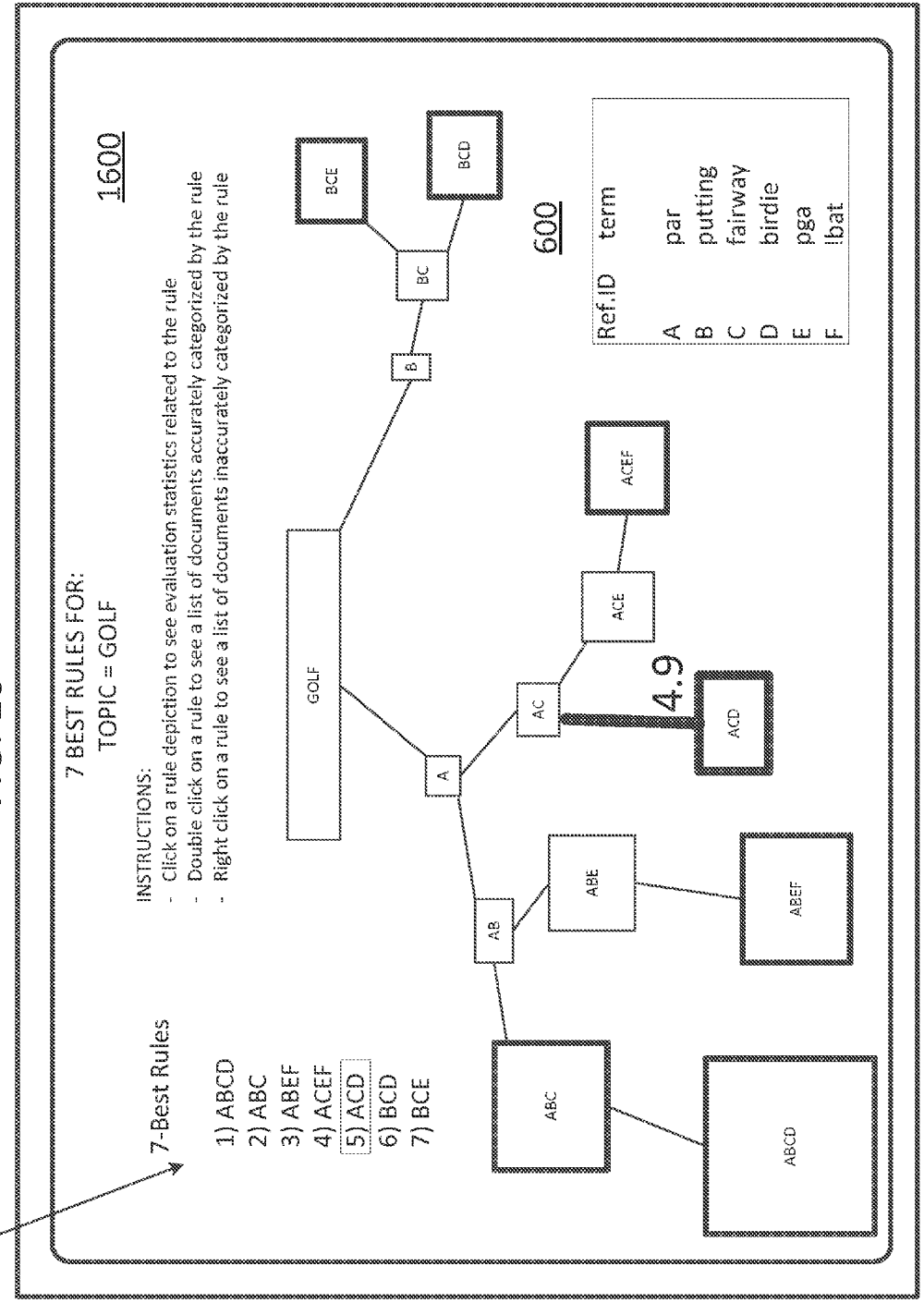
FIGS. 18 and 19 show an example interface display providing visual information about an information gain metric computed with respect to an association rule.
Figure 19:
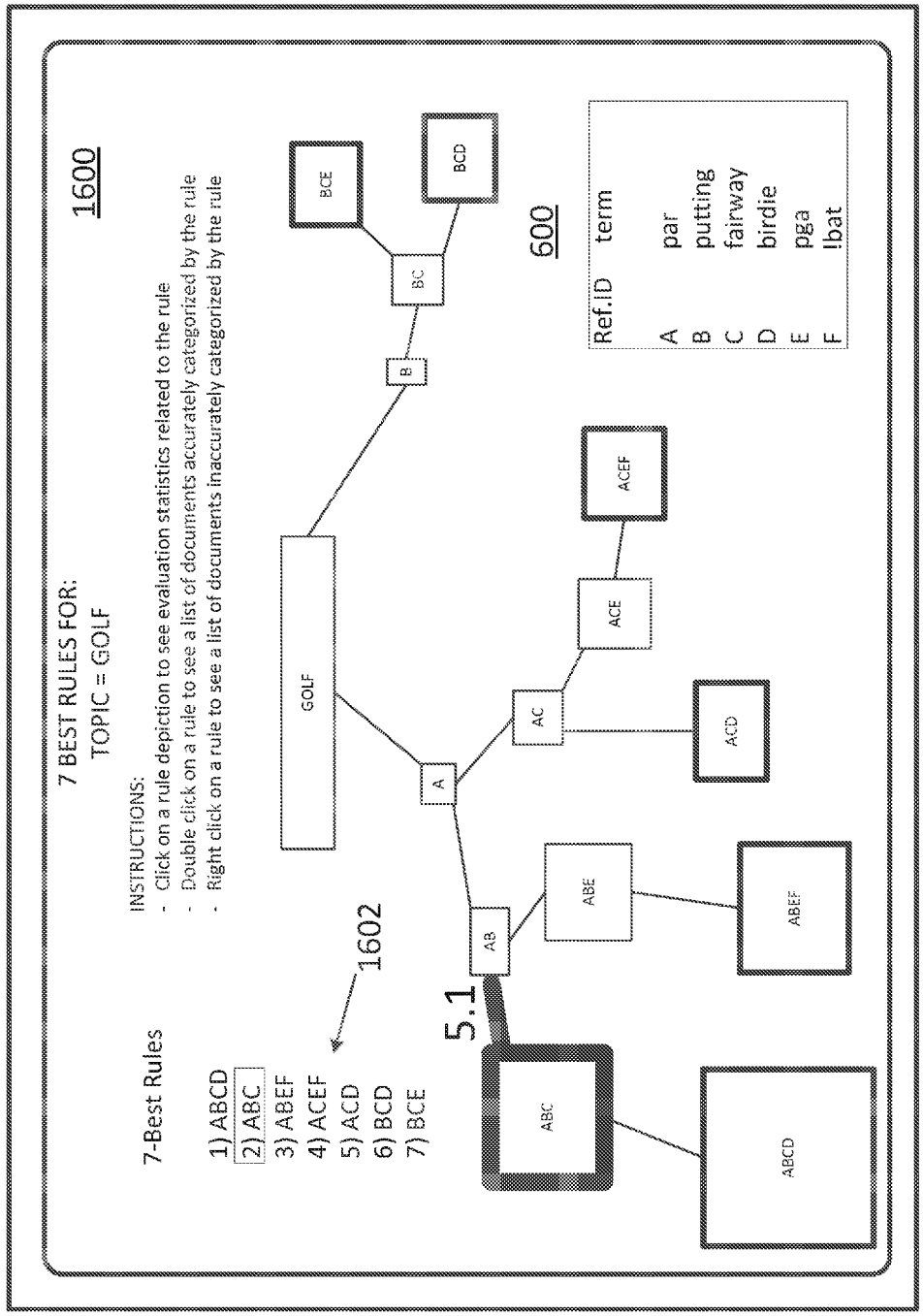

FIGS. 18 and 19 depict examples of the rule search depiction 1600. As shown in FIG. 18, a the transaction classification system 1190, when displaying the rule search depiction 1600, can provide a user with the ability to click on any one of k-best association rules displayed with respect to a document category. When a user selects one of the rules, the edge leading to that rule is highlighted on the rule search depiction. The thickness of the highlighting represents the g-score associated with the selected rule, or some other metric. Additionally, the g-score or other metric can be displayed next to the rule. The activation of this feature is illustrated in FIG. 18 by the box around rule ACD, and in FIG. 19 by the box around rule ACD.

Figure 20:
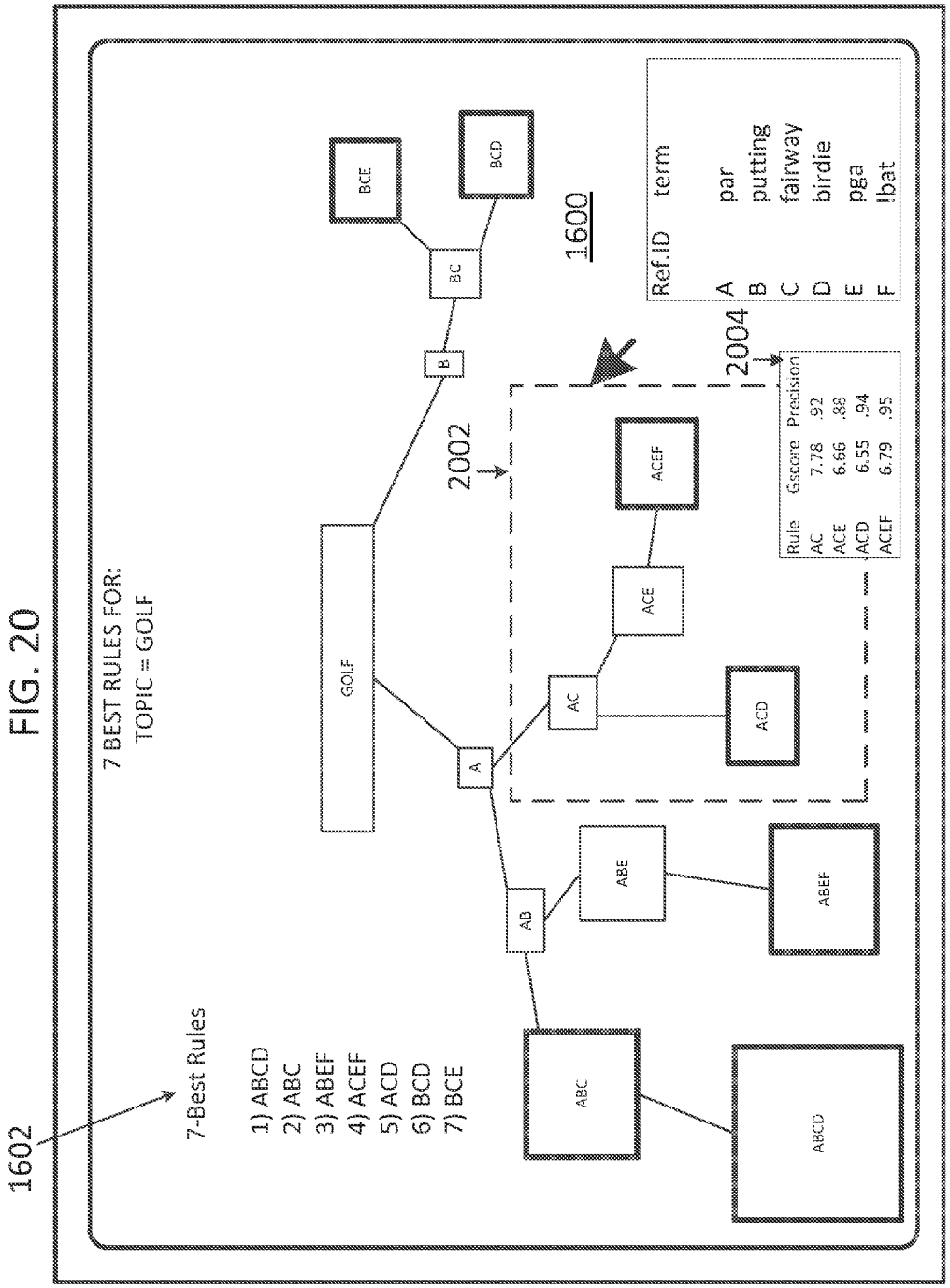
FIG. 20 shows an example interface display providing a user with statistical data about association rules.

FIG. 20 depicts additional features of the rule search depiction 1600. As shown in FIG. 20, a transaction classification system 1190 provides the user with the ability to draw a box around any combination of nodes that represent k-best rules or nodes that represent other rules. In FIG. 20, a selection box 2002 is shown around nodes AC, ACD, ACE, and ACEF. When the user draws a box in this way, the transaction classification system displays statistics 2004 used to evaluate the rules. In this way, a user may compare any number of similar rules at one time.

Figure 21:
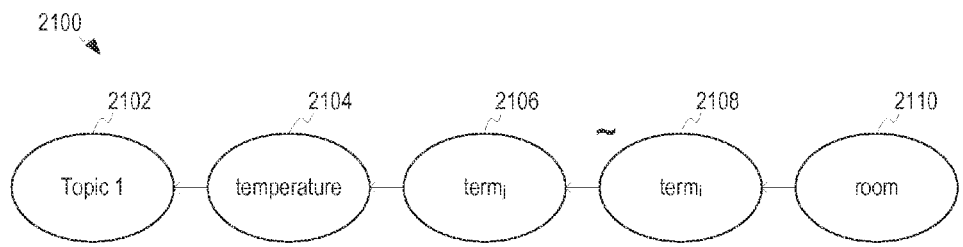
FIG. 21 is a graphical representation of a cross-corpus rule set generated from a data set according to certain aspects of the present disclosure.

FIG. 21 is a graphical representation of a cross-corpus rule set 2100 generated from a data set according to certain aspects of the present disclosure. This graphical representation or a version thereof can be presented on a display or otherwise visually presented to a user. The cross-corpus rule set 2100 is a rule set generated for a particular target node 2102 (e.g., Topic 1) across all members of a data set. The cross-corpus rule set 2100 is generated without regards to context, as described in further detail below with respect to dimensional rule sets. In order to generate the cross-corpus rule set 2100, algorithms, such as those described above, are used to determine terms (e.g., terms, tokens, or predictors) that satisfy a particular target 2102 across an entire data set. As seen in the example of FIG. 21, the target node 2102 (e.g., Topic 1) can be something related to temperature, as seen from node 2104. The cross-corpus rule set 2100 can be based on distinct terms found in the data files of the data set. In some instances, as seen in nodes 2106 and 2110, the presence of a term (e.g., term) is required for a member of the data set to satisfy the target node 2102. In some instances, as seen in node 2108, the absence of a term (e.g., term) is required for a member of the data set to satisfy the target node 2102. The ~ mark is used in FIGS. 21-25 to indicate when the absence of the term is required, as opposed to the presence of the term being required.

As seen in FIG. 21, a target node 2102 and nodes 2104, 2106, 2108, 2110 can be displayed with linked edges that represent the concatenated rule set that describes a given 0-1 outcome (e.g., for that particular target node 2102).

Figure 22:
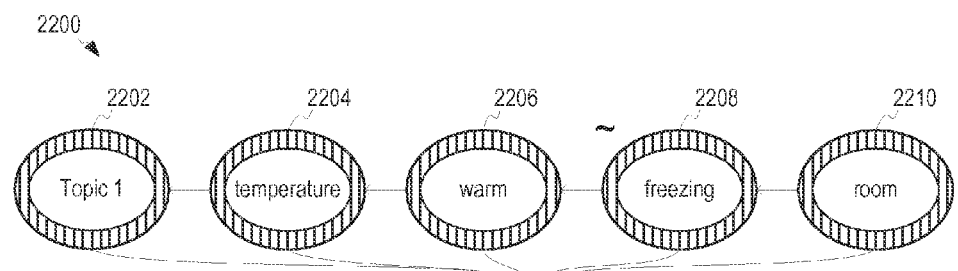
FIG. 22 is a graphical representation of a first dimensional rule set generated using a first context according to certain aspects of the present disclosure.

FIG. 22 is a graphical representation of a first dimensional rule set 2200 generated using a first context according to certain aspects of the present disclosure. This graphical representation or a version thereof can be presented on a display or otherwise visually presented to a user. The data set used to generate the cross-corpus rule set 2100 of FIG. 21 can be separated into sub-domains based on contexts and each sub-domain can be associated with a different context. For example, if the data set used in FIG. 21 relates to the temperature of two rooms, one that is hot and one that is cold, the full data set can be separated into a first sub-domain of data files related to (e.g., collected from) the "hot" room and a second sub-domain of data files related to the "cold" room. Other contexts can be used, as well as other numbers of contexts (e.g., three, four, or more contexts, and thus three, four, or more sub-domains, respectively).

The first dimensional rule set 2200 is the rule set generated for a particular target node 2202 (e.g., Topic 1) when applying the first context, which here includes determining the rule set across the first sub-domain of data files (e.g., those related to the "hot" room). The first dimensional rule set 2200 can be generated similarly to the cross-corpus rule set 2100, but only across the first sub-domain of data files, rather than the entire data set. Some nodes 2204, 2210 can include terms common to both the first dimensional rule set 2200 and the cross-corpus rule set 2100 (e.g., nodes 2104, 2110, respectively). The first dimensional rule set 2200 can also include unique nodes 2206, 2008 that include rule terms (e.g., "warm" and not "freezing") not present in the cross-corpus rule set 2100.

The target node 2202 and nodes 2204, 2206, 2208, 2210 of the first dimensional rule set 2200 can include a visual identifier 2212. The visual identifier can include any visual feature that is capable of identifying that those nodes 2202, 2204, 2206, 2208, 2210 are associated with the first dimensional rule set 2200, and thus the first sub-domain of data files, and thus the first context (e.g., the "hot" room). As seen in FIG. 22, the visual identifier 2212 is shown as vertical hatching in a border of each node 2202, 2204, 2206, 2208, 2210.

Figure 23:
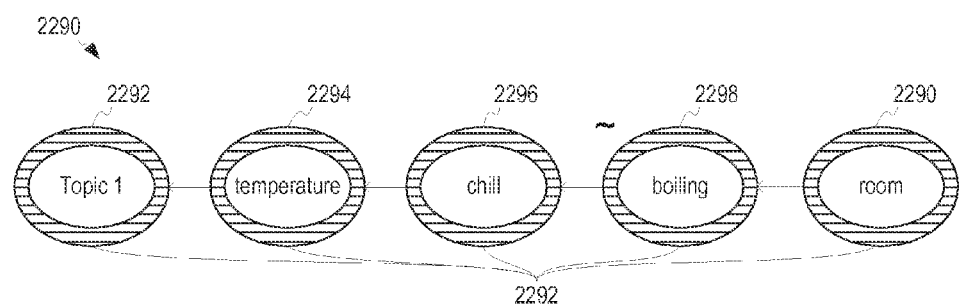
FIG. 23 is a graphical representation of a second dimensional rule set generated using a second context according to certain aspects of the present disclosure.

FIG. 23 is a graphical representation of a second dimensional rule set 2300 generated using a second context according to certain aspects of the present disclosure. This graphical representation or a version thereof can be presented on a display or otherwise visually presented to a user. The second dimensional rule set 2300 is the rule set generated for a particular target node 2302 (e.g., Topic 1) when applying the second context, which here includes determining the rule set across the second sub-domain of data files (e.g., those related to the "cold" room). The second dimensional rule set 2300 can be generated similarly to the cross-corpus rule set 2100 and similarly to the first dimensional rule set 2200, but only across the second sub-domain of data files, rather than the entire data set or the first sub-domain of data files. Some nodes 2304, 2310 can include terms common to both the second dimensional rule set 2300 and the cross-corpus rule set 2100 (e.g., nodes 2104, 2110, respectively) of the first dimensional rule set 2200 (e.g., nodes 2204, 2210, respectively). The second dimensional rule set 2300 can also include unique nodes 2306, 2008 that include rule terms (e.g., "chill" and not "boiling") not present in the cross-corpus rule set 2100 or the first dimensional rule set 2200.

The target node 2302 and nodes 2304, 2306, 2308, 2310 of the second dimensional rule set 2300 can include a visual identifier 2312. The visual identifier can include any visual feature that is capable of identifying that those nodes 2302, 2304, 2306, 2308, 2310 are associated with the second dimensional rule set 2300, and thus the second sub-domain of data files, and thus the second context (e.g., the "cold" room). As seen in FIG. 23, the visual identifier 2312 is shown as vertical hatching in a border of each node 2302, 2304, 2306, 2308, 2310.

Figure 24:
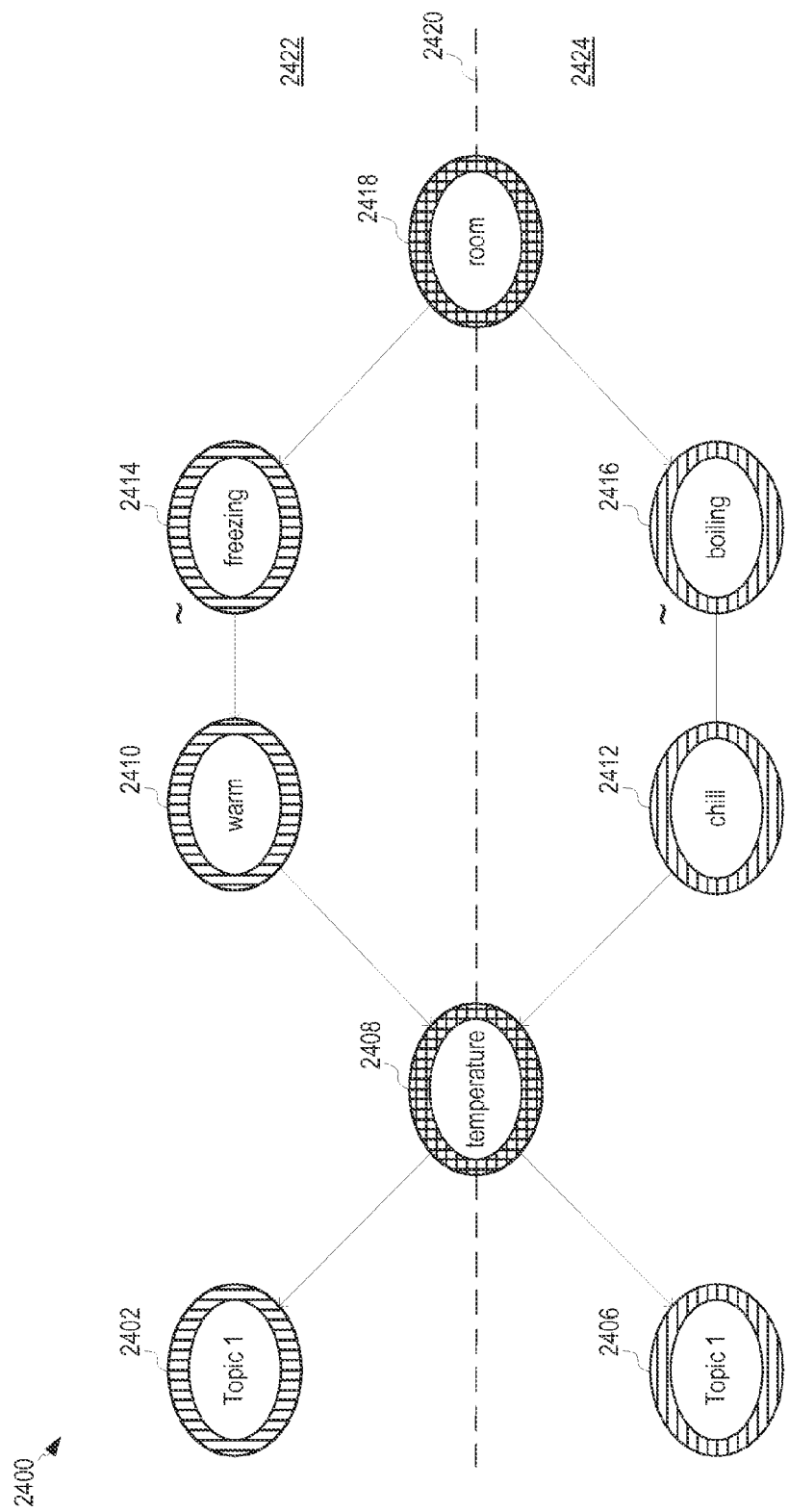
FIG. 24 is a graphical representation of a canonical rule set generated from a data set used to generate the rule sets of FIGS. 21-23 according to certain aspects of the present disclosure.

FIG. 24 is a graphical representation of a canonical rule set 2400 generated from the data set used to generate the rule sets of FIGS. 21-23 according to certain aspects of the present disclosure. This graphical representation or a version thereof can be presented on a display or otherwise visually presented to a user. The canonical rule set 2400 is a rule set generated for a particular target (e.g., Topic 1, represented by target nodes 2402, 2406) across an entire data set using dimensional analysis. The canonical rule set 2400 can be generated by comparing a cross-corpus rule set 2100 with a first dimensional rule set 2200 and a second dimensional rule set 2300, and then identifying dimensional differentiators and common nodes for a given target. In some embodiments, the canonical rule set 2400 is generated only by comparing each of the dimensional rule sets 2200, 2300 and not a cross-corpus rule set 2100. Various visual indicators can be used to identify dimensional differentiators and common nodes. Specifically, visual indicators can be used to identify if a node corresponds to a first context, a second context, or is common to both contexts. The visual indicators can thus identify when a node is associated with an effect target coded as 11 (e.g., common to both contexts, or containing both "hot" and "cold" in the Example of FIG. 24), an effect target coded as 10 (e.g., contained only in the first context, or only in "hot"), or an effect target coded as 01 (e.g., contained only in the second context, or only in "cold"). See table II. Visual indicators other than hatching can be used.

TABLE II

Example of two-dimensional visual indicators

| Context 1 (e.g., "hot") | Context 2 (e.g., "cold") | Effect Code | Visual Indicator |
| --- | --- | --- | --- |
| 1 | 1 | 11 | Horizontal and vertical hatching |
| 1 | 0 | 10 | Horizontal hatching |
| 0 | 1 | 01 | Vertical hatching |
| 0 | 0 | 00 | Not present |

As seen in FIG. 24, a separate target node 2402 associated with a first context can be presented as visually distinct from a target node 2406 associated with a second context. In other embodiments, the target nodes 2402, 2406 can be combined into a single node, which can optionally be presented with visual indicators similar to a common node, as described in further detail below.

Node 2408 is a common node that appears in both the first dimensional rule set 2200 and the second dimensional rule set 2300. Nodes 2410, 2412 represent related terms that are dimensional differentiators. In the first dimensional rule set 2200, a "warm" node is seen, whereas in the second dimensional rule set 2300, a "cold" node is instead seen. Therefore, these related nodes 2410, 2412 are shown lined up vertically and edge-linked to node 2408, but are shown with distinct visual identifiers. Two types of visual identifiers are used in FIG. 24: patterns and vertical spacing. Node 2410, which is associated with the first sub-domain and first context (e.g., the "hot" room) is shown with vertical hatching. Additionally node 2410 is shown in the upper space 2422 of the graphical representation, which is the area above the central axis 2420. All nodes in the upper space 2422 can be quickly visually identified as being associated with the first context (e.g. "hot" room). Node 2412, however, is associated with the second sub-domain and second context (e.g., the "cold" room), and is thus shown with horizontal hatching and shown in the lower space 2424 of the graphical representation. Because node 2408 appears in both dimensional rule sets 2200, 2300, and is thus common to both the first sub-domain and the second sub-domain, node 2408 can be presented with a visual indicator showing commonality. A common visual indicator can be a visual indicator that is completely unique and unrelated to the visual indicators of the sub-domains (e.g., a yellow coloring, when the first sub-domain is red and the second sub-domain is blue), or can be indicative of a combination of the sub-domains (e.g., a purple coloring, when the first sub-domain is red and the second sub-domain is blue, since purple is easily understood as a combination of red and blue). As seen in FIG. 24, node 2408 is presented with a cross hatch border (e.g., having both vertical and horizontal hatching) and is presented on a central axis 2420, partially within the upper space 2422 and lower space 2424 of the graphical representation. In other embodiments, more or fewer visual identifiers can be used. In other embodiments, other types of visual identifiers can be used.

Nodes 2414, 2416 represent additional dimensional differentiators. Node 2414 is associated with the first sub-domain and node 2416 is associated with the second sub-domain. Node 2418 is another common node, being present in both the first dimensional rule set 2200 and the second dimensional rule set 2300.

Figure 25:
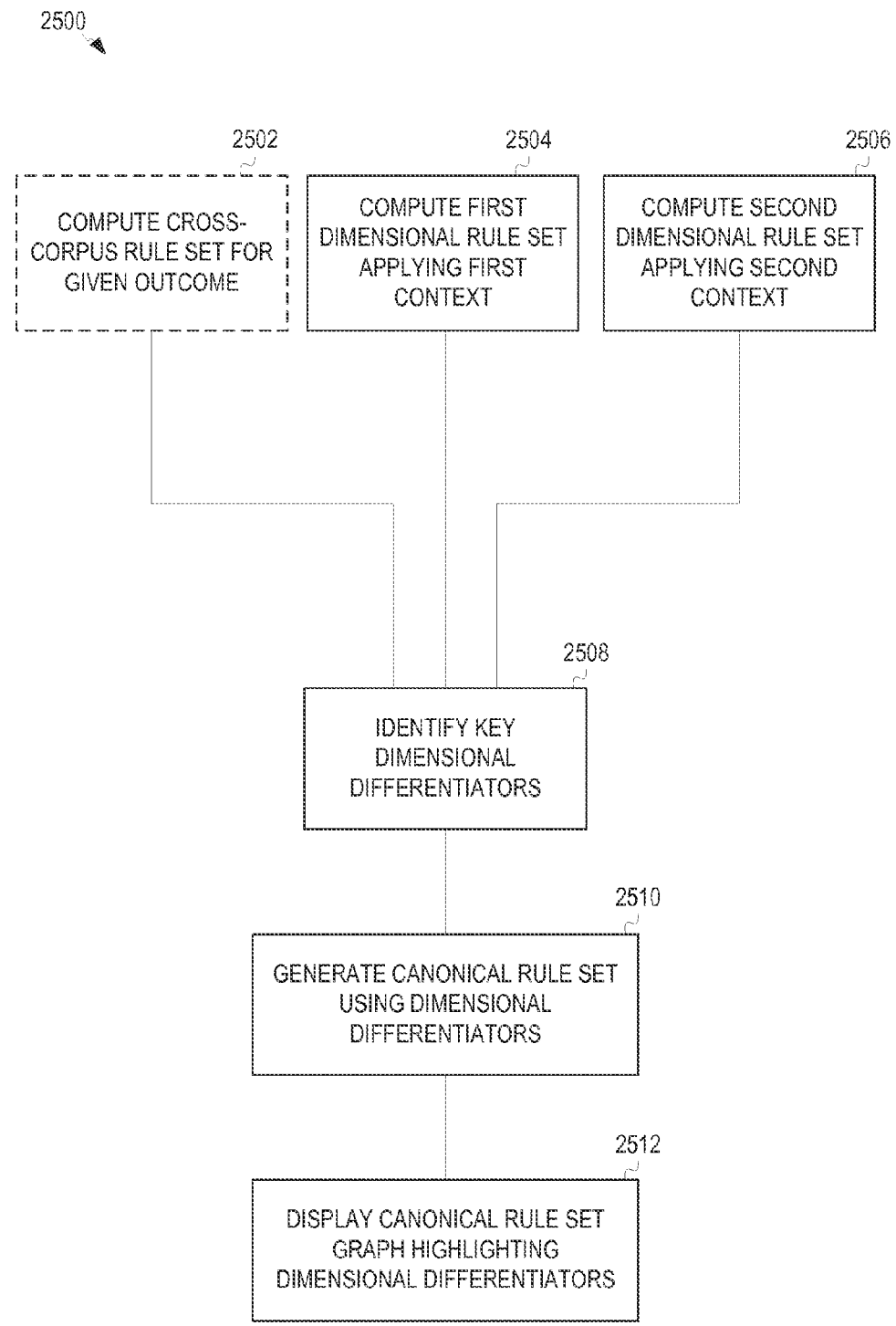
FIG. 25 is a flowchart depicting a method of generating and presenting a canonical rule set based on two contexts according to certain aspects of the present disclosure.

FIG. 25 is a flowchart depicting a method 2500 of generating and presenting a canonical rule set based on two contexts according to certain aspects of the present disclosure. Since the canonical rule set will be based on two contexts, the possible effect target codes include {11, 10, 01, 00}, where "11" is associated with satisfying the target across the entire data set, "10" is associated satisfying the target within only a first context (e.g., only within a first sub-domain), "01" is associated with satisfying the target within only a second context (e.g., only within a second sub-domain), and "00" is associated with not satisfying the target within any of the data set.

At optional block 2502, a cross-corpus rule set is computed for a given outcome (e.g., a target). The cross-corpus rule set can be generated, as described above, based on the entire data set, and thus may include nodes having "11" effect target codes.

At block 2504, a first dimensional rule set can be computed applying a first context. In an example, applying the first context can include determining a first dimensional rule set for a given outcome (e.g., the same outcome as the given outcome of the cross-corpus rule set) based on a first sub-domain of the data set. Other contexts can be used. The first dimensional rule set can thus include nodes having "10" effect target codes (e.g., as satisfying the target only within the first sub-domain) and "11" effect target codes (e.g., as satisfying the target within the first sub-domain and the second sub-domain).

At block 2506, a second dimensional rule set can be computed applying a second context. In an example, applying the second context can include determining a second dimensional rule set for a given outcome (e.g., the same outcome as the given outcome of the cross-corpus rule set) based on a second sub-domain of the data set. The second dimensional rule set can thus include nodes with "01" effect target codes (e.g., as satisfying the target only within the second sub-domain) and "11" effect target codes (e.g., as satisfying the target within the second sub-domain and the first sub-domain).

At block 2508, key dimensional differentiators can be identified. In an example, the dimensional differentiators can be identified for a given outcome (e.g., the same outcome as the given outcome of the cross-corpus rule set) such that the dimensional differentiators are unique to a particular dimensional rule set. The key dimensional differentiators can be those nodes that contain terms that are unique to a particular rule set, specifically to a particular dimensional rule set. In other words, the presence of terms that are unique to a particular dimensional rule set can be used to classify a particular data file based on effect target codes {11, 10, 01, 00}. Therefore, based on the presence or absence (e.g., in the case of a ~ term) of a particular term in a data file, it may be possible to categorize whether that data file satisfies the target across the entire data set, across only the first sub-domain, across only the second sub-domain, or does not satisfy the target at all.

A token's relevance to the common characteristic (e.g., the given outcome of the cross-corpus rule set) with four target values can be expressed as "11 vs all others," "10 vs all others," or "01 vs all others." The term list that is returned for 1, 2, and 3 give us the uniquely identifiable nodes (e.g., cross hatched, vertical hatched, and horizontal hatched, as seen in FIG. 24). The calculation of g-score, m-estimates and other such calculations can be adjusted to reflect four choices in the target (e.g., {11, 10, 01, 00}) instead of two choices (e.g., {1, 0}).

In some embodiments, each dimensional rule set can be compared in order to identify the dimensional differentiators. In some embodiments, each dimensional rule set and the cross-corpus rule set can be compared in order to identify the dimensional differentiators.

In some embodiments, common terms (e.g., those terms common across all dimensional rule sets or common across all dimensional rule sets and the cross-corpus rule set) can be identified prior to block 2510 or block 2512, as described in further detail herein.

At block 2510, the canonical rule set is generated using dimensional differentiators identified at block 2508. In some embodiments, the canonical rule set is based on the cross-corpus rule set generated at block 2502, where those nodes not present in either the first dimensional rule set or the second dimensional rule set are removed. In other embodiments, such nodes are retained. The dimensional differentiators identified at block 2508 can be included in the remaining rule set.

At block 1512, the canonical rule set graph (e.g., graphical representation) is displayed highlighting dimensional differentiators. The various nodes of the rule set can include visual indicators, as described above, in order to identify the effect coding of the node. Examples of suitable visual indicators can include color coding, patterns (e.g., hatching), spatial orientation, shape (e.g., square, round, star-shaped, and oval nodes), and other visual indicators. Visual indicators can be present on a node (e.g., coloring the background of a node or the outline of the node), near a node (e.g., a colored haze near a node), or otherwise associated with a node (e.g., where a node is located in a certain space of the graphical representation, such as above or below a particular line).

In some embodiments, the canonical rule set is not displayed, and instead the dimensional differentiators are presented (e.g., as a data file) in a manner that allows the related nodes of each dimensional differentiator to be uniquely identified as being associated with a particular context (e.g., the first sub-domain versus the second sub-domain). Additionally, any common nodes can be presented in a manner that is indicative that the common node is associated across all contexts (e.g., the entire data set, versus only the first sub-domain or only the second sub-domain).

Figure 26:
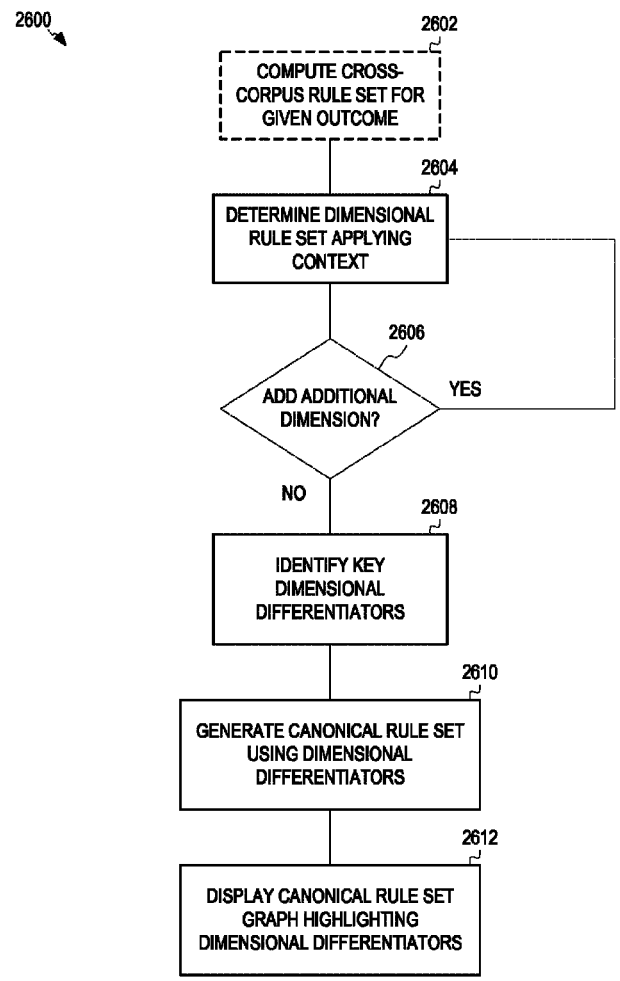
FIG. 26 is a flowchart depicting a method of generating and presenting a canonical rule set based on multiple contexts according to certain aspects of the present disclosure.

FIG. 26 is a flowchart depicting a method 2600 of generating and presenting a canonical rule set based on multiple contexts according to certain aspects of the present disclosure. At optional block 2602, the cross-corpus rule set is computed for a given outcome based on a data set.

At block 2604, a dimensional rule set is determined applying a particular context. Any suitable context can be used, as described in further detail herein. In an example, applying a context can include determining a dimensional rule set based on a sub-domain of the corpus of data files. During a first iteration of block 2604, a first dimensional rule set is determined applying a first context.

At block 2606, an inquiry is conducted to determine if another dimension should be added to the canonical rule set. The inquiry can be based on available contexts, pre-established rules, or user input. If an additional dimension should be added, the method 2600 continues back to block 2604 for a second iteration, applying the second context. The inquiry at block 2606 and the dimensional rule set computation at block 2604 can continue for any number of iterations to produce any number of respective dimensional rule sets based on any number of respective contexts. In an example, if contexts were based on an external source, such as a current year's tax bracket information, a process can determine if another tax bracket exists, and if so, continue for another iteration of block 2604 using the next tax bracket as a new context.

For each dimensional rule set, and therefore each context, the effect target coding includes an additional 0-1 digit. For example, at two dimensional rule sets, the effect target codes can be {11, 10, 01, 00}, whereas at three dimensional rule sets, the effect target codes can be {111, 110, 101, 011, 100, 010, 001, 000}. Any number of dimensional rule sets can be created.

At block 2608, key dimensional differentiators are identified, similarly to how dimensional differentiators are identified at block 2508 of FIG. 25. The dimensional differentiators can include nodes that are unique across all rule sets (e.g., dimensional and cross-corpus) or nodes that are unique across all dimensional rule sets. In some embodiments, partial-dimensional differentiators can be identified, which include nodes that are unique across at least two dimensional rule sets, but not unique across every dimensional rule set (e.g., unique across first and second dimensional rule sets, but common to second and third dimensional rule sets).

In some embodiments, dimensional differentiators can be identified by comparing all dimensional rule sets together, optionally with a cross-corpus rule set. In some embodiments, dimensional differentiators can be identified by iteratively comparing fewer than all dimensional differentiators (e.g., two dimensional differentiators) together and generating a sub-canonical rule set, which can then be compared with one or more other dimensional differentiators to generate another sub-canonical rule set or a canonical rule set. A sub-canonical rule set can be any canonical rule set that is compared with another rule set to generate another canonical rule set. For example, the canonical rule set 2400 of FIG. 24 can be considered a sub-canonical rule set if it is compared with another rule set (e.g., a dimensional rule set determined by applying a third context) to determine dimensional differentiators with respect to those contexts of the canonical rule set 2400 and the another rule set.

At block 2610, a canonical rule set is generated as described above, using the dimensional differentiators identified at block 2608. At block 2612, the canonical rule set graph is displayed, highlighting the dimensional differentiators identified at block 2608. Unique visual indicators can be used to identify full dimensional differentiators (e.g., unique across all dimensional rule sets), partial-dimensional differentiators (e.g., unique across some, but not all, dimensional rule sets), and common nodes. In some embodiments, partial-dimensional differentiators and common nodes, which necessarily share at least two contexts, can include visual indicators that are suggestive of a combination of those visual indicators used for the full dimensional differentiators of their two or more commonly shared contexts.

Figure 27:
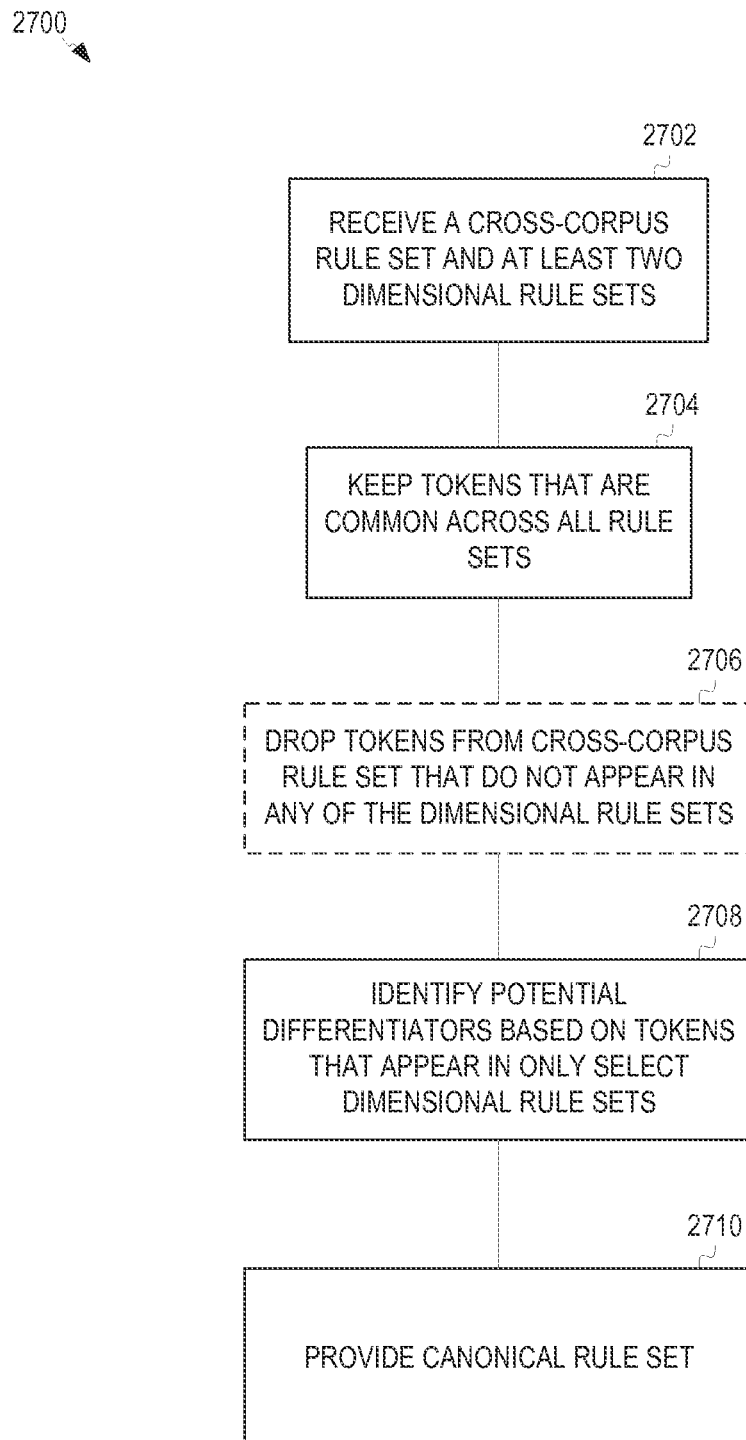
FIG. 27 is a flowchart depicting a method of generating a canonical rule set according to certain aspects of the present disclosure.

FIG. 27 is a flowchart depicting a method 2700 of generating a canonical rule set according to certain aspects of the present disclosure. At block 2702, a cross-corpus rule set and at least two dimensional rule sets are received. The cross-corpus rule set is based on an entire data set. Each of the at least two dimensional rule sets are each based on a sub-domain of the entire data set, the sub-domain representing those data files that are associated with a particular context. Each rule set contains a number of tokens (e.g., terms or nodes). Each token of a rule set can be linked to an adjacent token (e.g., connected by an "AND" or "OR" or "NOT" operator).

At block 2704, the tokens that are common across all rule sets are retained and stored in memory. At optional block 2706, tokens present in the cross-corpus rule set that do not appear in any of the dimensional rule sets are dropped, skipped, or removed from memory.

At block 2708, potential dimensional differentiators are identified based on tokens that appear in only select dimensional rule sets. Dimensional differentiators can include tokens that are unique across all rule sets. Multiple related dimensional differentiators in separate dimensional rule sets (e.g., associated with different contexts) can be related. Such related dimensional differentiators (e.g., "warm" and "chill") include tokens that are unique to their respective contexts and are linked (e.g., edge-linked) to a common node or to another related dimensional differentiator. In some embodiments, a dimensional differentiator associated with a first context does not necessarily have a related dimensional differentiator that is associated with a second context. Partial-dimensional differentiators can include tokens that are unique across at least two dimensional rule sets (e.g., in the case of three dimensional rule sets, a partial-dimensional differentiator may be present in only one of the first and second dimensional rule sets, but may be present in both the second and third dimensional rule sets). The identified dimensional differentiators can be stored in memory and identified as dimensional differentiators.

At block 2710, the canonical rule set is provided. The canonical rule set can be a combination of the cross-corpus rule set and each of the at least two dimensional rule sets. Tokens from the cross-corpus rule set that do not appear in any of the dimensional rule sets can be dropped, such as in optional block 2706. Dimensional differentiators identified at block 2708 can be included in the canonical rule set. The resulting canonical rule set can include a combination of common nodes and dimensional differentiators. The canonical rule set can be presented, such as visually presented in a graphical representation.

Figure 28:
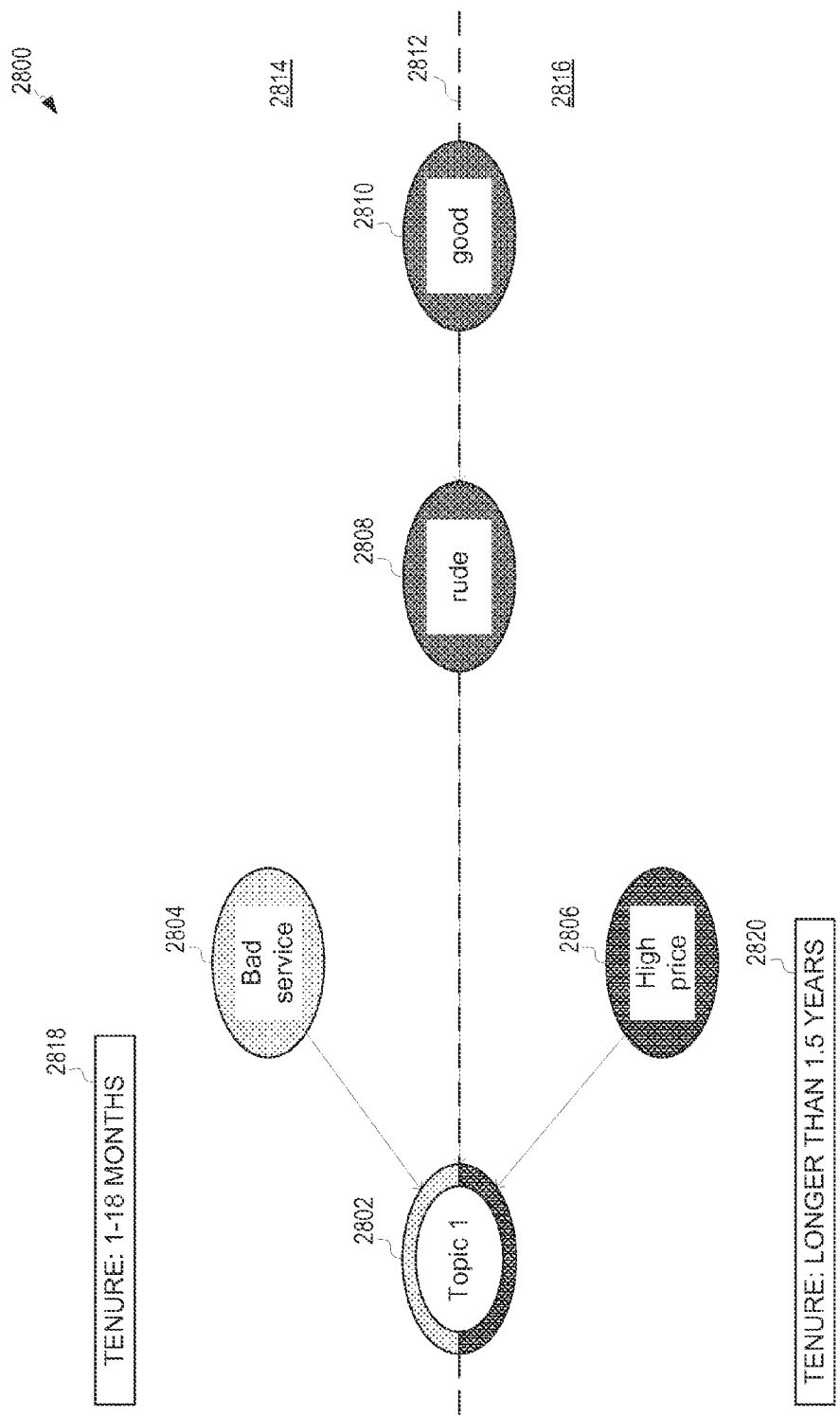
FIG. 28 is a graphical representation of an example canonical rule set used for contextual comparison according to certain aspects of the present disclosure.

FIG. 28 is a graphical representation of an example canonical rule set 2800 used for contextual comparison according to certain aspects of the present disclosure. This graphical representation or a version thereof can be presented on a display or otherwise visually presented to a user. In this example, the data set can include information extracted from a customer service conversation log. The data set can be separated into two sub-domains based on tenure of the customer. The first context 2818, and thus first sub-domain, can be associated with customers having 18 or fewer months of tenure. The second context 2820, and thus second sub-domain, can be associated with customers having longer than 1.5 years of tenure.

After processing the data set and sub-domains, the canonical rule set 2800 can be displayed, including the target node 2802 and nodes 2804, 2806, 2808, 2810. The target node 2802 can be representative of a particular Topic (e.g., "Topic 1"). The canonical rule set 2800 displays common nodes (e.g., Topic node 2802 and nodes 2808 and 2810) as well as dimensional differentiators (e.g., nodes 2804, 2806). Multiple visual indicators are used to distinguish the dimensional differentiators and the common nodes. Those nodes associated with the first context 2818 are located in a first space 2814 and the nodes associated with the second context 2820 are located in a second space 2816. Nodes common to both the first context 2818 and the second context 2820 are located along the centerline 2812. The dimensional differentiator (e.g. node 2804) associated with the first context 2818 is presented in a first color (e.g., blue, shown in FIG. 28 as light patterning). The dimensional differentiator (e.g., node 2806) associated with the second context 2820 is presented in a second color (e.g., red, shown in FIG. 28 as heavy patterning). The Topic node 2802 and common nodes (e.g., nodes 2808 and 2810) can be presented with some coloring that is indicative that they are relevant to both the first context 2818 and the second context 2820. As seen in FIG. 28, the Topic node 2802 is presented in a visually distinct manner from the non-Topic common nodes (e.g., nodes 2808 and 2810). The Topic node 2802 is presented as being colored partially in the first color (e.g., blue) and partially in the second color (e.g., red). The Topic node 2802 is shown as having the coloring present in the border of the node, whereas the coloring can be present in the background or otherwise associated with the node. The common nodes (e.g., nodes 2808, 2810) are presented with background coloring of a third color (e.g., purple, shown in FIG. 28 as medium patterning). The purple color is selected as being a combination of the red and blue colors, thus being indicative that the common nodes belong to both the first context 2818 and the second context 2820.

In the example seen in FIG. 28, the canonical rule set 2800 based on the first context 2818 and the second context 2829 can be used to identify that the terms "Bad service" and "High price" are tenure-specific tokens that may be synonymous or antonyms for a particular churn trigger event, for example, that depends on the tenure of a customer.

Figure 29:
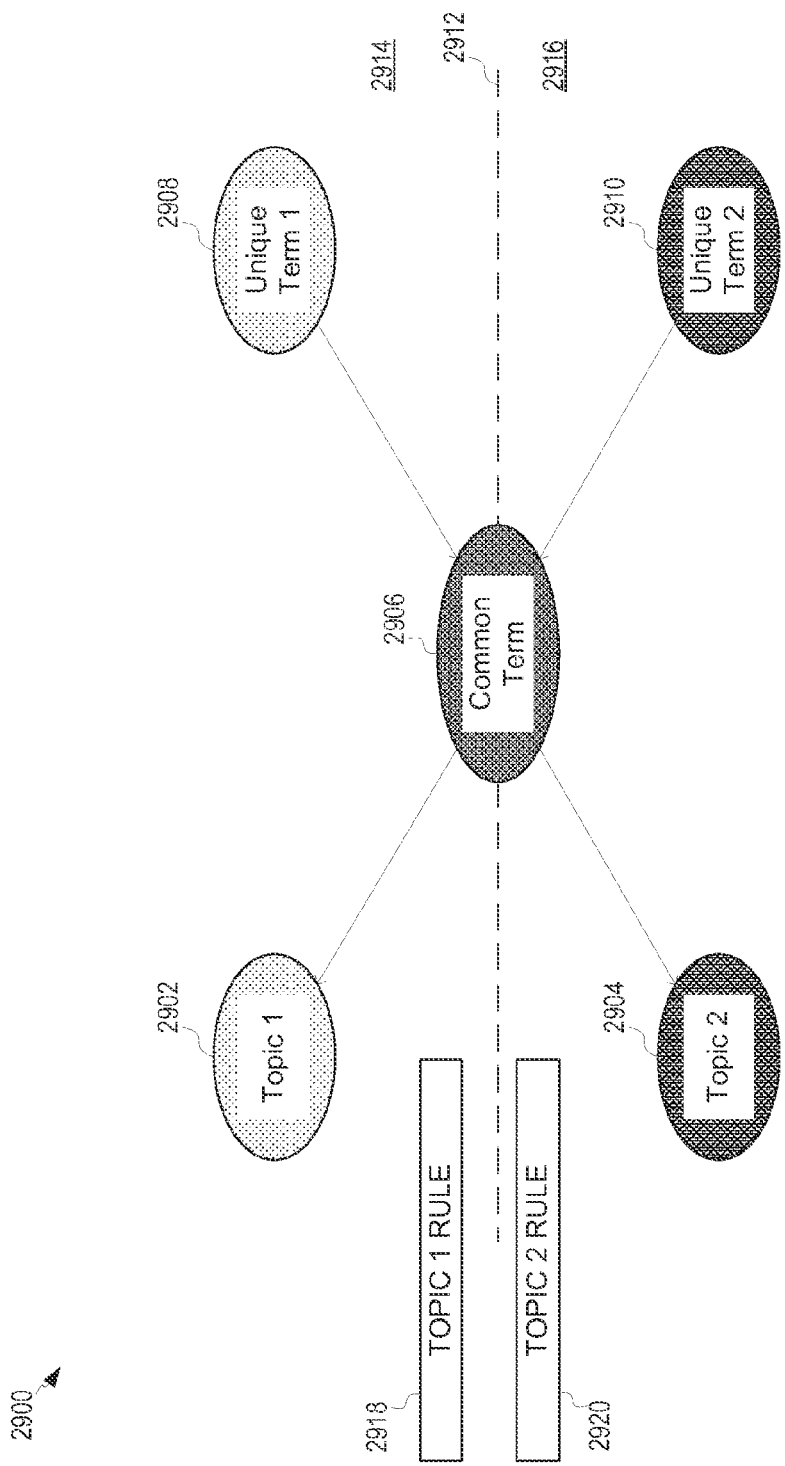
FIG. 29 is a graphical representation of an example canonical rule set used for topic specification and disambiguation according to certain aspects of the present disclosure.

FIG. 29 is a graphical representation of an example canonical rule set 2900 used for Topic specification and disambiguation according to certain aspects of the present disclosure. This graphical representation or a version thereof can be presented on a display or otherwise visually presented to a user. In this example, two topics have been constructed. The Topics can be correlated or uncorrelated (e.g., overlapping or orthogonal). In the example of FIG. 29, the first dimensional rule set is actually a rule set computed for a first Topic (e.g., "Topic 1") and the second dimensional rule set is actually a rule set computed for a second Topic (e.g., "Topic 2"). In some embodiments, multiple dimensional rule sets can be generated based on the same entire data set, but based on unique targets (e.g., "Topic 1" versus "Topic 2"). The comparison between the first dimensional rule set and the second dimensional rule set in order to generate the canonical rule set 2900 can be performed as otherwise described herein.

The canonical rule set 2900 can display information relevant to a first context 2918 (e.g., a rule set for Topic 1) and a second context 2920 (e.g., a rule set for Topic 2). One or more visual indicators can be used. As seen in FIG. 29, visual indicators include color visual indicators (shown in black and white as patterns) and spatial visual indicators. The nodes (e.g., target node 2902 and node 2908) associated with the first context 2918 can be presented in a first color (e.g., blue, shown in FIG. 29 as light patterning) and in an upper space 2914 above a centerline 2912. The nodes (e.g., target node 2904 and node 2910) associated with the second context 2920 can be presented in a second color (e.g., red, shown in FIG. 29 as heavy patterning) and in a lower space 2916 below a centerline 2912. A common node 2906 that is present in both the first context 2918 and second context 2920 can be presented in a third color (e.g., purple, shown in FIG. 29 as medium patterning) and along the centerline 2912. The purple color can be selected as being a combination of the red and blue colors, thus being indicative that the common node 2906 belongs to both the first context 2918 and the second context 2920.

The canonical rule set 2900 can be used to characterize the two targets versus one another (e.g., "Topic 1" versus "Topic 2"). This characterization can provide information on shared and disjoint characteristics of the two contexts. For example, the "Common Term" is seen as present in both rule sets, whereas "Unique Term 1" is only seen in the "Topic 1" rule set and "Unique Term 2" is only seen in the "Topic 2" rule set. "Unique Term 1" and "Unique Term 2" are differential differentiators for the two contexts. Such Topic specification and disambiguation can be used to construct more sharply-defined Topic boundaries.

Figure 30:
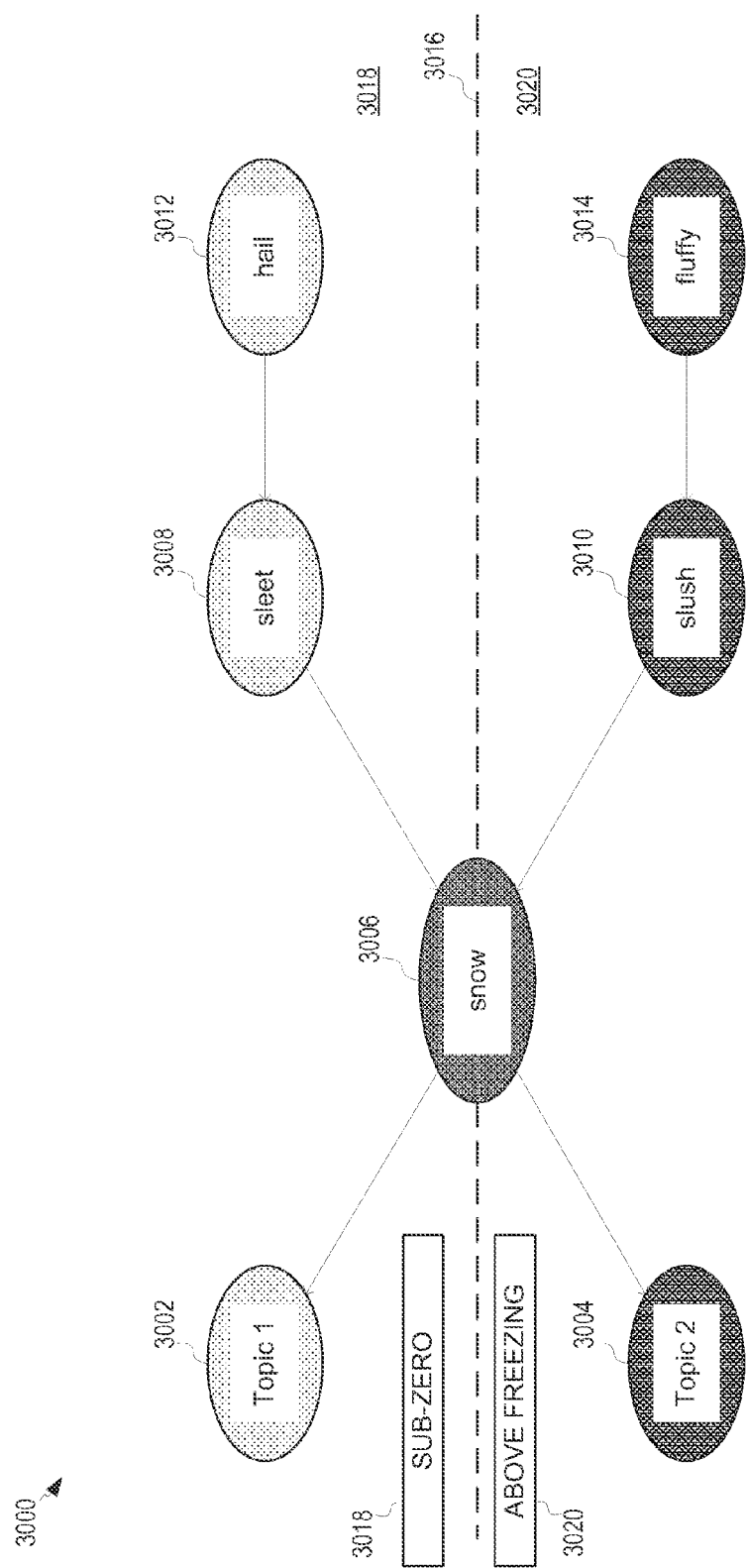
FIG. 30 is a graphical representation of an example canonical rule set used for semantic fields and memetic variation analysis according to certain aspects of the present disclosure.

FIG. 30 is a graphical representation of an example canonical rule set 3000 used for semantic fields and memetic variation analysis according to certain aspects of the present disclosure. This graphical representation or a version thereof can be presented on a display or otherwise visually presented to a user. Semantic field theory can be used to establish that sub-populations can refer to a given phenomenon using different semantic identifiers. Different tokens, found in similar contexts across different sub-domains are potentially similar. In the example of FIG. 30, a data set is sectioned into two sub-domains. The first context 3018, and thus the first sub-domain, is associated with observations in a sub-zero environment. The second context 3020, and thus the second sub-domain, is associated with observations in an above freezing environment.

The canonical rule set 3000 includes Topic nodes 3002, 3004 and nodes 3006, 3008, 3010, 3012, 3014. All nodes associated with the first context 3018 (e.g., Topic node 3002 and nodes 3008, 3012) can be presented in a first color and spatially positioned in an upper space 3018. All nodes associated with the second context 3020 (e.g., Topic node 3004 and nodes 3010, 3014) can be presented in a second color and spatially positioned in a lower space 3020. Common nodes (e.g., node 3006) can be presented in a third color and along a centerline 3016.

The sub-domains can be based on any intra-corpus, extra-corpus, or inter-corpus attribute. A sub-domain based on an intra-corpus attribute is a sub-domain that is separated based on some occurrence or pattern of occurrences in the data set itself (e.g., separating the data set into sub-domains based on whether or not the data file belongs to "Topic 1" or "Topic 2"). Another example of sub-domain separation based on intra-corpus attributes would be to separate a data set into sub-domains based on "positive" or "negative" sentiment (e.g., a collection of customer satisfaction surveys can be separated into a "positive" sentiment sub-domain and a "negative" sentiment sub-domain). A sub-domain based on an extra-corpus attribute is a sub-domain that is separated based on an external classification system (e.g., separating the data set into sub-domains based on the Dewey Decimal System). Another example of sub-domain separation based on extra-corpus attributes be separating a data set by classification from an external source, such as Wikipedia (e.g., separating a data set containing information about a group of singers based on Wikipedia categories, such as "Basses" or "Baritones"). A sub-domain based on an inter-corpus attribute is a sub-domain that is separated based on multiple corpuses, or data sets. For example, a full data set can be collected from two distinct data sets. Each distinct data set can be separated into its own sub-domain. The two distinct data sets can be collected through different means, from different sources (e.g., males versus females), at different times (e.g., initial observations versus terminal observations), or in any other way that provides distinction between the two data sets. An example of sub-domain separation based on inter-corpus attributes can be collecting data from a group of students on the first day of a class and on the last day of the class and separating the data from the first day (e.g., baseline data) into a first sub-domain while separating the data from the last day of the class (e.g., post-instruction data) into a second sub-domain.

In some embodiments, sub-domains can be based on external classifications, pre-defined classifications, and internally-deduced classifications. External classification can include any separation of a data set into sub-domains based on information not included in the corpus, such as external classification systems (e.g., Dew Decimal System, Wikipedia categories, or tax brackets). Pre-defined classification can include separation of a data set into sub-domains based on any established separation mechanism. Examples of established separation mechanisms can include pre-categorizing data files, separating a data set that was created from distinct data sets into its original distinct data sets (e.g., data collections taken at different times), separating based on a particular entry in a data file (e.g., response to a gender question on a survey), or any other suitable separation mechanism based on pre-defined classifications. Internally-deduced classifications can include separation of a data set into sub-domains based on analysis of information contained within the members of the data set. For example, a rule analysis can be conducted, as described herein, to determine which data files satisfy a first target (e.g., "Topic 1") and which data files satisfy a second target (e.g., "Topic 2"). Those data files which satisfy the first target can be separated into a first sub-domain and those data files which satisfy the second target can be separated into a second sub-domain.

As seen in FIG. 30, the data set used to generate the canonical rule set 3000 has separated the data set, using one of the methods described above, into "Sub-Zero" and "Above Freezing." The unique terms (e.g., "sleet," "slush," "hail," and "fluffy") are determinate of the context (e.g., either "Sub-Zero" or "Above Freezing") and the common term (e.g., "snow") is shown as being predictive of both contexts. Using semantic fields and memetic variation analysis, one can determine that the terms "sleet" and "hail" may be indicative of "snow" in the "Sub-Zero" context, and that the terms "slush" and "fluffy" may be indicative of "snow" in the "Above Freezing" context.

Figure 31:
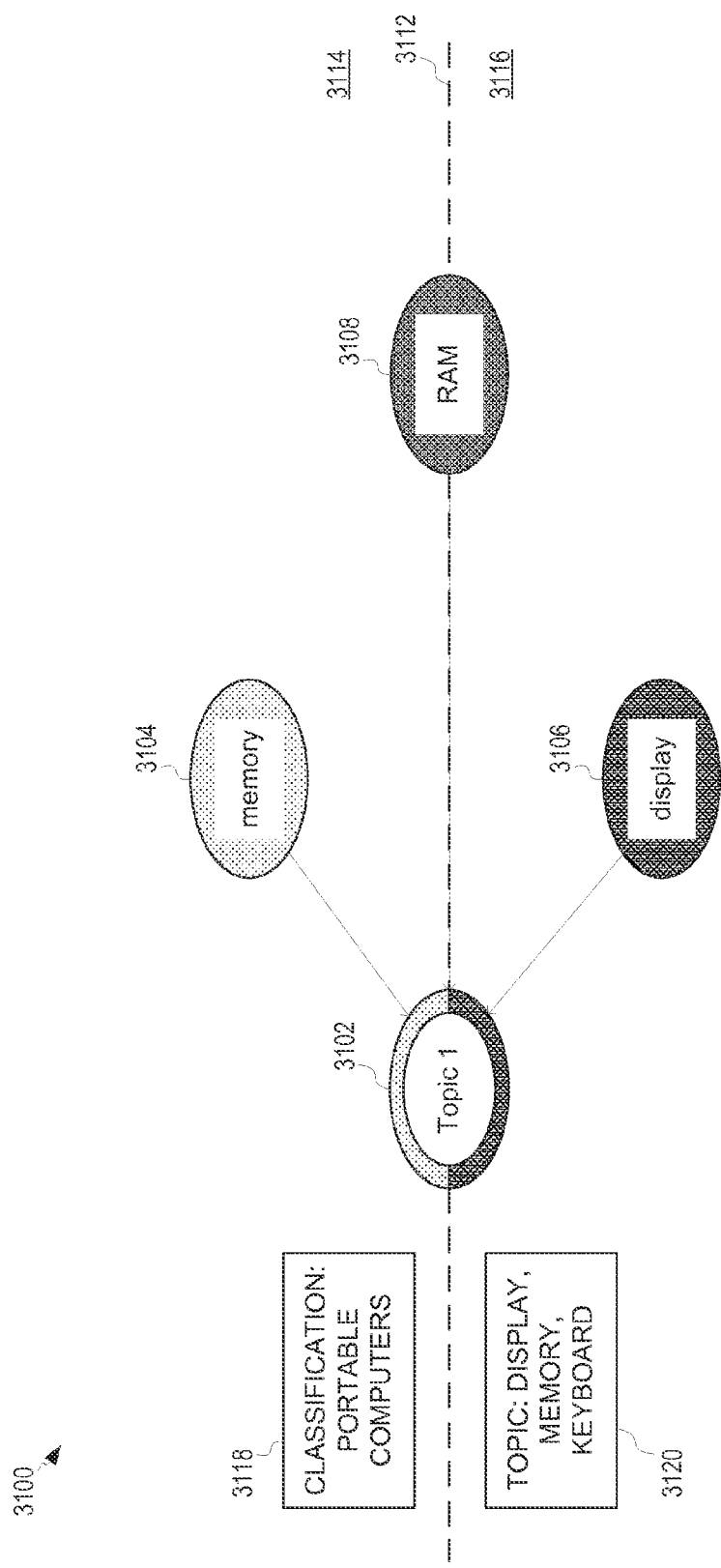
FIG. 31 is a graphical representation of an example canonical rule set used for ontology construction according to certain aspects of the present disclosure.

FIG. 31 is a graphical representation of an example canonical rule set 3100 used for ontology construction according to certain aspects of the present disclosure. This graphical representation or a version thereof can be presented on a display or otherwise visually presented to a user. Class attributes can typically be document-level attributes. Concepts or Topics can typically be sub-document-level attributes. Themes can typically be pan-document-level attributes. A characteristic of an ontology can include the ability to associate parts to a higher entity. The canonical rule set 3100 can be used to identify and associate Topics and sub-Topics as parts of a higher-level document class, which can be useful for ontology construction.

A canonical rule set 3100 can include a target node 3102 (e.g., "Topic 1") based on a data set separated into two sub-domains based on two contexts. The first context 3118, and thus the first sub-domain, can include those data files of the data set that are associated with the classification "Portable Computers." The second context 3120, and thus the second sub-domain, can include those data files of the data set that are associated with the Topic "Display, Memory, Keyboard." Visual identifiers can be used to denote to which context a node belongs. The target node 3102 and common node 3108 are both presented spatially along the centerline 3112. The target node 3102 includes both a first color and a second color. The common node 3108 includes a third color that is indicative of a combination of the first color and second color. Node 3104 is associated with the first context 3118, and is thus colored with the first color and spatially located in an upper space 3114, above the centerline 3112. Node 3106 is associated with the second context 3120, and is thus colored with the second color and spatially located in a lower space 3116, below the centerline 3112.

The example depicted in FIG. 31 can be created by performing an initial correlation analysis between the class attributes and the Topic attributes. The most highly correlated class-Topic instances can be selected for analysis.

For ontology construction, a canonical rule set 3100 can be generated where a first effect target can have an attribute as to whether or not the document belongs to a particular ontology entry (e.g., "portable computers" or "motor vehicles") and a second effect target can have an attribute as to whether or not the corpus (e.g., entire data set) has a particular term (e.g., "display" or "wheels"). For example, the effect target codes can include {11, 10, 01, 00}, where "11" is associated with a particular class (e.g. "motor vehicles") and a particular term (e.g., "wheels"), "10" is associated with only a particular class and not a particular term, "01" is associated with a particular term, but not a particular class, and "00" is not associated with either the particular class or the particular term.

As seen in the canonical rule set 3100 of FIG. 31, the term "RAM" falls within the "Portable Computers" classification and the "Display, Memory, Keyboard" Topic, thus indicative of the ontological correlation of the term "RAM" to the class "Portable Computers." The use of classes and Topics as contexts of a canonical rule set 3100 can enable the generation of terms that can be used to describe a generic ontology (e.g., "motor vehicles"). Additionally, a generic set of rules that characterize what are the indicator terms that point to the existences of a particular ontology can be created by generating a canonical rule set 3100 having contexts that are a mixtures of classes and Topics.

Figure 32:
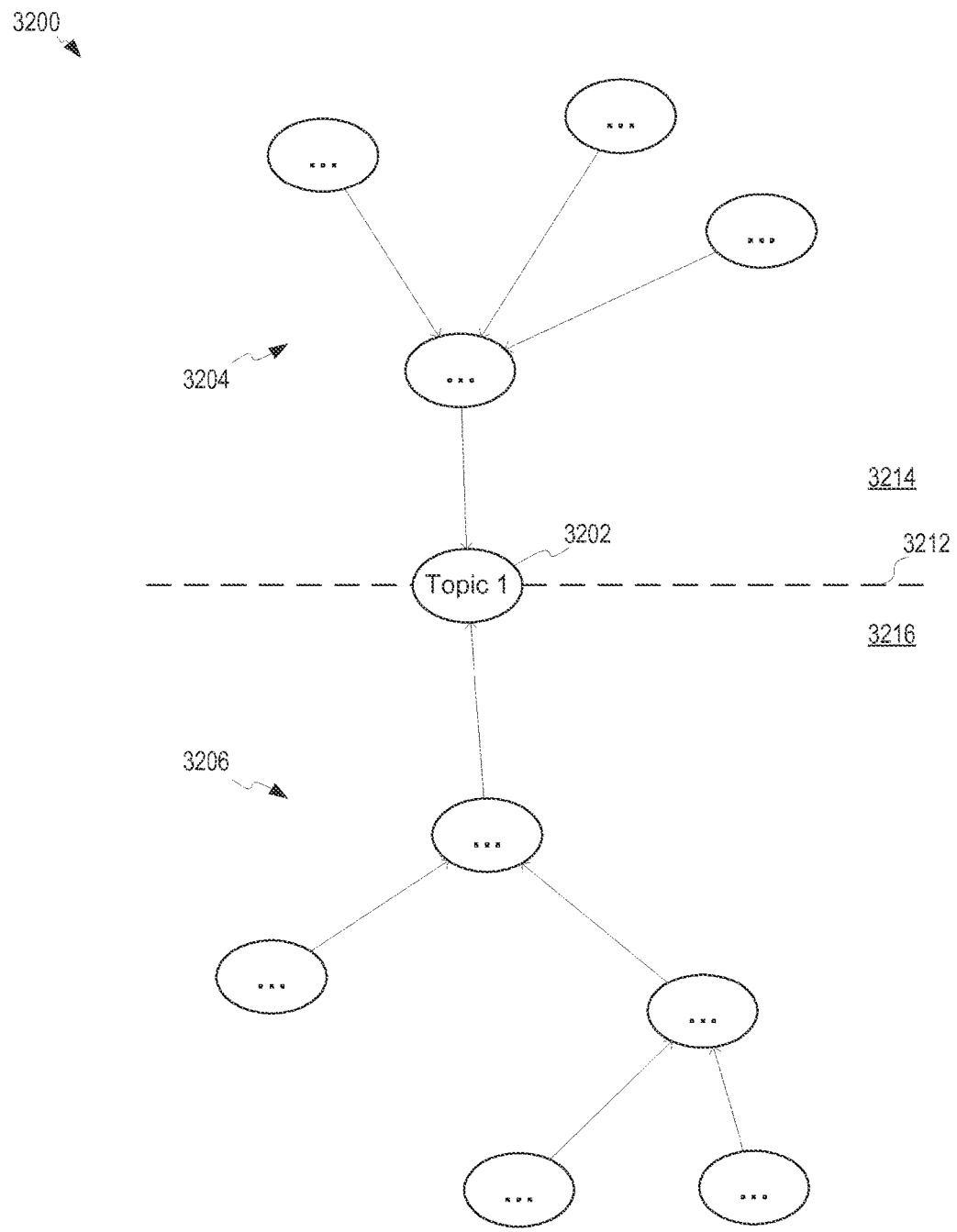
FIG. 32 is a graphical representation of a generic canonical rule set displayed with spatial visual indicators according to certain aspects of the present disclosure.

FIG. 32 is a graphical representation of a generic canonical rule set 3200 displayed with spatial visual indicators according to certain aspects of the present disclosure. This graphical representation or a version thereof can be presented on a display or otherwise visually presented to a user. The canonical rule set 3200 can include a target node 3220 (e.g., "Topic 1") and various additional nodes 3204, 3206. The canonical rule set 3200 can be generated based on a data set that is separated into two sub-domains that are each associated with a particular context. Nodes 3204 can be associated with the first context, and are spatially positioned in an upper space 3214, above centerline 3212. Nodes 3206 can be associated with the second context, and are thus spatially positioned in a lower space 3216, below centerline 3212. Other spatial orientations (e.g., circular, horizontal, diagonal) can be used. Additionally, any number of spatial separators (e.g., one, two, three, or more) separation lines can be used instead of a single centerline 3212, thus allowing for more than two spaces (e.g., an upper space, a middle space, and a lower space), thus allowing the visual distinction of more than two contexts.

As described herein, many canonical rule sets can be created based on distinct contexts by computing rule sets for each distinct context. Rule sets generated for a distinct context can be generated on an entire corpus or a portion of the entire corpus. The systems and methods described herein can be used to capture any level of measurement, both metric and non-metric, since all measurements can be re-mapped to a binary effect coding once a given cut point is determined. The presence or absence of a "Topic" can be a common method to map a measurement to a Boolean or binary term. Once the cut point is determined, the re-mapped Boolean or binary term can be inserted in the referenced processes including as a dimensional target (e.g., target for a single context). The methods and system described herein can also be recursive, allowing data from a canonical rule set to be used as a target, such as a dimensional target.

As described above with reference to FIGS. 21-32, systems and methods for performing analyses on data sets to display canonical rules sets with dimensional targets is disclosed. These systems and methods make use of rule sets that can be generated in various suitable ways. In some embodiments, these rule sets (e.g., dimensional or contextual rule sets and cross-corpus rule sets) can be generated using the techniques described with reference to FIGS. 1-20. For example, the generation of a rule set can include generating a potential rule by selecting one or more key terms from a list that includes key terms from a set of data files having one or more data files having a common characteristic, wherein the one or more key terms satisfy a term evaluation metric; evaluating the potential rule using a rule evaluation metric configured to determine a relevancy of the potential rule to the one or more data files having the common characteristic, the rule evaluation metric being further configured to determine an applicability of the potential rule to data not included in the plurality of data files; adding the potential rule to the rule set if the rule evaluation metric is satisfied; based upon the potential rule being added to the rule set, removing data files covered by the potential rule from the set of data files; and repeating the potential rule generation and evaluation until a stopping criterion is met. Other systems and methods for rule generation can be used to generate a rule set to which a context can be applied. In the above example, applying a context can include limiting the set of data files that are used to generate the potential rule to a sub-domain of data files that are associated with the context (e.g., a sub-domain of a data set including sales data can include only those data files from customers who live in the commonwealth of Virginia). Multiple rule sets can be created for multiple contexts.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session. Some systems may be of other types, designs and configurations.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a computer-program product tangibly embodied in a non-transitory computer-readable storage medium having instructions stored thereon, the instructions executable to cause a data processing apparatus to perform operations including: receiving a set of data files; determining a plurality of rule sets based on the set of data files, wherein determining a rule set includes applying a context to a rule set; comparing two rule sets of the plurality of rule sets, wherein comparing includes identifying a dimensional differentiator for the two rules sets and a common node for the two rule sets, wherein the dimensional differentiator is only associated with one context, and wherein the common node is associated with both contexts; generating a canonical rule set using the compared rule sets, the dimensional differentiator, and the common node; and presenting the canonical rule set, wherein presenting includes visually distinguishing the dimensional differentiator from the common node.

Example 2 is the computer-program product of example 1, wherein the operations further include determining a cross-corpus rule set based on the set of data files, wherein generating the canonical rule set includes generating the canonical rule set additionally using the cross-corpus rule set.

Example 3 is the computer-program product of example 2, wherein the common node is additionally associated with the cross-corpus rule set.

Example 4 is the computer-program product of examples 1-3, wherein presenting the canonical rule set includes visually presenting the canonical rule set, and wherein the dimensional differentiator is visually distinguishable from the common node.

Example 5 is the computer-program product of examples 1-4, wherein presenting the canonical rule set includes distinguishing the dimensional differentiator by context.

Example 6 is the computer-program product of examples 1-5, wherein presenting the canonical rule set includes presenting the common node as being associated with both contexts.

Example 7 is the computer-program product of examples 1-6, wherein applying the context to the rule set includes generating the rule set based on a sub-domain of the set of data files associated with the context.

Example 8 is a system comprising one or more data processors and a non-transitory computer readable storage medium containing instructions which when executed on the one or more data processors, cause the one or more processors to perform operations including: receiving a set of data files; determining a plurality of rule sets based on the set of data files, wherein determining a rule set includes applying a context to a rule set; comparing two rule sets of the plurality of rule sets, wherein comparing includes identifying a dimensional differentiator for the two rules sets and a common node for the two rule sets, wherein the dimensional differentiator is only associated with one context, and wherein the common node is associated with both contexts; generating a canonical rule set using the compared rule sets, the dimensional differentiator, and the common node; and presenting the canonical rule set, wherein presenting includes visually distinguishing the dimensional differentiator from the common node.

Example 9 is the system of example 8, wherein the operations further include determining a cross-corpus rule set based on the set of data files, wherein generating the canonical rule set includes generating the canonical rule set additionally using the cross-corpus rule set.

Example 10 is the system of example 9, wherein the common node is additionally associated with the cross-corpus rule set.

Example 11 is the system of examples 8-10, wherein presenting the canonical rule set includes visually presenting the canonical rule set, and wherein the dimensional differentiator is visually distinguishable from the common node.

Example 12 is the system of examples 8-11, wherein presenting the canonical rule set includes distinguishing the dimensional differentiator by context.

Example 13 is the system of examples 8-12, wherein presenting the canonical rule set includes presenting the common node as being associated with both contexts.

Example 14 is the system of examples 8-13, wherein applying the context to the rule set includes generating the rule set based on a sub-domain of the set of data files associated with the context.

Example 15 is a computer-implemented method, comprising receiving a set of data files; determining a plurality of rule sets based on the set of data files, wherein determining a rule set includes applying a context to a rule set; comparing two rule sets of the plurality of rule sets, wherein comparing includes identifying a dimensional differentiator for the two rules sets and a common node for the two rule sets, wherein the dimensional differentiator is only associated with one context, and wherein the common node is associated with both contexts; generating a canonical rule set using the compared rule sets, the dimensional differentiator, and the common node; and presenting the canonical rule set, wherein presenting includes visually distinguishing the dimensional differentiator from the common node.

Example 16 is the method of example 15, further comprising determining a cross-corpus rule set based on the set of data files, wherein generating the canonical rule set includes generating the canonical rule set additionally using the cross-corpus rule set.

Example 17 is the method of example 16, wherein the common node is additionally associated with the cross-corpus rule set.

Example 18 is the method of examples 15-17, wherein presenting the canonical rule set includes visually presenting the canonical rule set, and wherein the dimensional differentiator is visually distinguishable from the common node.

Example 19 is the method of examples 15-18, wherein presenting the canonical rule set includes distinguishing the dimensional differentiator by context.

Example 20 is the method of examples 15-19, wherein presenting the canonical rule set includes presenting the common node as being associated with both contexts.

Example 21 is the method of examples 15-20, wherein applying the context to the rule set includes generating the rule set based on a sub-domain of the set of data files associated with the context.

What is claimed is:

1. A computer-program product tangibly embodied in a non-transitory computer-readable storage medium having instructions stored thereon, the instructions executable to cause a data processing apparatus to perform operations including:
  receiving a set of data files;
  determining a plurality of rule sets based on the set of data files, wherein determining a rule set includes applying a context to a rule set;
  comparing two rule sets of the plurality of rule sets, wherein comparing includes identifying a dimensional differentiator for the two rules sets and a common node for the two rule sets, wherein the dimensional differentiator is only associated with one context, and wherein the common node is associated with both contexts;

generating a canonical rule set using the compared rule sets, the dimensional differentiator, and the common node;

generating a visualization of the canonical rule set, wherein the visualization includes a visual indicator for distinguishing the dimensional differentiator from the common node; and presenting the visualization of the canonical rule set on a display.

2. The computer-program product of claim 1, wherein the operations further include:

determining a cross-corpus rule set based on the set of data files, wherein generating the canonical rule set includes generating the canonical rule set additionally using the cross-corpus rule set.

3. The computer-program product of claim 2, wherein the common node is additionally associated with the cross-corpus rule set.

4. The computer-program product of claim 1, wherein presenting the canonical rule set includes distinguishing the dimensional differentiator by context.

5. The computer-program product of claim 1, wherein presenting the canonical rule set includes presenting the common node as being associated with both contexts.

6. The computer-program product of claim 1, wherein applying the context to the rule set includes generating the rule set based on a sub-domain of the set of data files associated with the context.

7. A system comprising:

one or more data processors; and a non-transitory computer readable storage medium containing instructions which when executed on the one or more data processors, cause the one or more processors to perform operations including:

receiving a set of data files;

determining a plurality of rule sets based on the set of data files, wherein determining a rule set includes applying a context to a rule set;

comparing two rule sets of the plurality of rule sets, wherein comparing includes identifying a dimensional differentiator for the two rules sets and a common node for the two rule sets, wherein the dimensional differentiator is only associated with one context, and wherein the common node is associated with both contexts;

generating a canonical rule set using the compared rule sets, the dimensional differentiator, and the common node;

generating a visualization of the canonical rule set, wherein the visualization includes a visual indicator for distinguishing the dimensional differentiator from the common node; and presenting the visualization of the canonical rule set on a display.

8. The system of claim 7, wherein the operations further include:

determining a cross-corpus rule set based on the set of data files, wherein generating the canonical rule set includes generating the canonical rule set additionally using the cross-corpus rule set.

9. The system of claim 8, wherein the common node is additionally associated with the cross-corpus rule set.

10. The system of claim 7, wherein presenting the canonical rule set includes distinguishing the dimensional differentiator by context.

11. The system of claim 7, wherein presenting the canonical rule set includes presenting the common node as being associated with both contexts.

12. The system of claim 7, wherein applying the context to the rule set includes generating the rule set based on a sub-domain of the set of data files associated with the context.

13. A computer-implemented method, comprising:

receiving a set of data files;

determining a plurality of rule sets based on the set of data files, wherein determining a rule set includes applying a context to a rule set;

comparing two rule sets of the plurality of rule sets, wherein comparing includes identifying a dimensional differentiator for the two rules sets and a common node for the two rule sets, wherein the dimensional differentiator is only associated with one context, and wherein the common node is associated with both contexts;

generating a canonical rule set using the compared rule sets, the dimensional differentiator, and the common node;

generating a visualization of the canonical rule set, wherein the visualization includes a visual indicator for distinguishing the dimensional differentiator from the common node; and presenting the visualization of the canonical rule set on a display.

14. The method of claim 13, further comprising:

determining a cross-corpus rule set based on the set of data files, wherein generating the canonical rule set includes generating the canonical rule set additionally using the cross-corpus rule set.

15. The method of claim 14, wherein the common node is additionally associated with the cross-corpus rule set.

16. The method of claim 13, wherein presenting the canonical rule set includes distinguishing the dimensional differentiator by context.

17. The method of claim 13, wherein presenting the canonical rule set includes presenting the common node as being associated with both contexts.

18. The method of claim 13, wherein applying the context to the rule set includes generating the rule set based on a sub-domain of the set of data files associated with the context.

* * * * *